United States Patent [19]

Gallo

[11] Patent Number: 4,514,769
[45] Date of Patent: Apr. 30, 1985

[54] METHOD AND APPARATUS FOR PROCESSING COLOR VIDEO SIGNALS FOR RECORDING AND REPRODUCING

[75] Inventor: Luigi C. Gallo, Woodside, Calif.

[73] Assignee: Ampex Corporation, Redwood City, Calif.

[21] Appl. No.: 108,881

[22] Filed: Dec. 31, 1979

Related U.S. Application Data

[62] Division of Ser. No. 763,762, Jan. 28, 1977, Pat. No. 4,181,817.

[51] Int. Cl.³ .................. H04N 5/781; H04N 9/491
[52] U.S. Cl. .................................................. 358/310
[58] Field of Search ........................ 358/4–8, 358/127–132, 13, 133–138, 141, 339; 360/32–38, 32.1–38.1

[56] References Cited

U.S. PATENT DOCUMENTS 3,946,432 3/1976 Goldberg et al. .................. 358/13
4,068,265 1/1978 Russell ............................. 358/141
4,075,656 2/1978 Beaulier .............................. 358/13

Primary Examiner—Raymond F. Cardillo, Jr.
Attorney, Agent, or Firm—Ralph L. Mossino; Joel D. Talcott

[57] ABSTRACT

An analog color video information signal is sampled at times determined by a first clock signal of a predetermined frequency whose phase is reversed on every consecutive horizontal line. The obtained samples are digitized and encoded for recording on a magnetic record medium, with the encoded data timed relative to a second clock signal of the predetermined frequency whose phase is continuous. The reproduced encoded data is processed under the control of two additional clock signals, each of which is of the predetermined frequency and has its phase reversed on every consecutive horizontal line. In the processing, the reproduced data is decoded, reclocked relative to a first of the two additional clock signals, has the chrominance component of the video information selectively inverted and converted back to analog form under the control of the second of the two additional clock signals.

4 Claims, 67 Drawing Figures

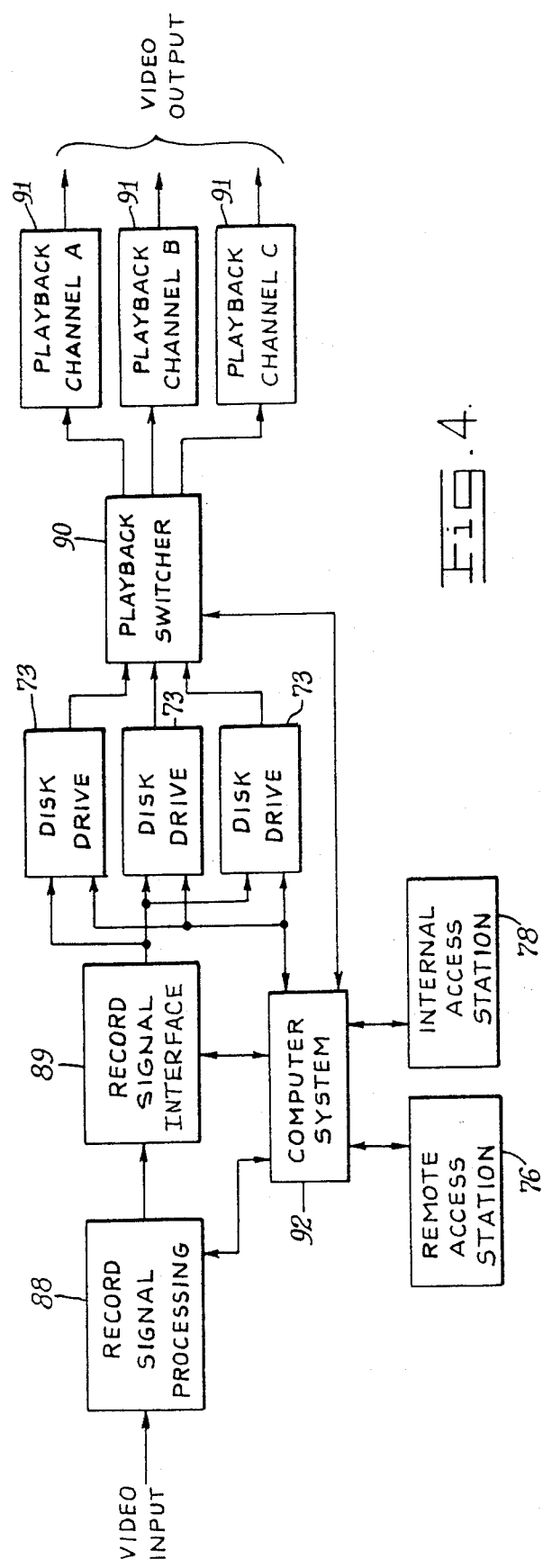
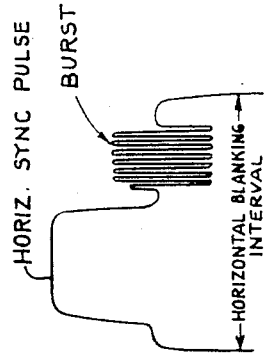
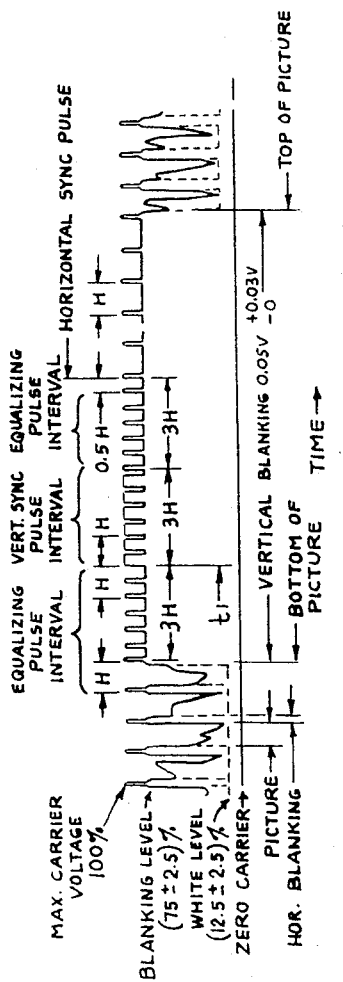

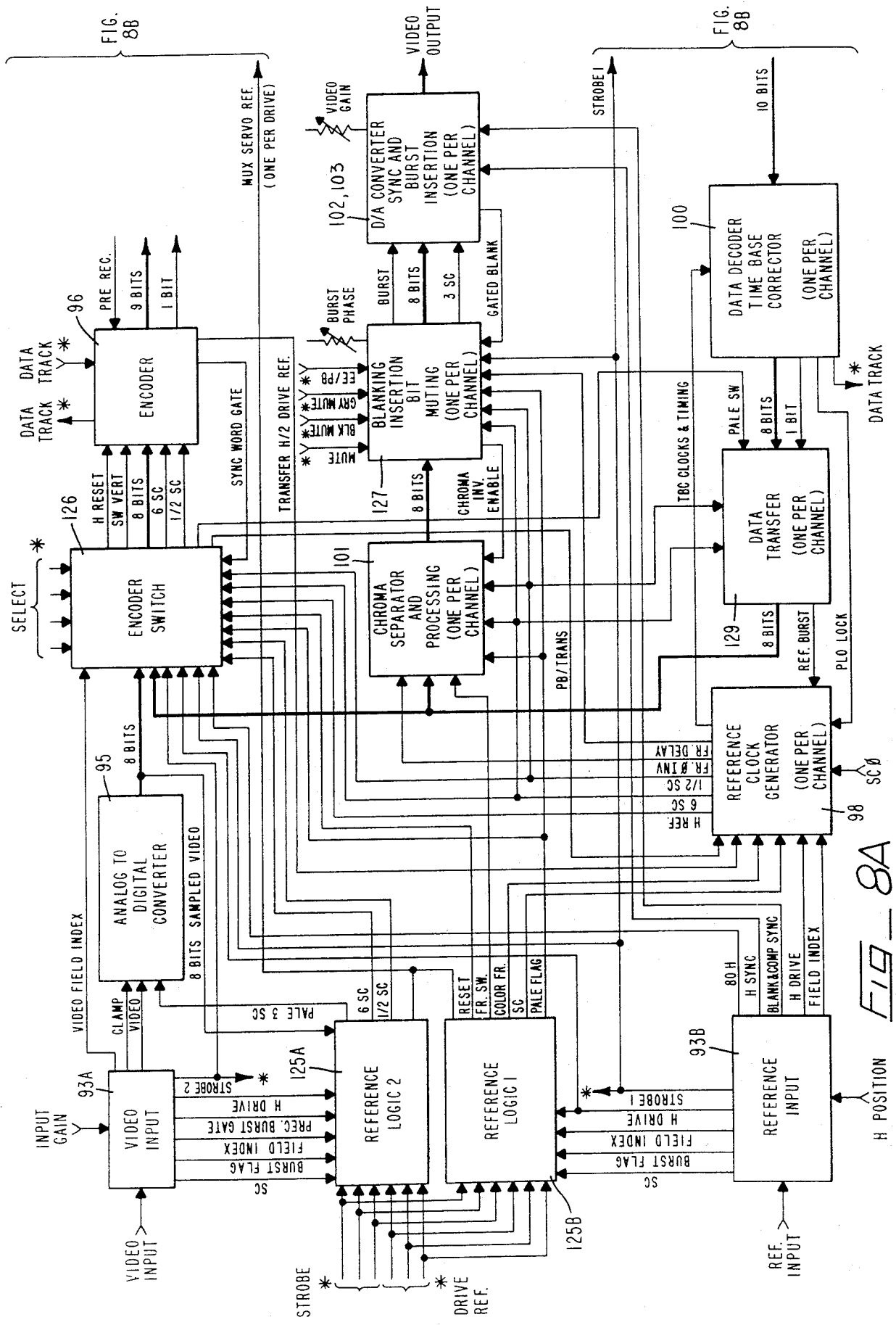

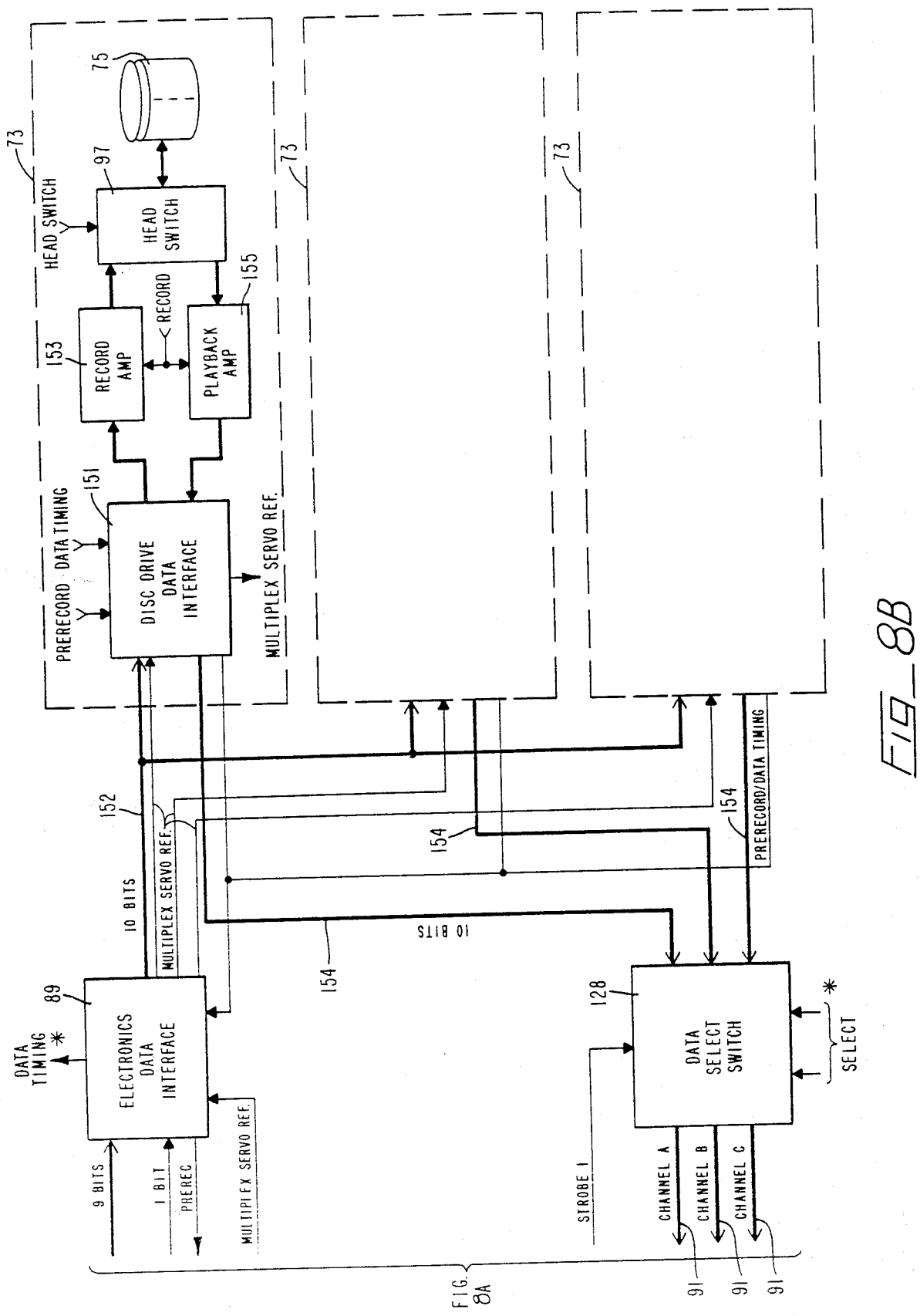

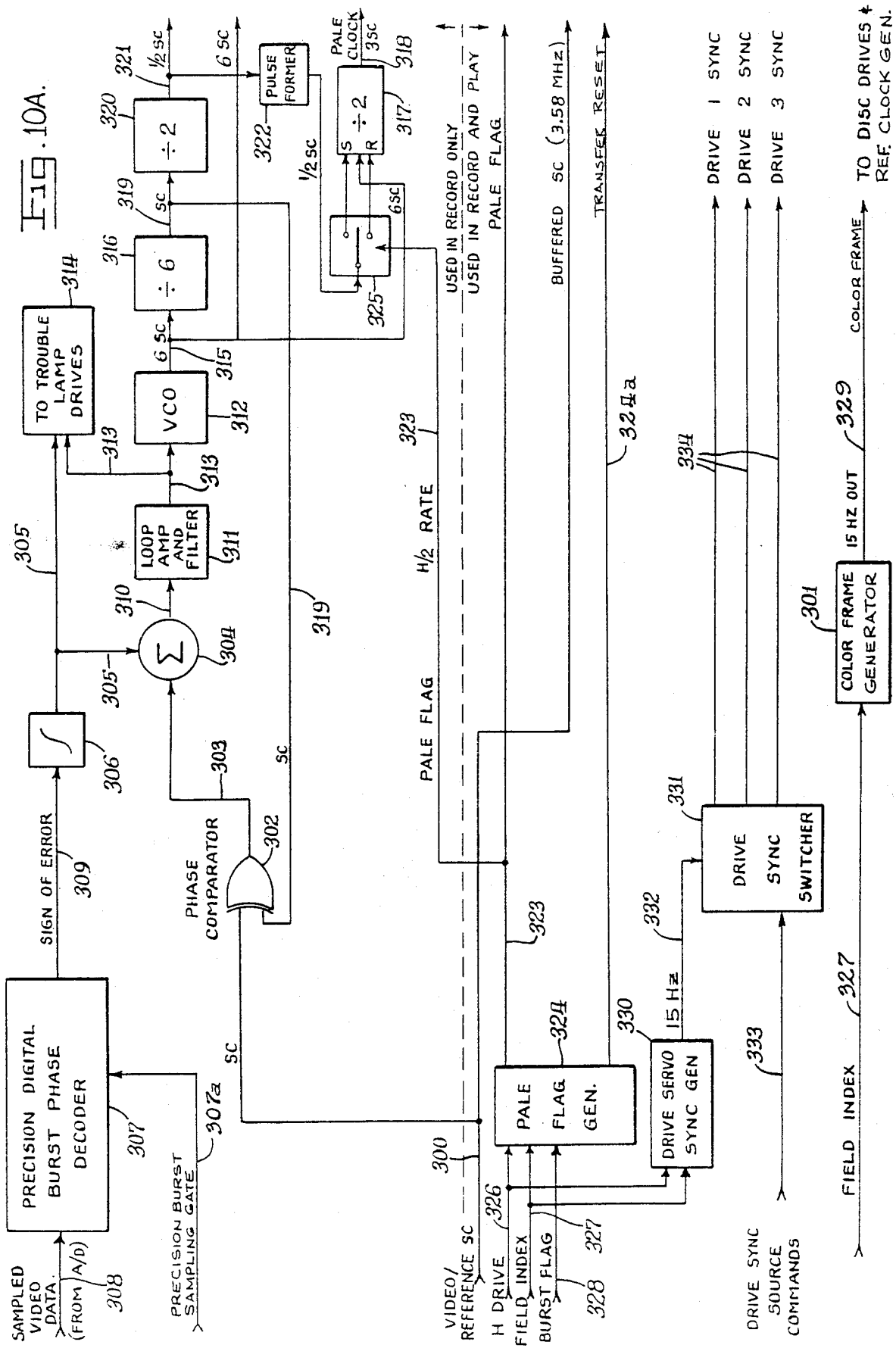

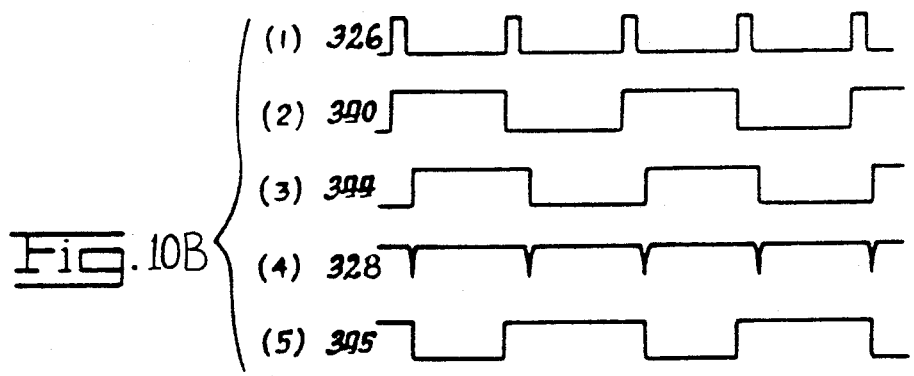

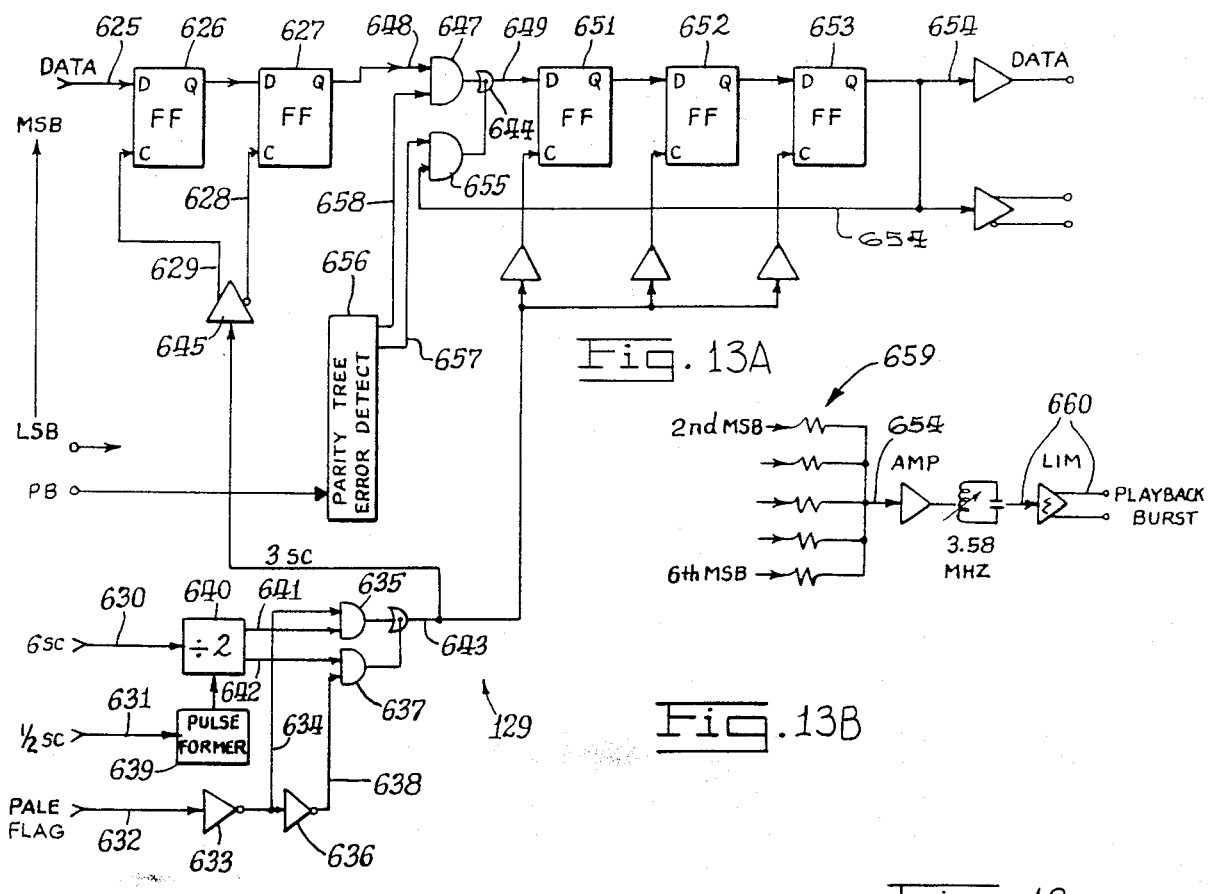
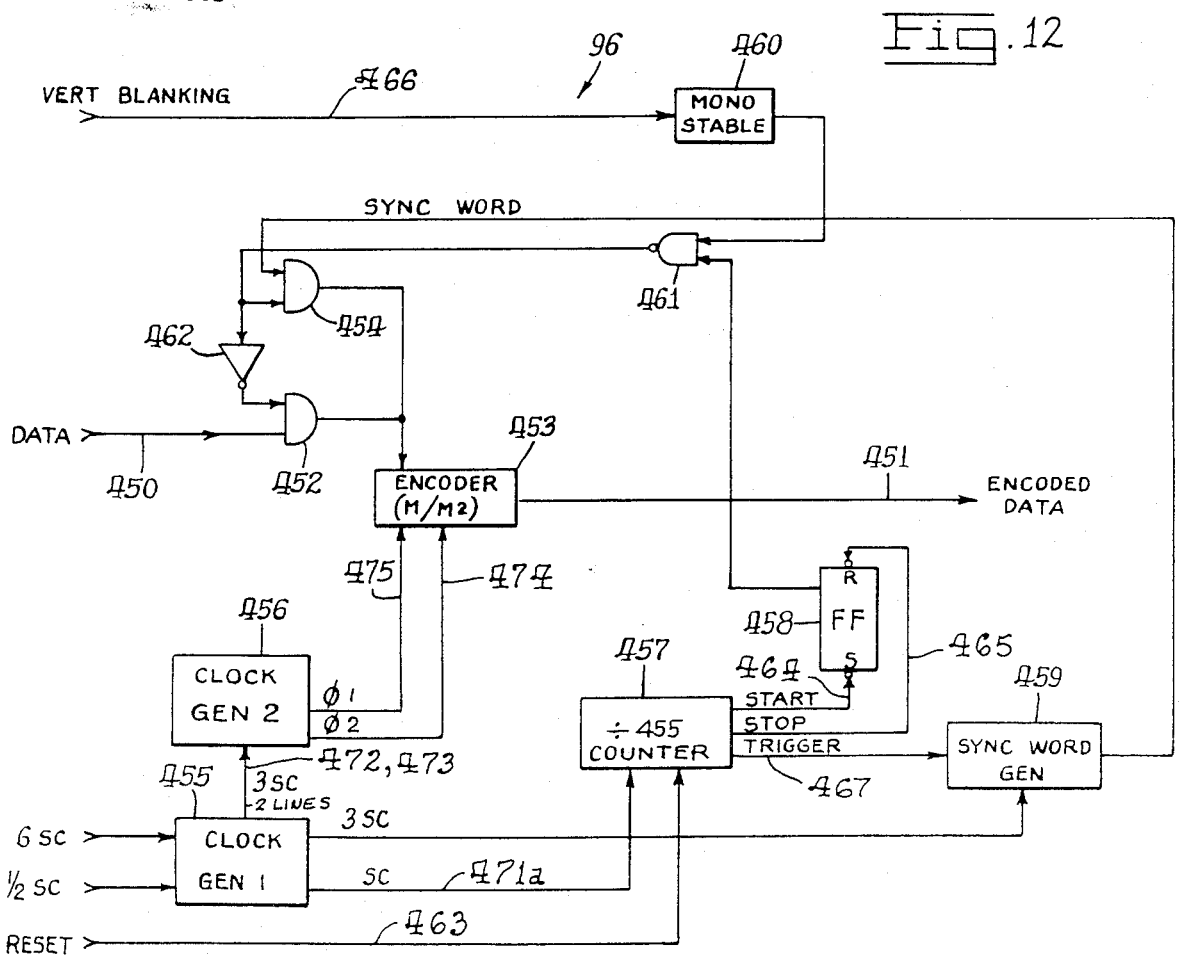

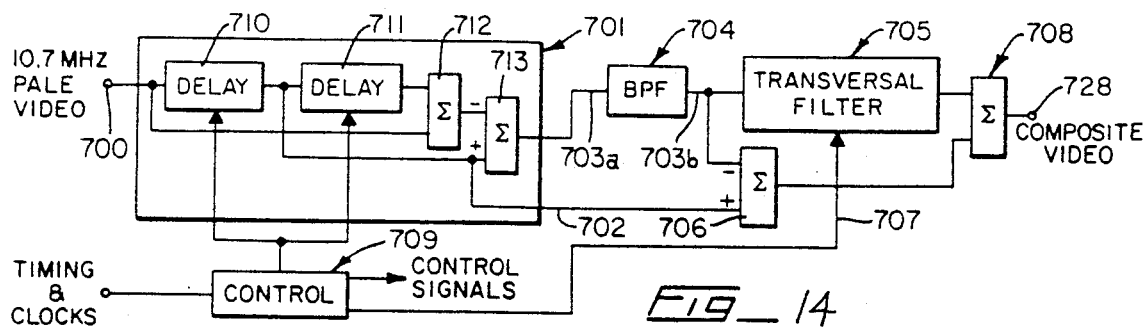
FIG_14
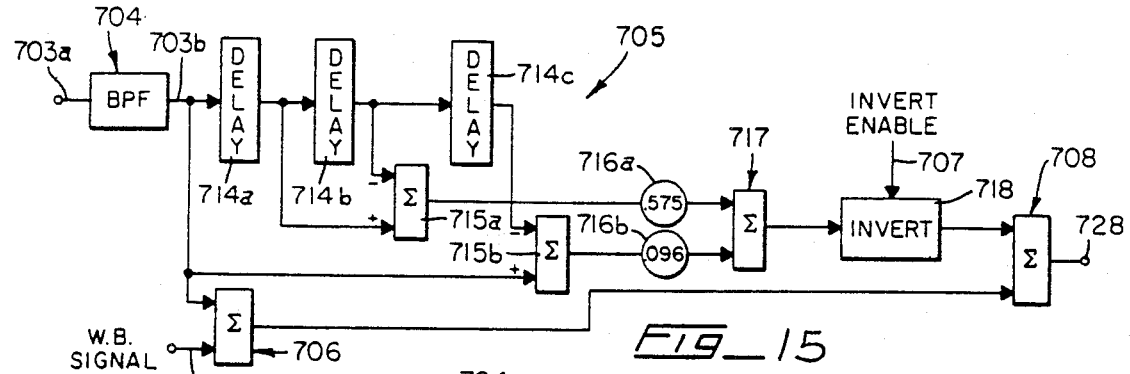
FIG_15
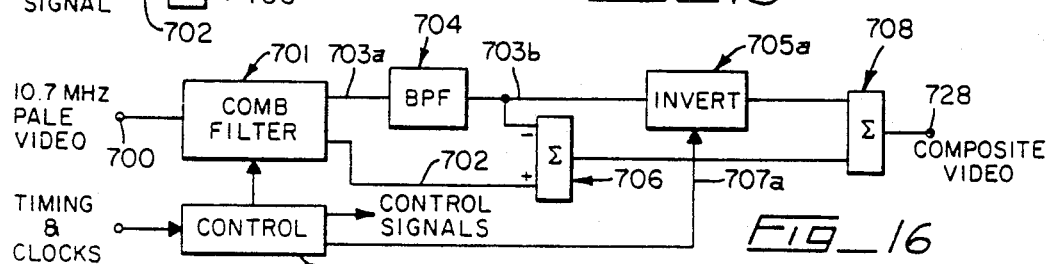
FIG_16
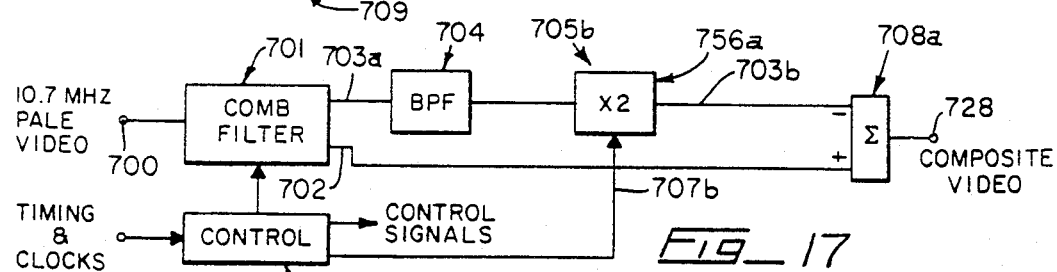
FIG_17
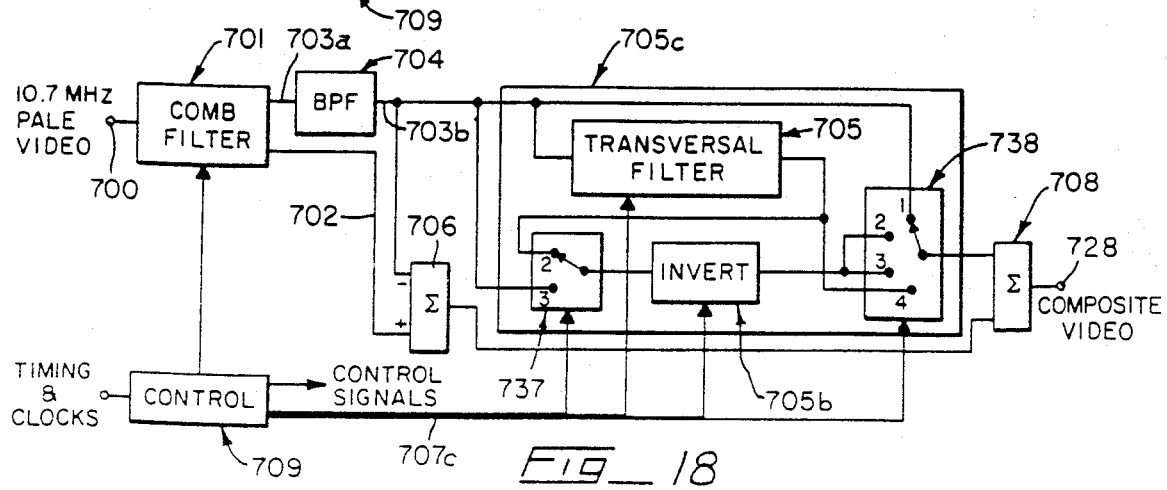
FIG_18

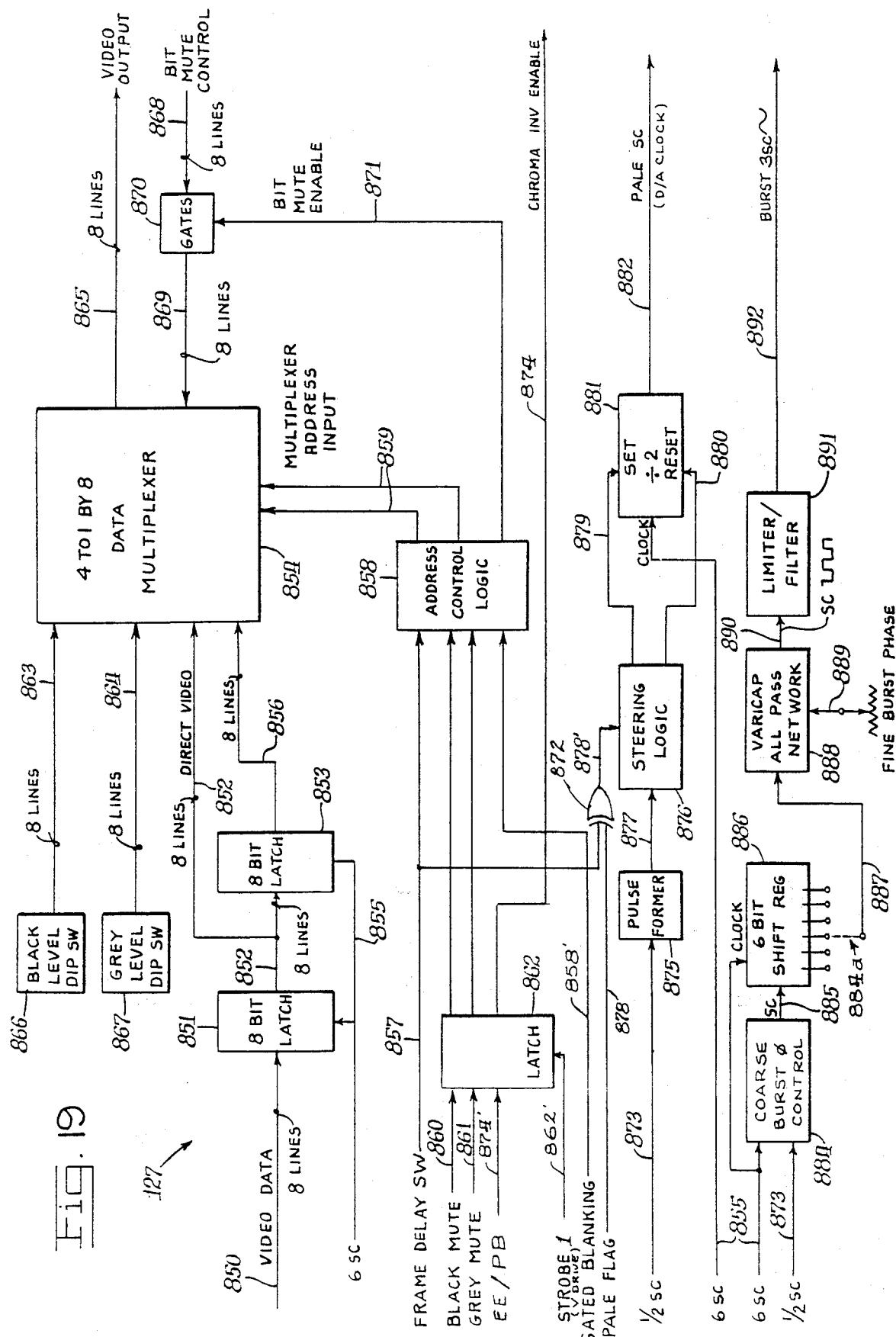

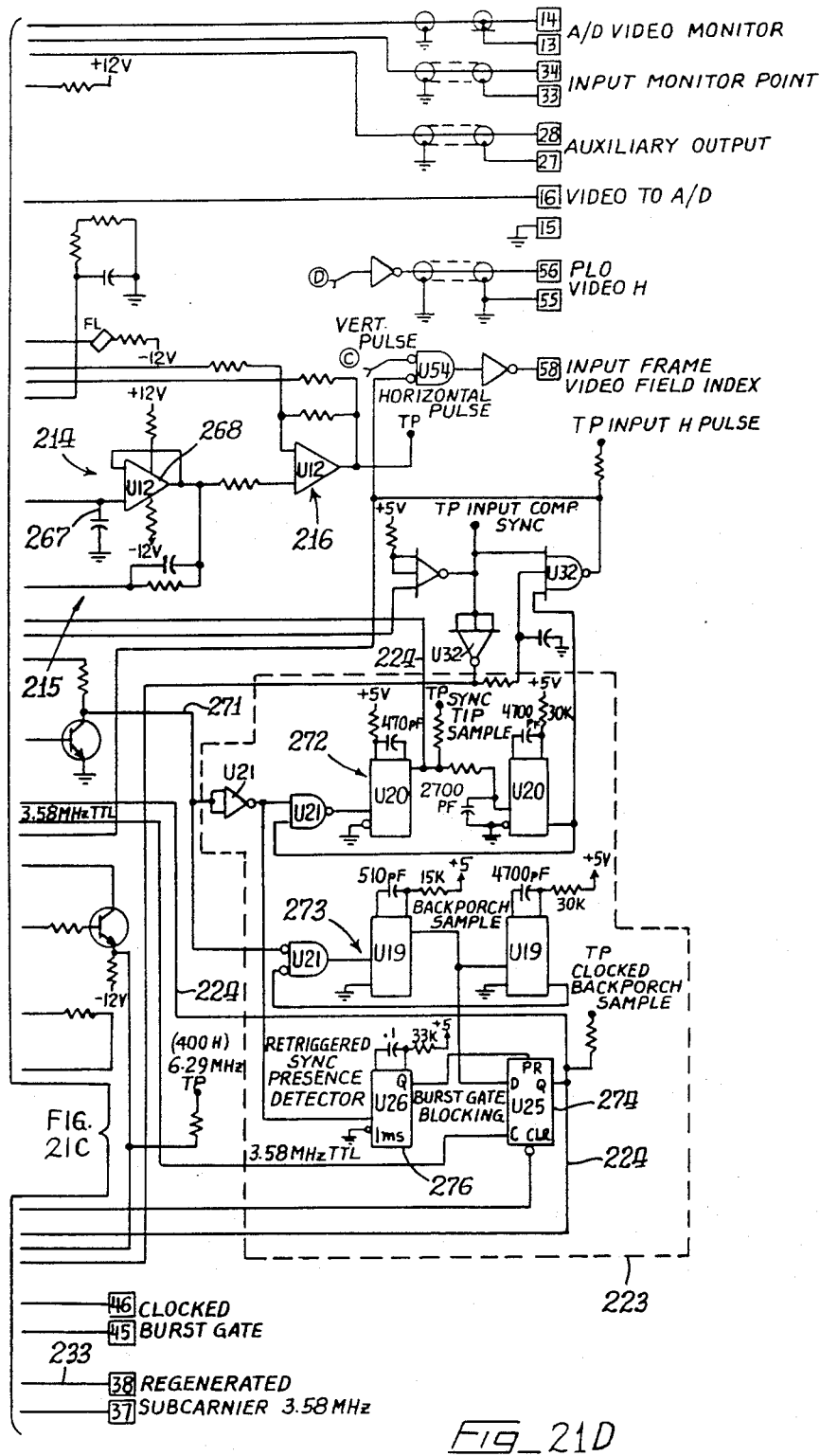
Fig_21D

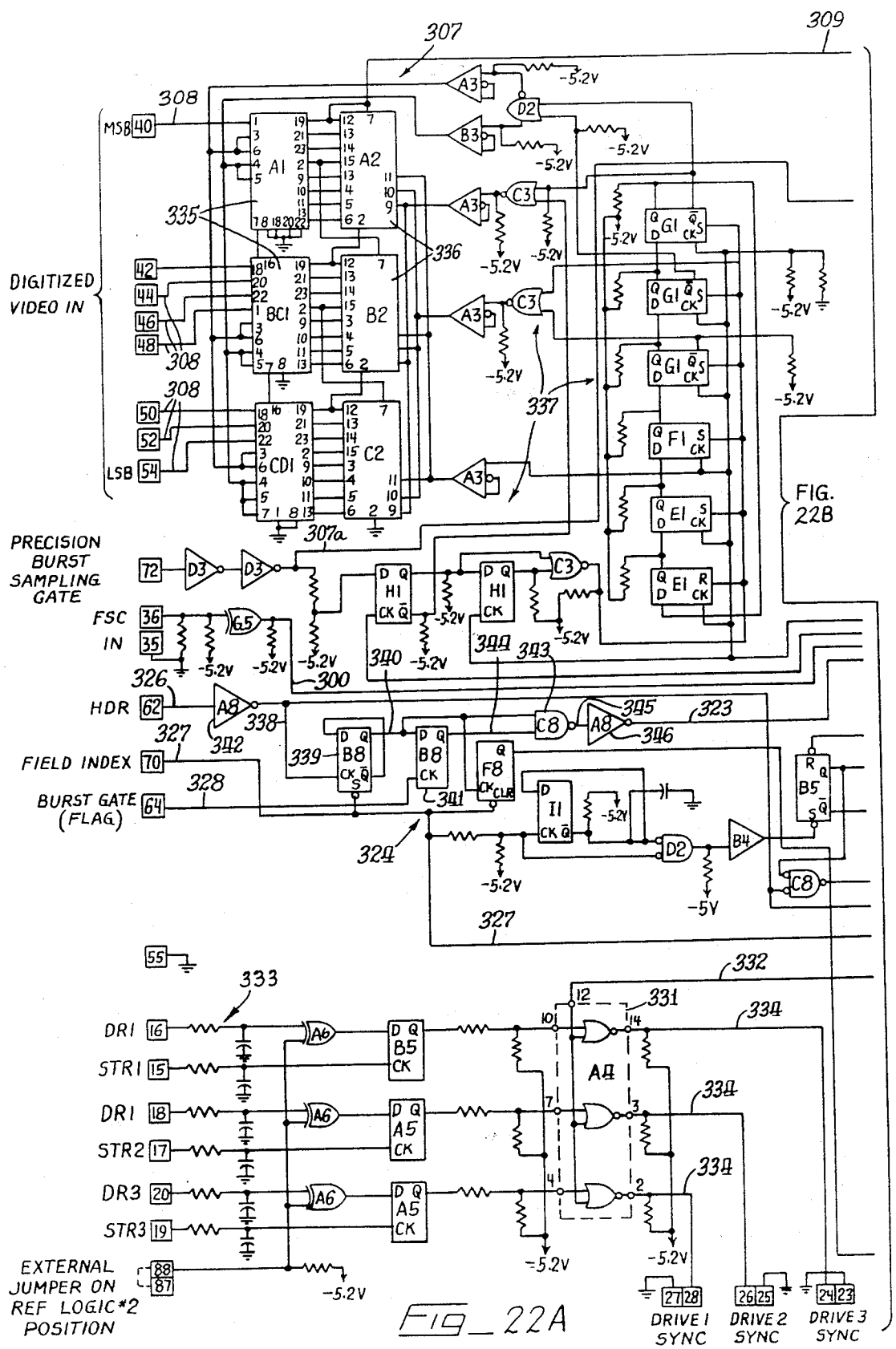

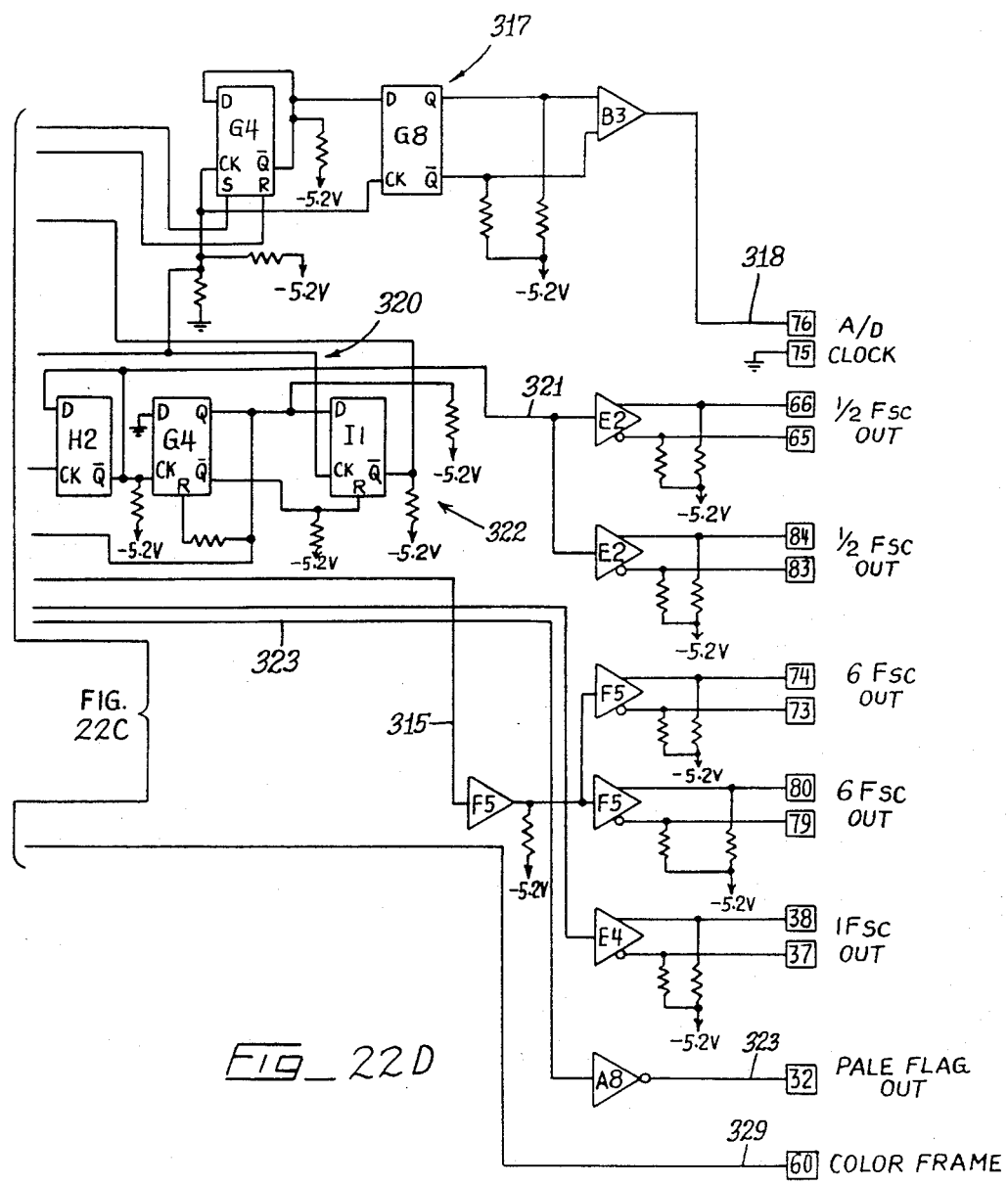

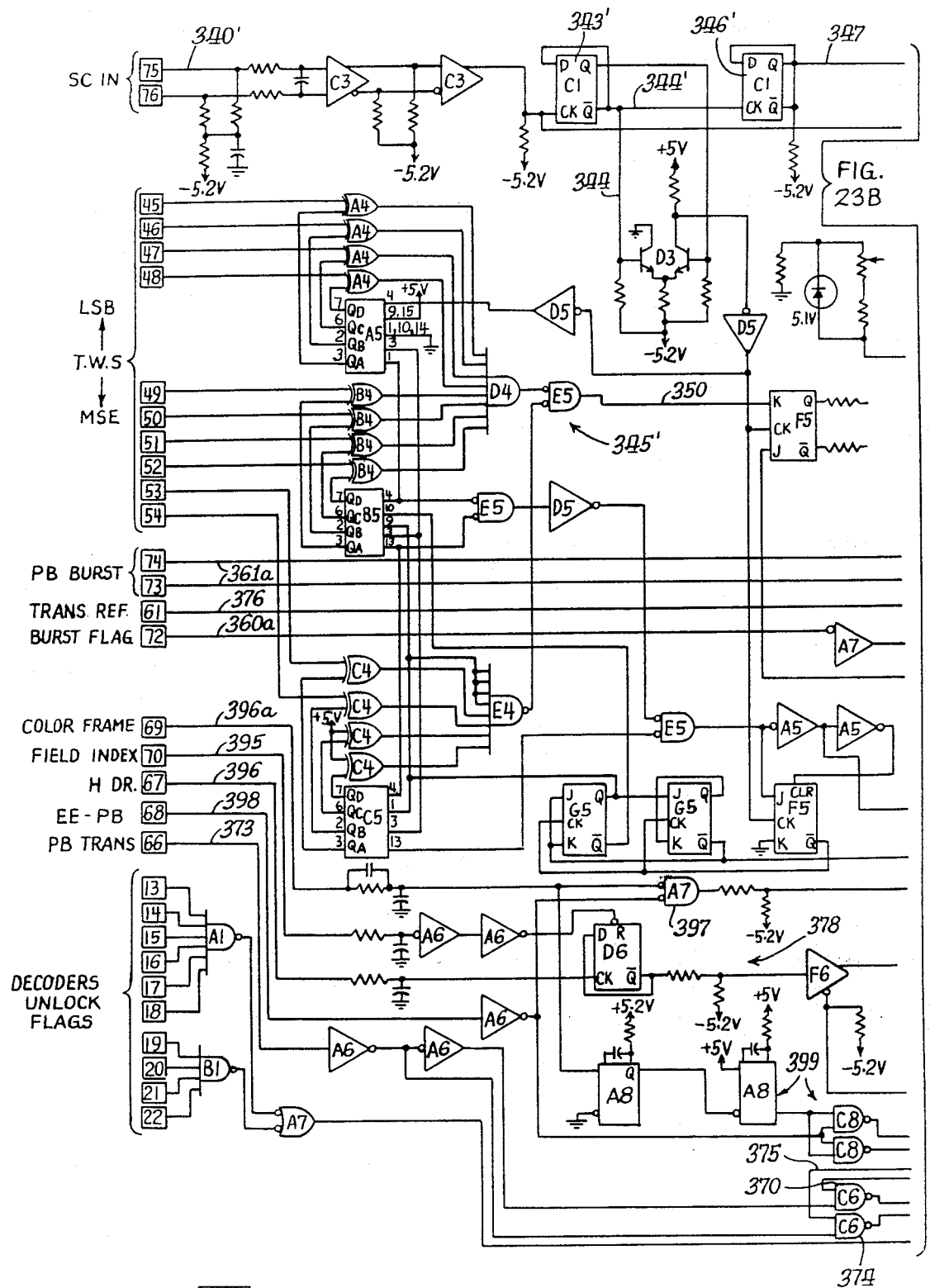
FIG_23A

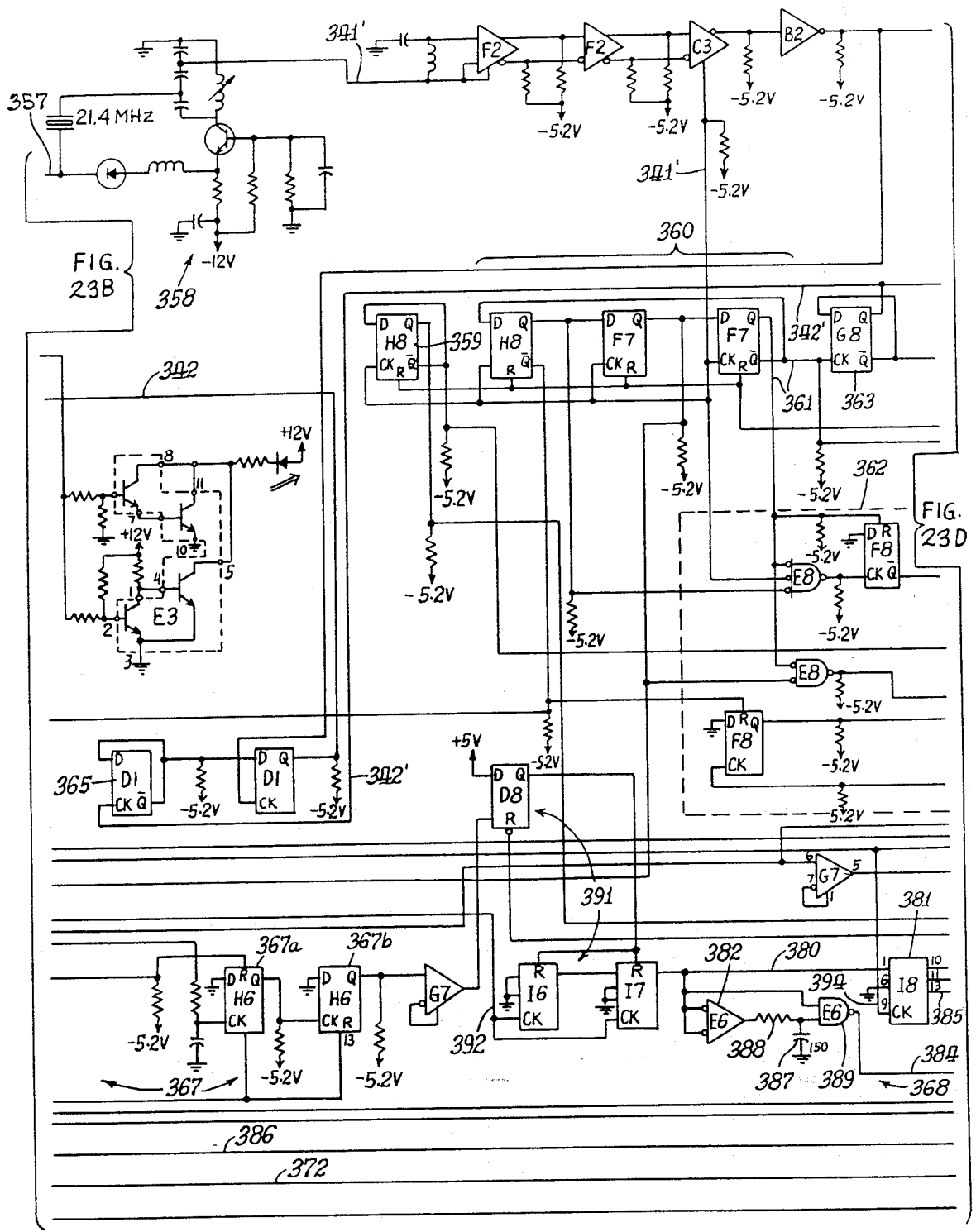
FIG_23C

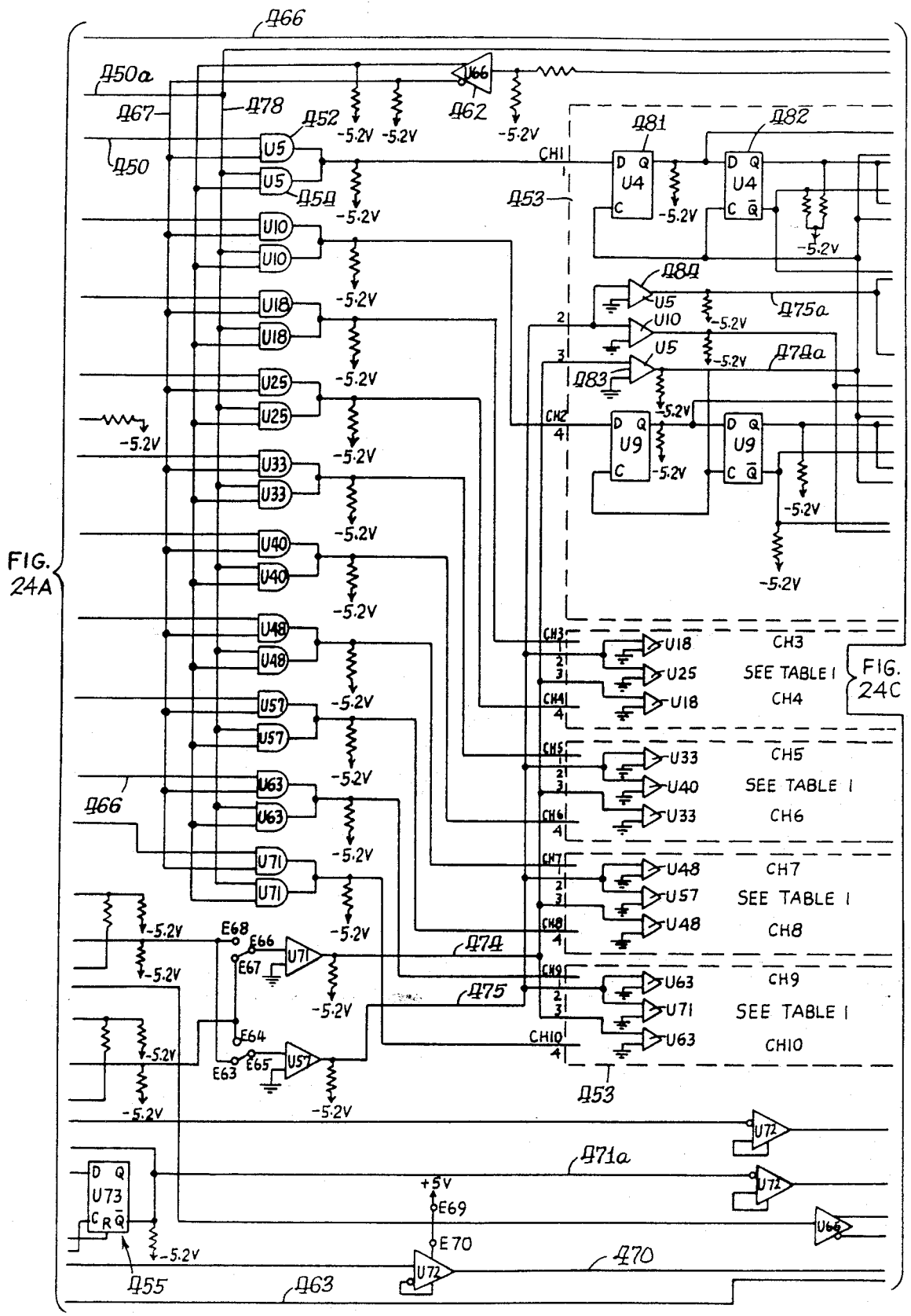
FIG_24B

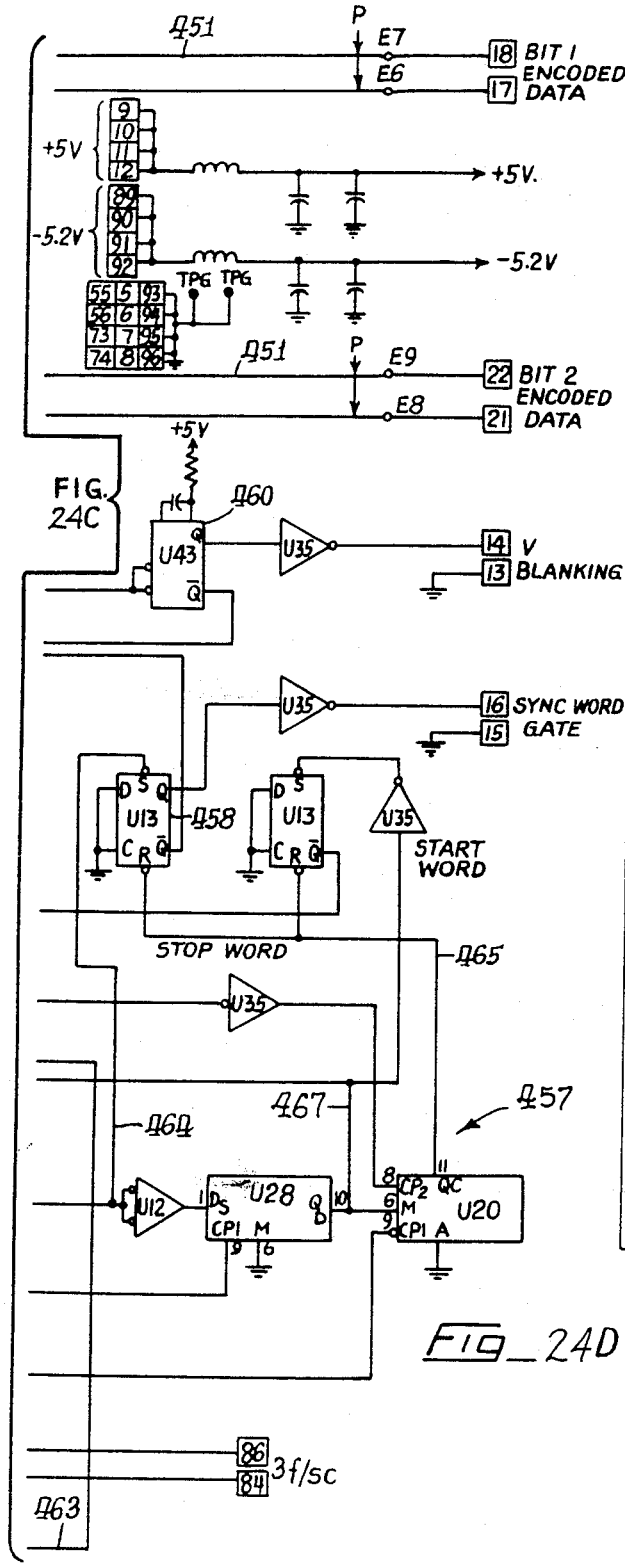

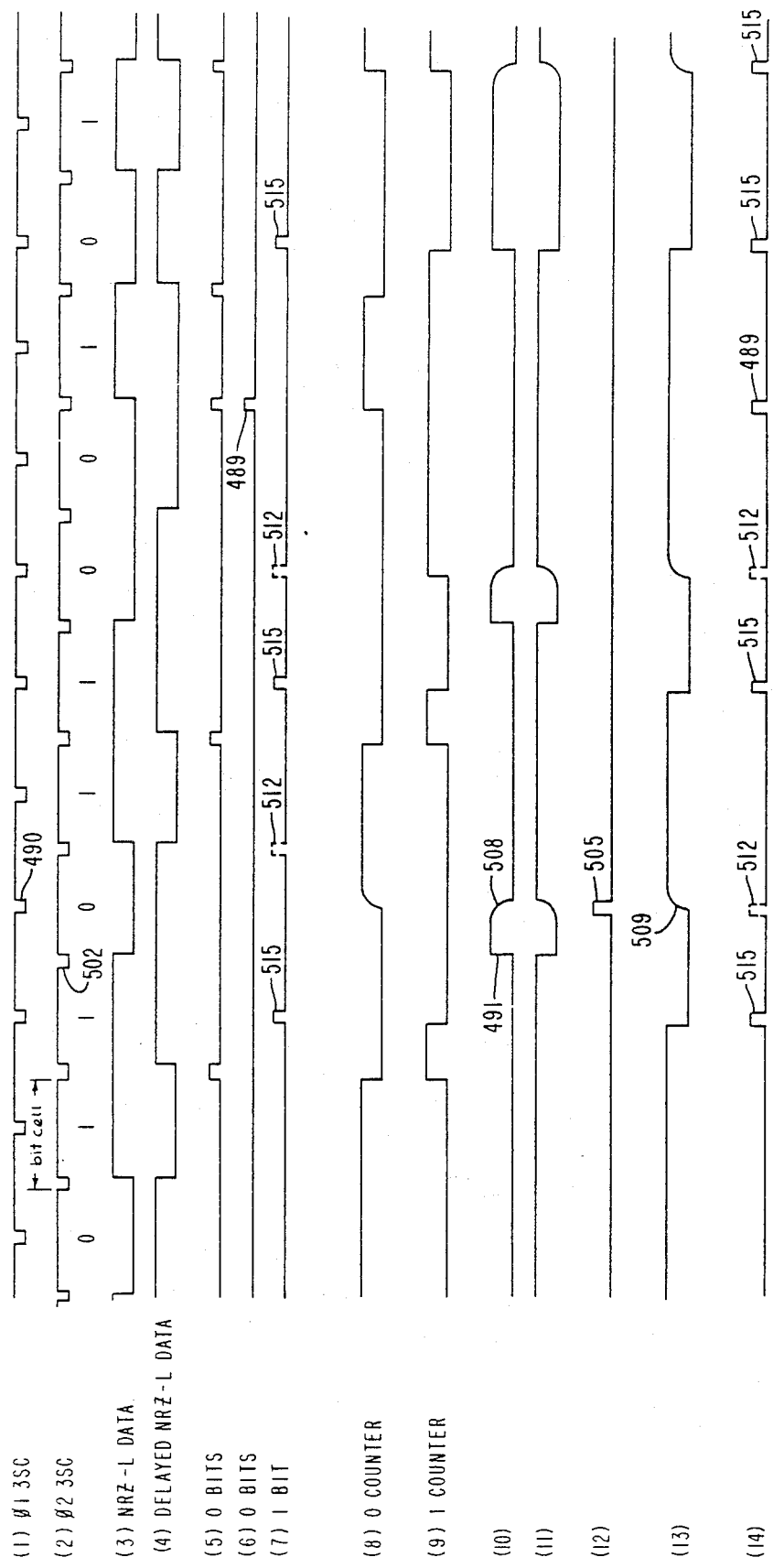
FIG_24E

FIG_25A

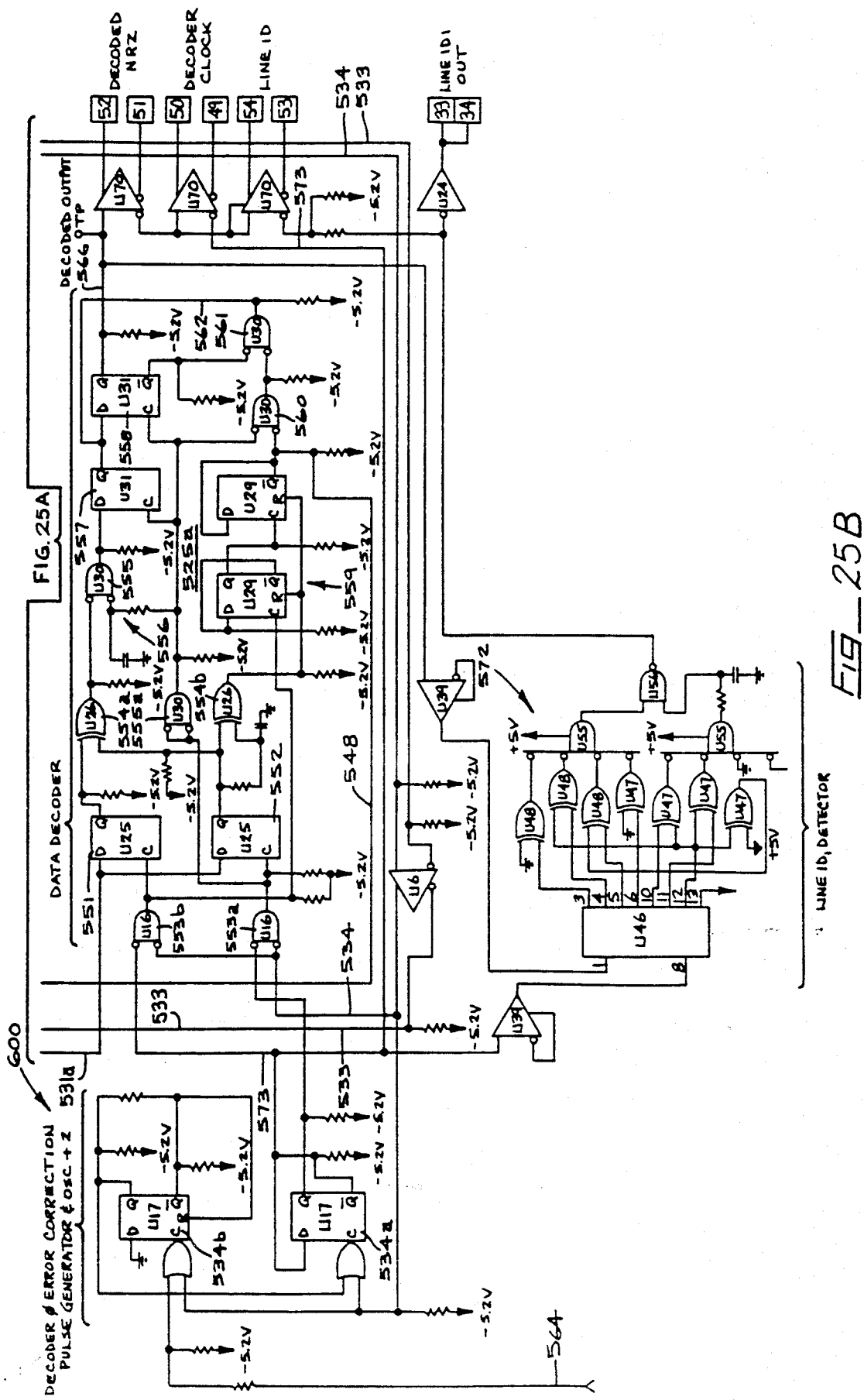

| REF. DES. | U14,56 | U10 | U23,32 | U13,18 | U17,44,45,56 | U24 | U18,19,34 | U35,66,53 | U49 | U69 | U12,41,46,48 | U5 | U45 | U27,31 | U22 |
|---|---|---|---|---|---|---|---|---|---|---|---|---|---|---|---|
| AMPEX P/N | 586-075 | 586-077 | 586-108 | 586-104 | 586-287 | 586-326 | 586-445 | 586-497 | 586-550 | 586-488 | 586-705 | 586-830 | 586-831 | 587-018 | 586-277 |
| VENDOR P/N | 7400 | 7420 | 7474 | 7402 | 74H51 | 7404 | 7415 | 7445 | 7482 | 74H04 | 7486 | 74500 | 74504 | 74510 | 74502 |
| VOLT. PIN | +5V(14) | +5V(14) | +5V(14) | +5V(14) | +5V(14) | +5V(14) | +5V(6) | +5V(14) | +5V(4) | +5V(14) | +5V(14) | +5V(14) | +5V(14) | +5V(14) | +5V(14) |
| GND. PIN | 7 | 7 | 7 | 7 | 7 | 7 | 12 | 7 | 11 | 7 | 7 | 7 | 7 | 7 | 7 |
| REF. DES. | U21 | U11,46,65 | U35,41 | U3,4,9 | U61 | U5,52,53,60,61,68 | U55,3 | U39 | | U2,6,10 | U7,15,17,45,24,31 | U26 | U1 | U28 | U20,36,40,54,67 |
| AMPEX P/N | 587-710 | 586-450 | 587-495 | 587-007 | 587-127 | 587-040 | 587-051 | | | 587-704 | 587-129 | 587-205 | 589-129 | 586-700 | 586-600 |
| VENDOR P/N | 745114 | 74164 | 74263 | 9305 | 9338 | 93410 | | | 10125 | 10131 | 10107 | 10102 | CA3102 | 74H74 | 74193 |
| VOLT. PIN | +5V(16) | +5V(4) | +5V(16) | +5V(14) | +5V(16) | +5V(14) | +5V(14) | | -5.2V(8) | -5.2V(8) | -5.2V(8) | -5.2V(8) | 5.2V(6) | +5V(14) | +5V(16) |
| GND. PIN | 8 | 7 | 8 | 7 | 8 | 7 | 16 | | 1,16 | 1,16 | 1,16 | 1,16 | 1,16 | 7 | 8 |

INTEGRATED CIRCUIT LIST

FIG_25C

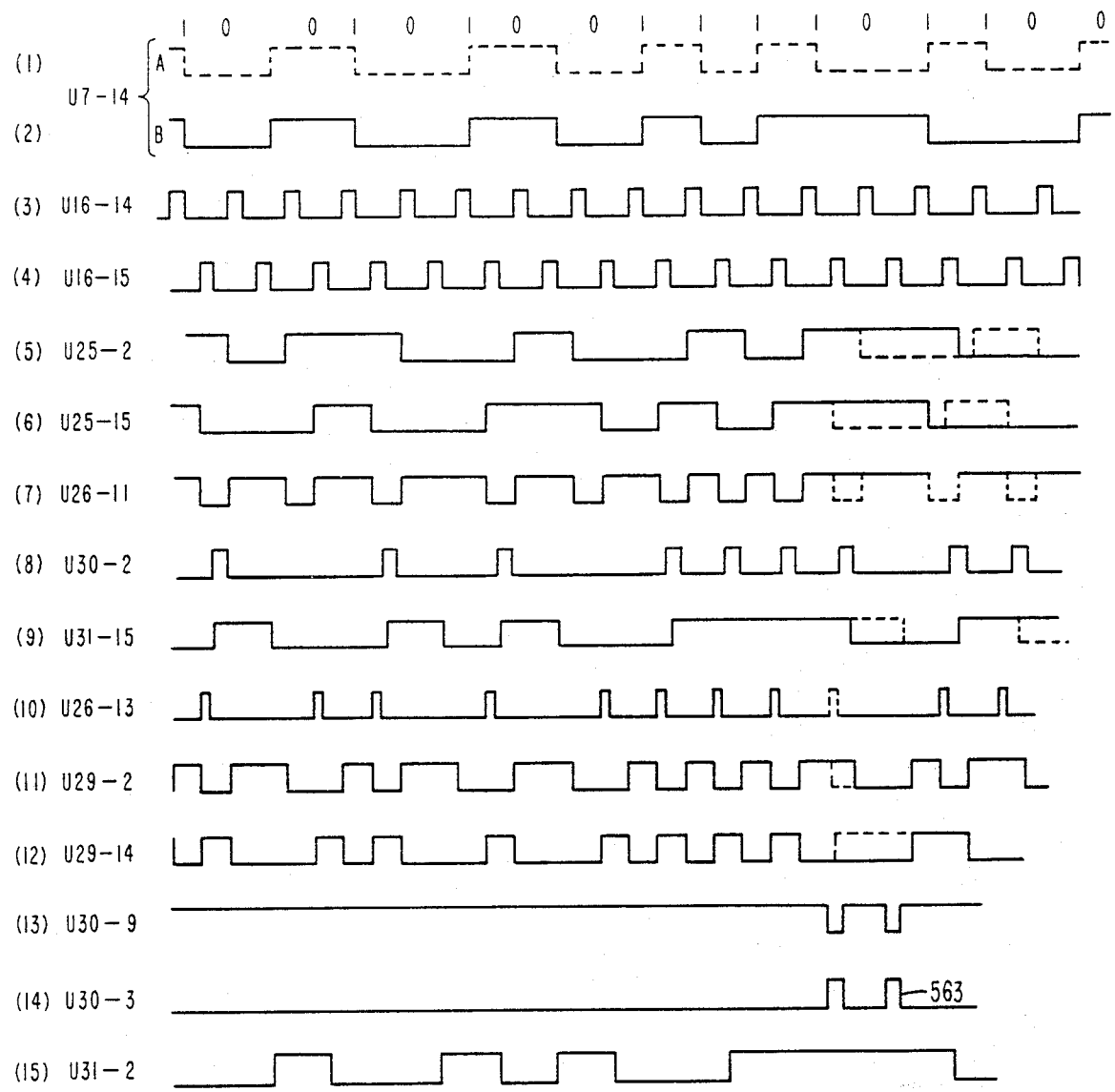
FIG_25D

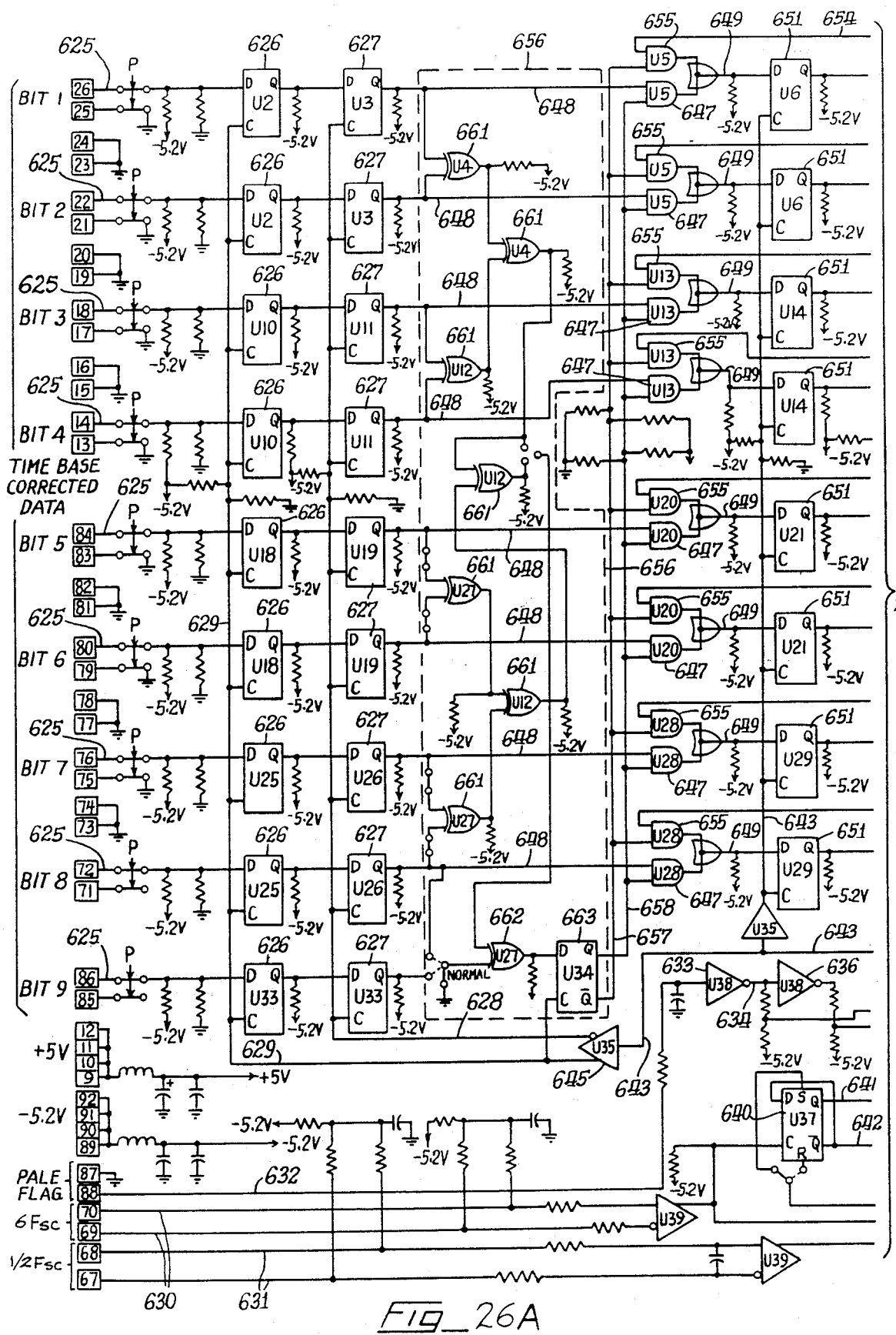

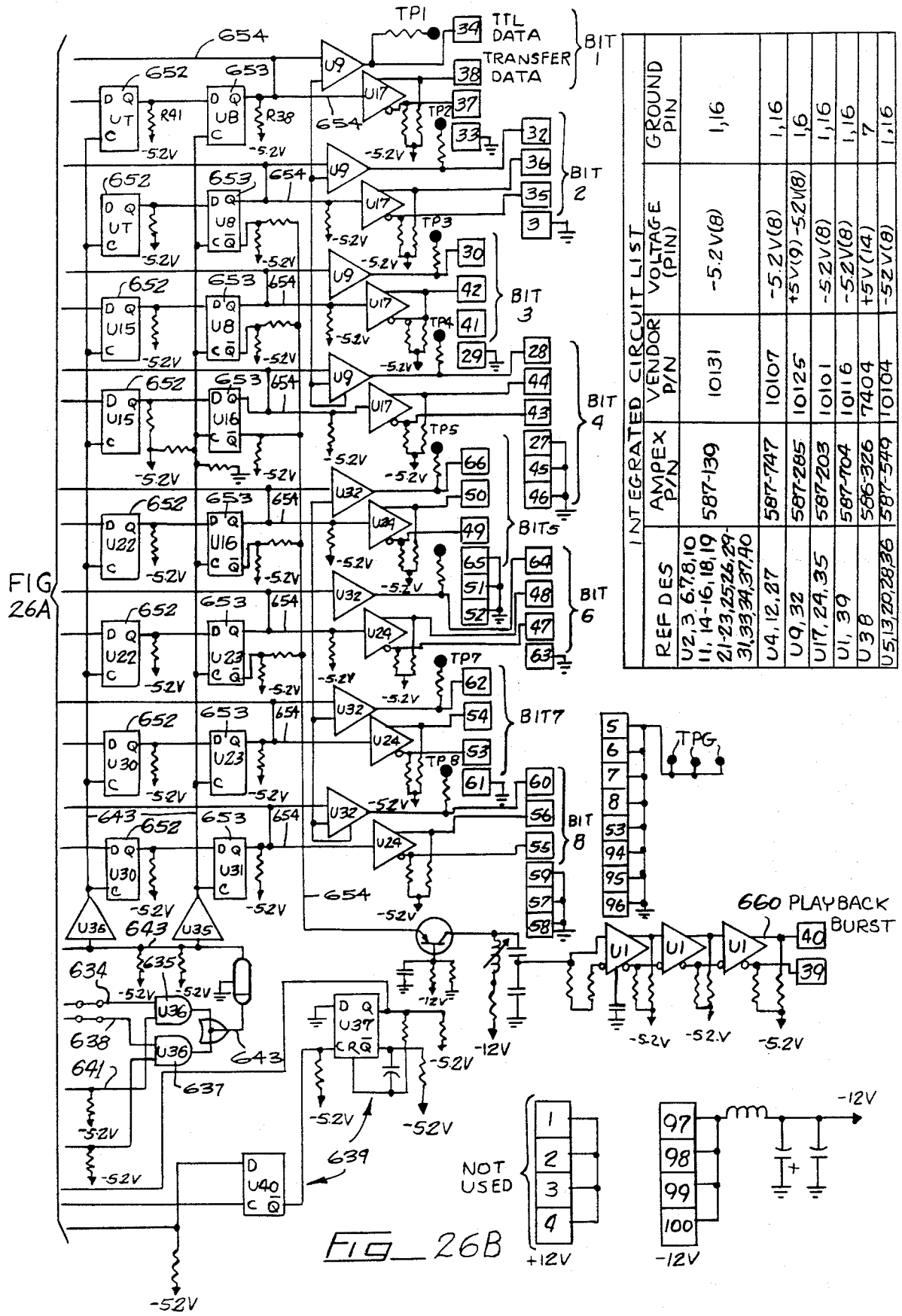

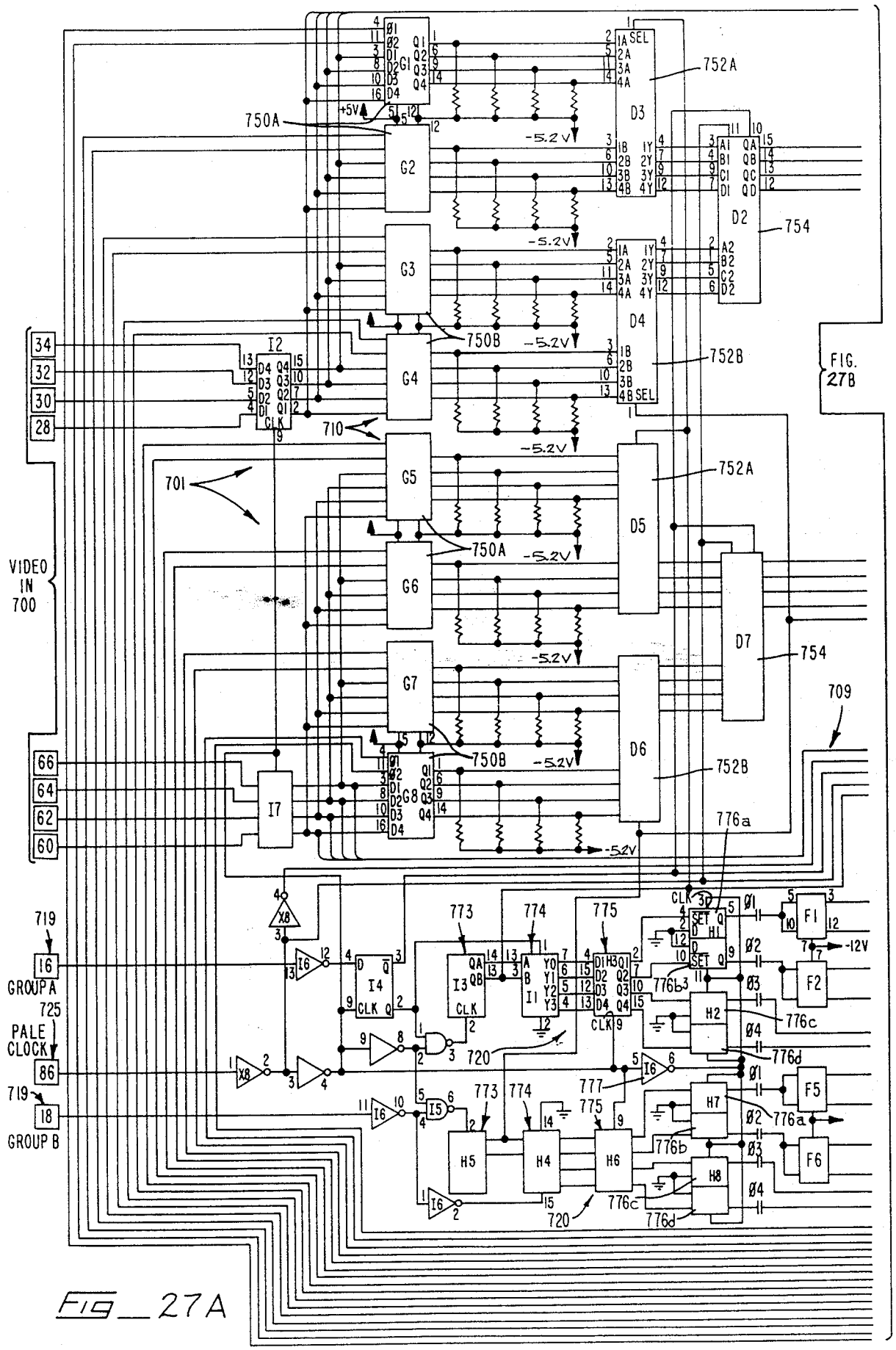

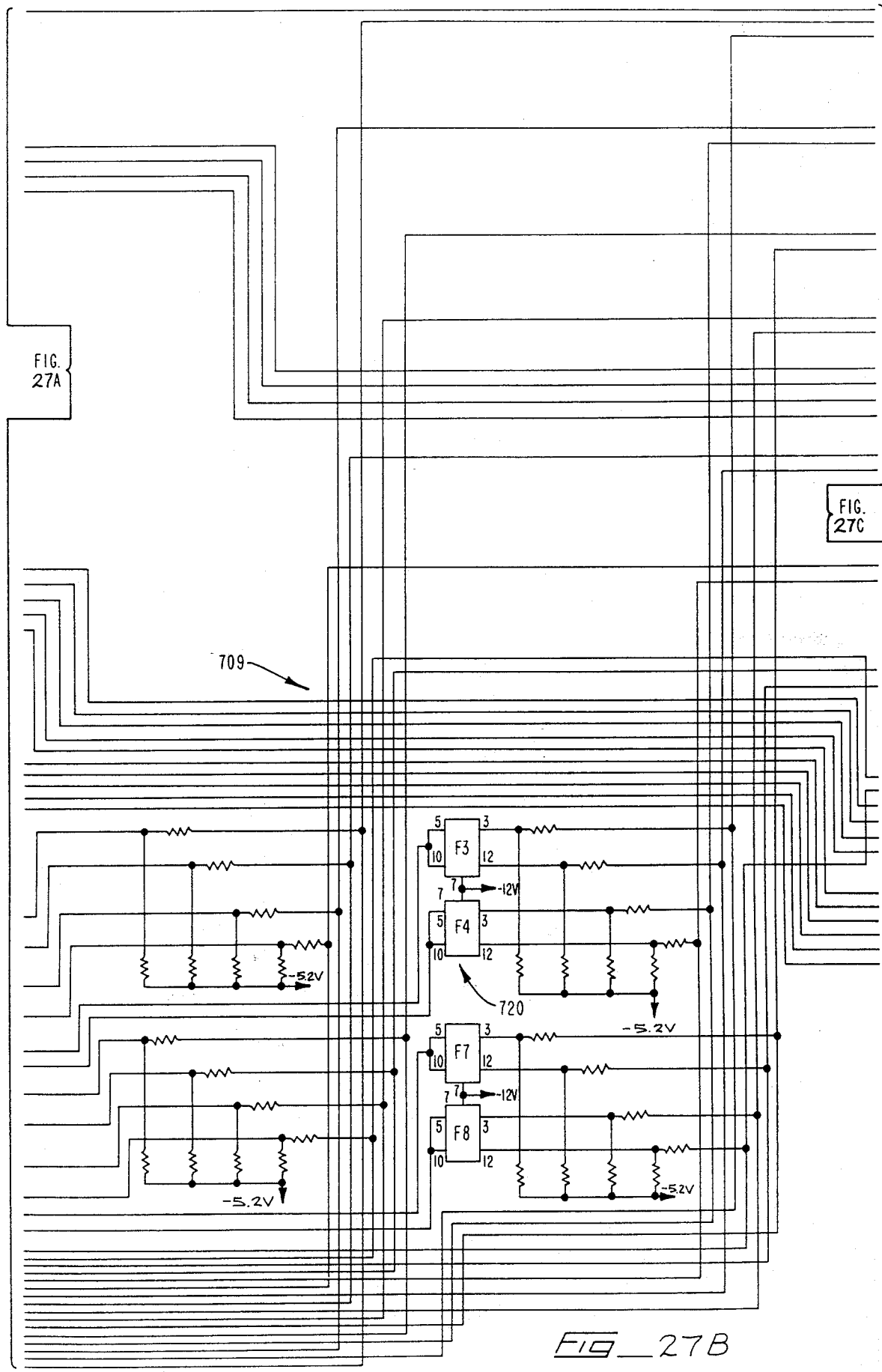
FIG_27B

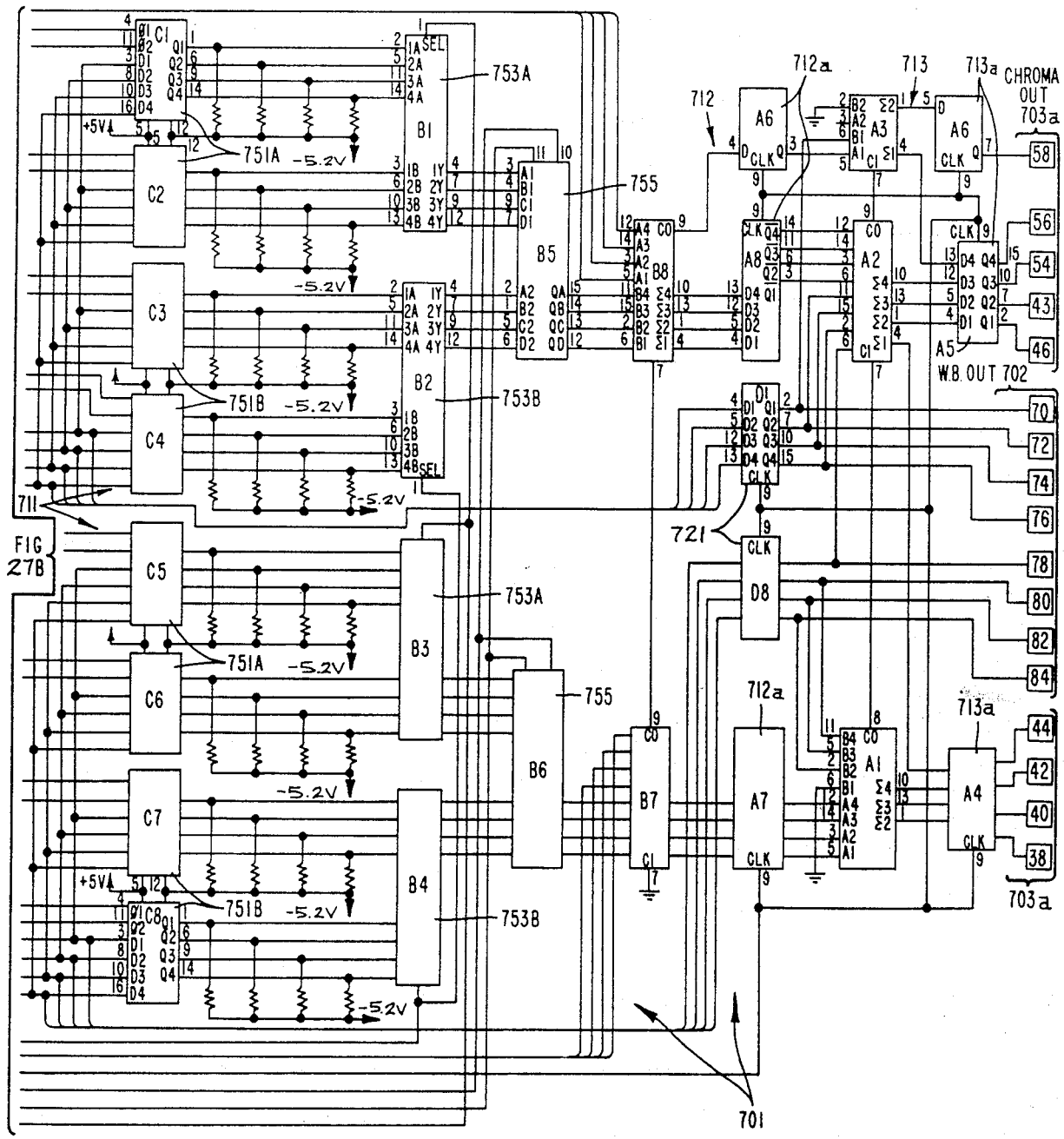
Fig_27C

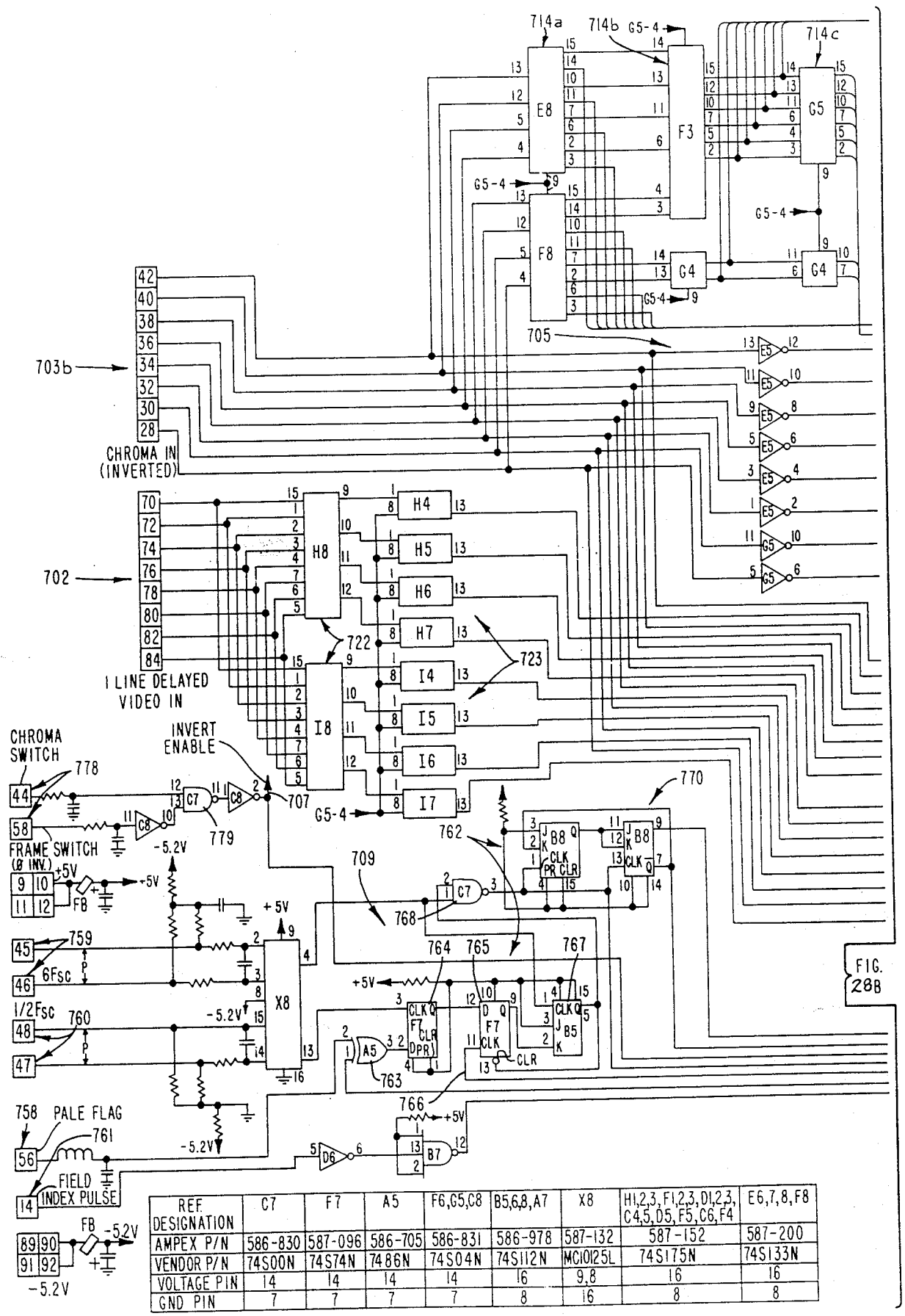
FIG_28A

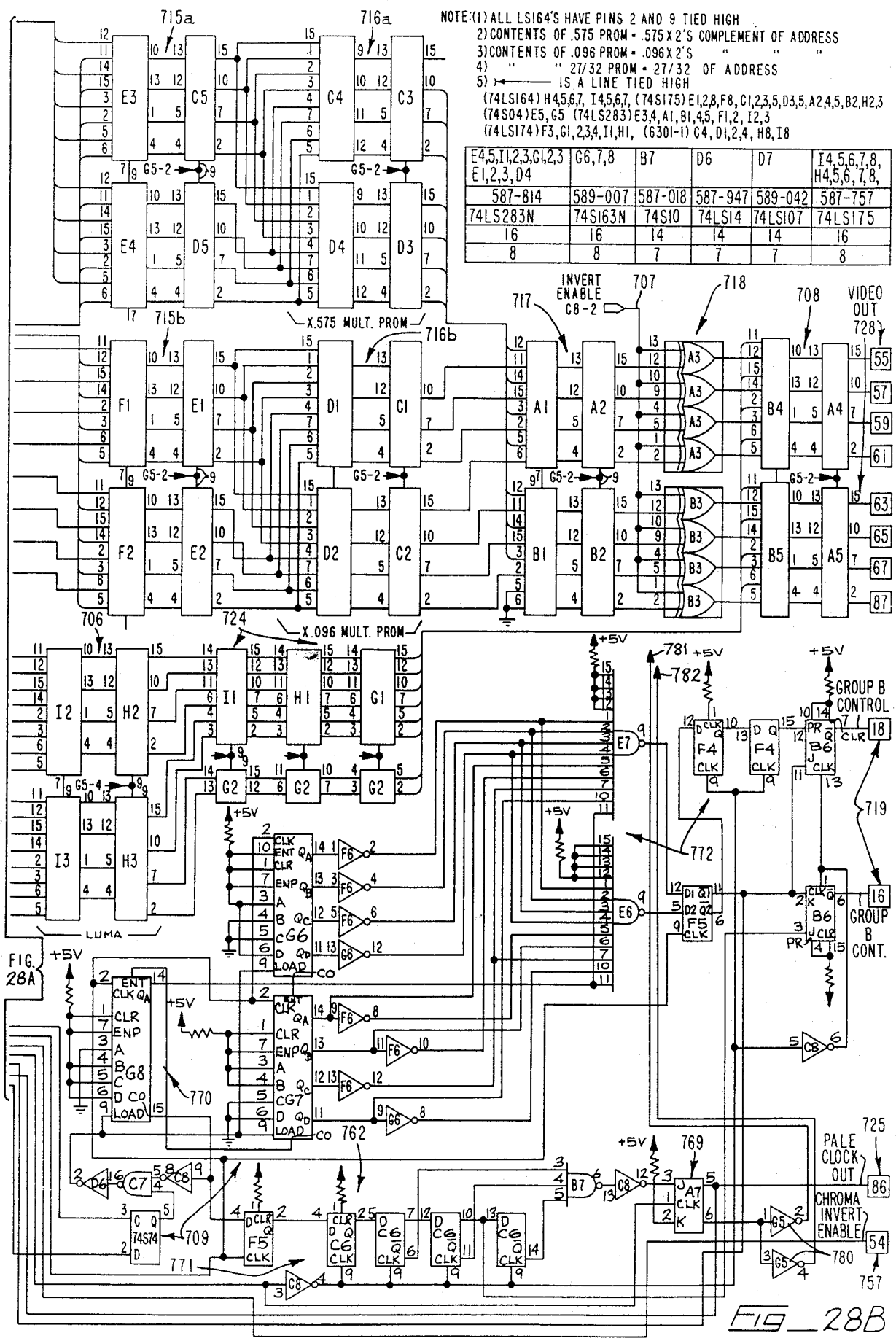

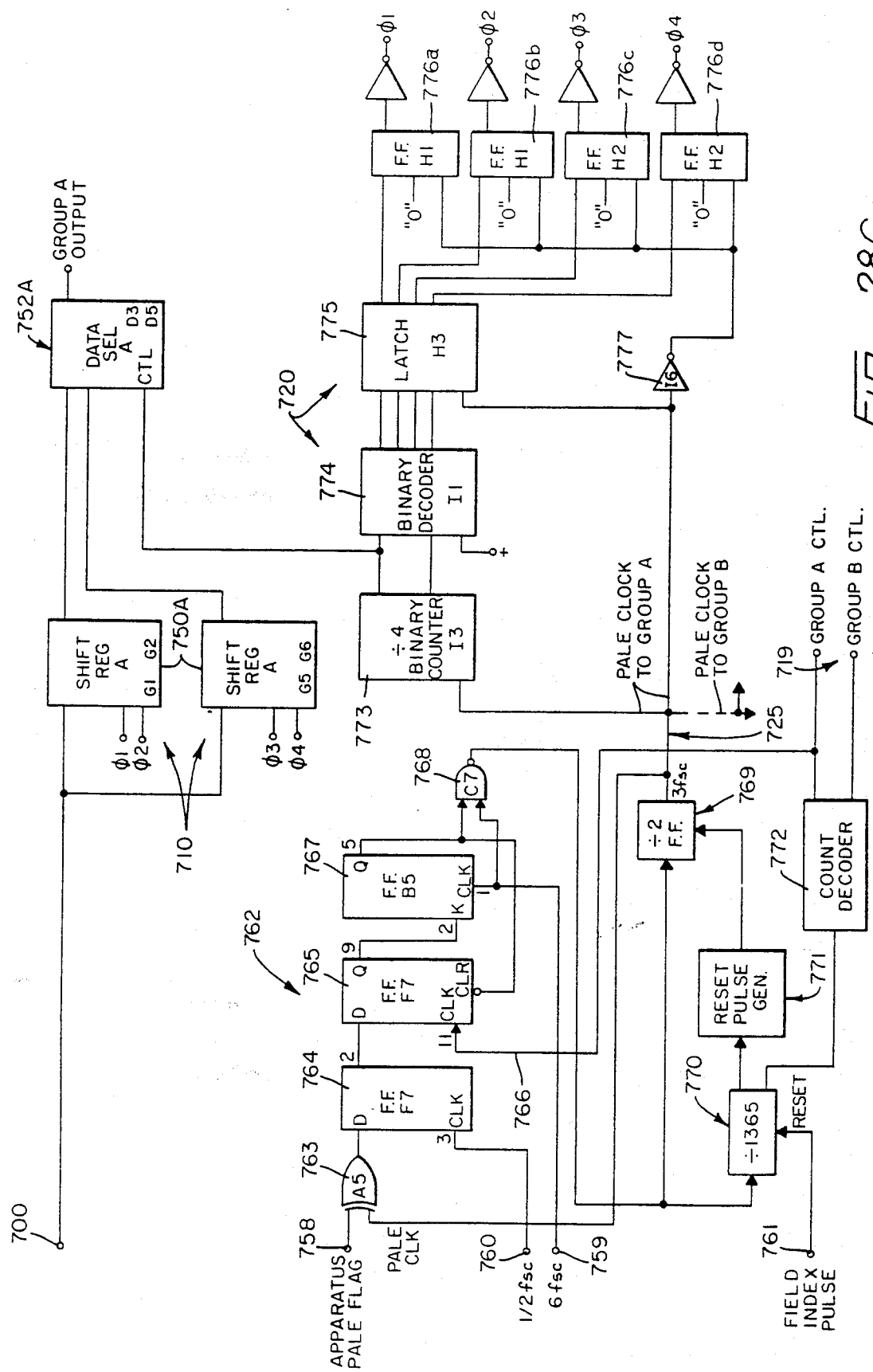
Fig_28C

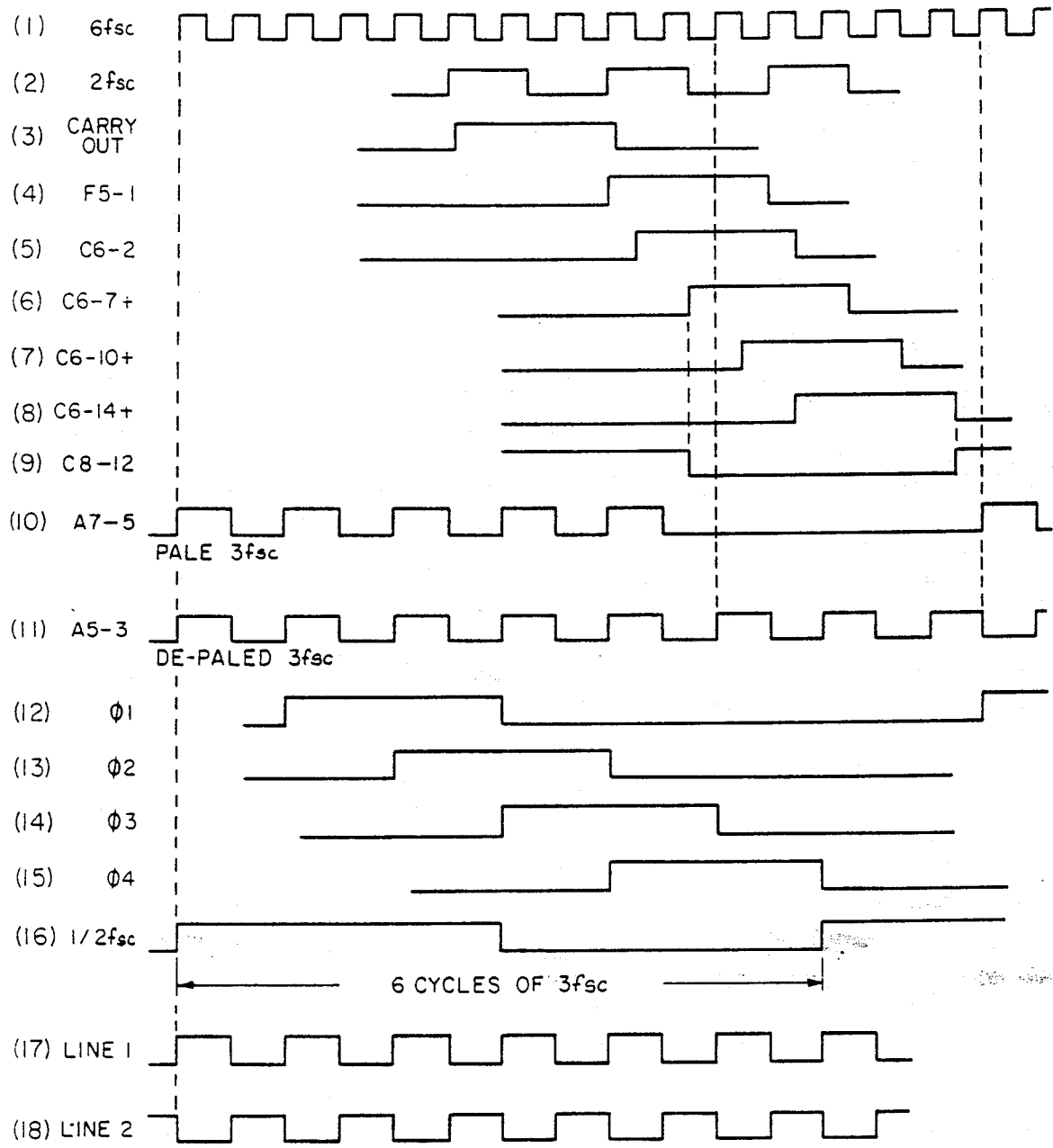
FIG_28D

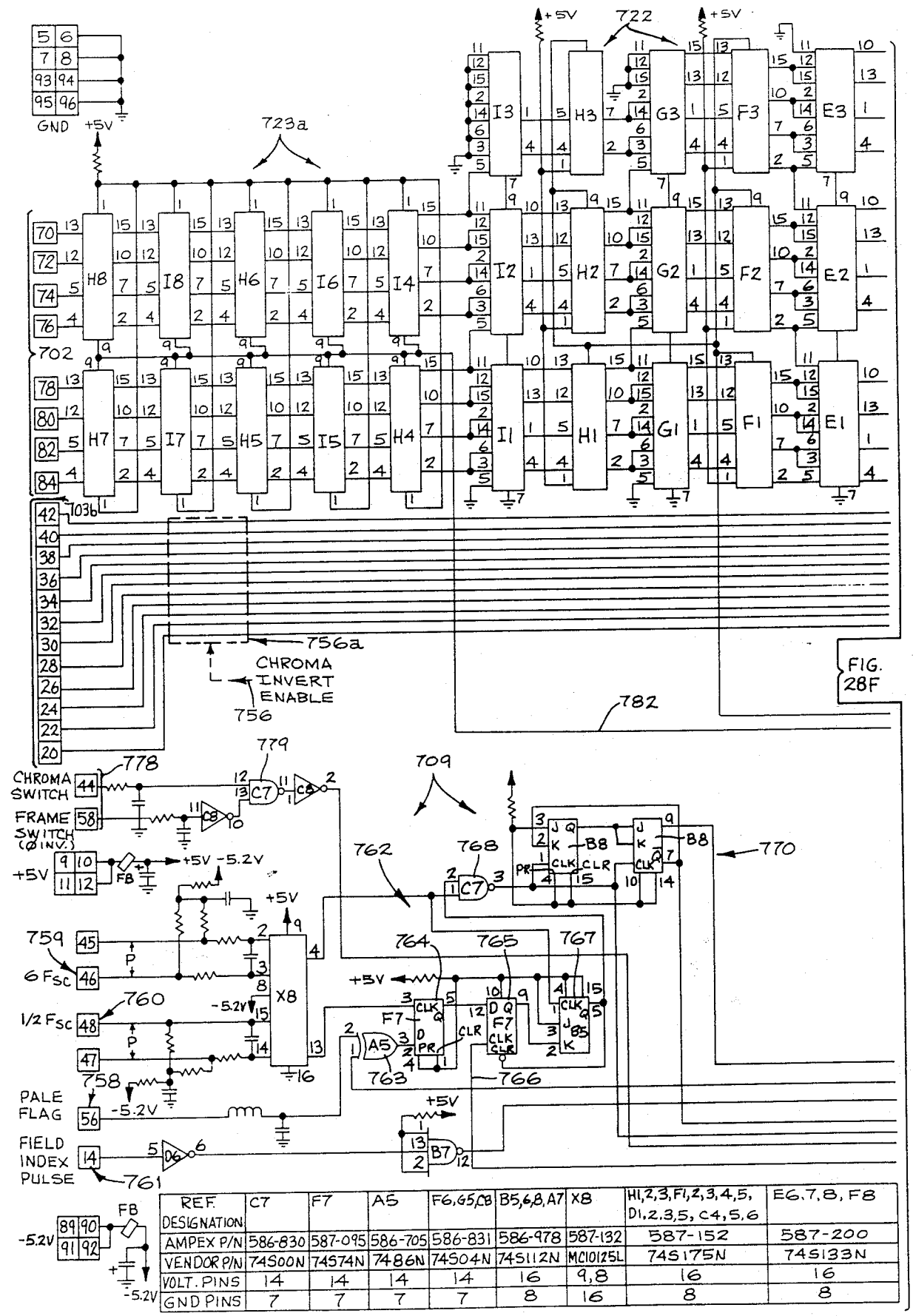
FIG_28E

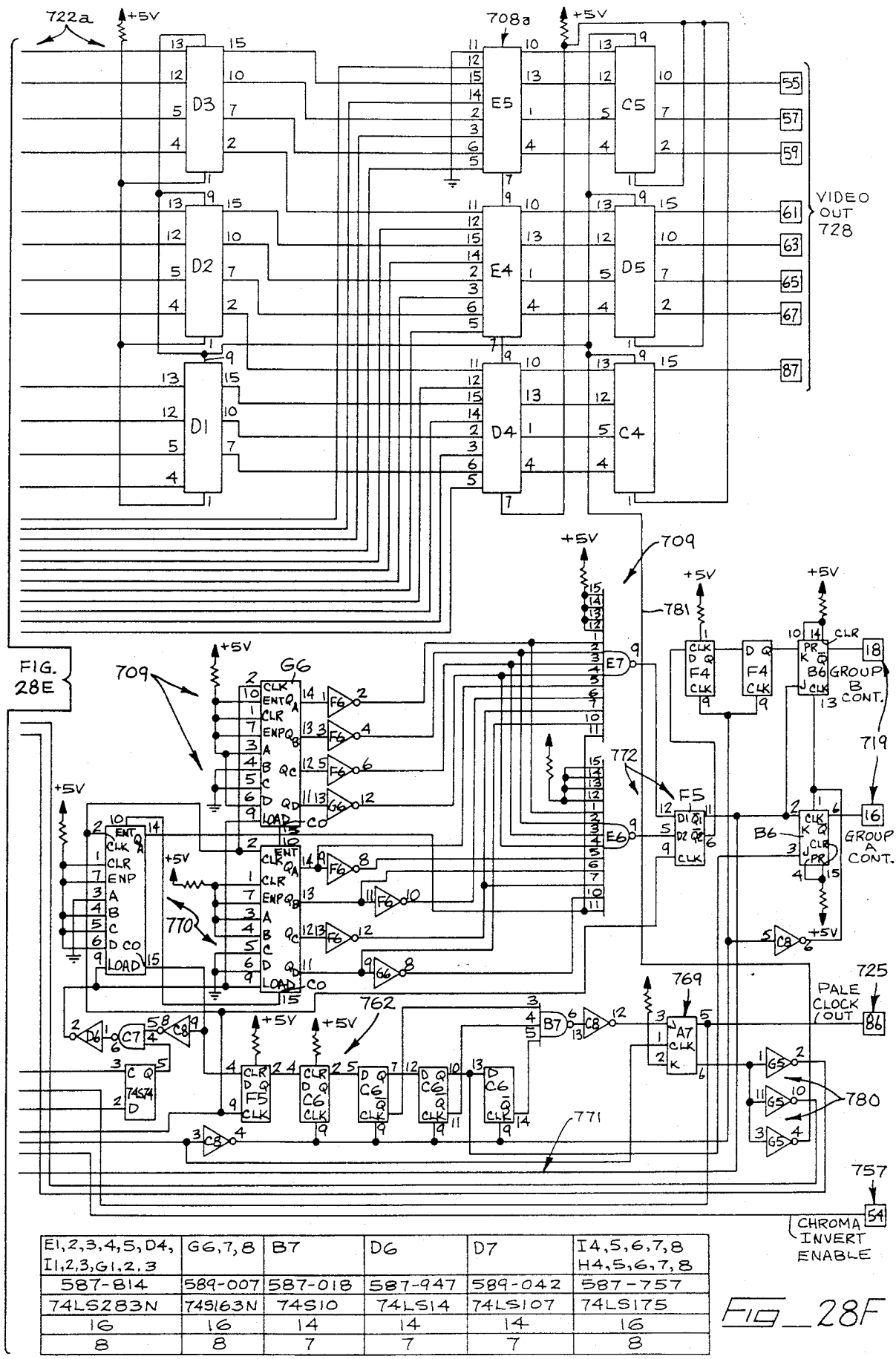

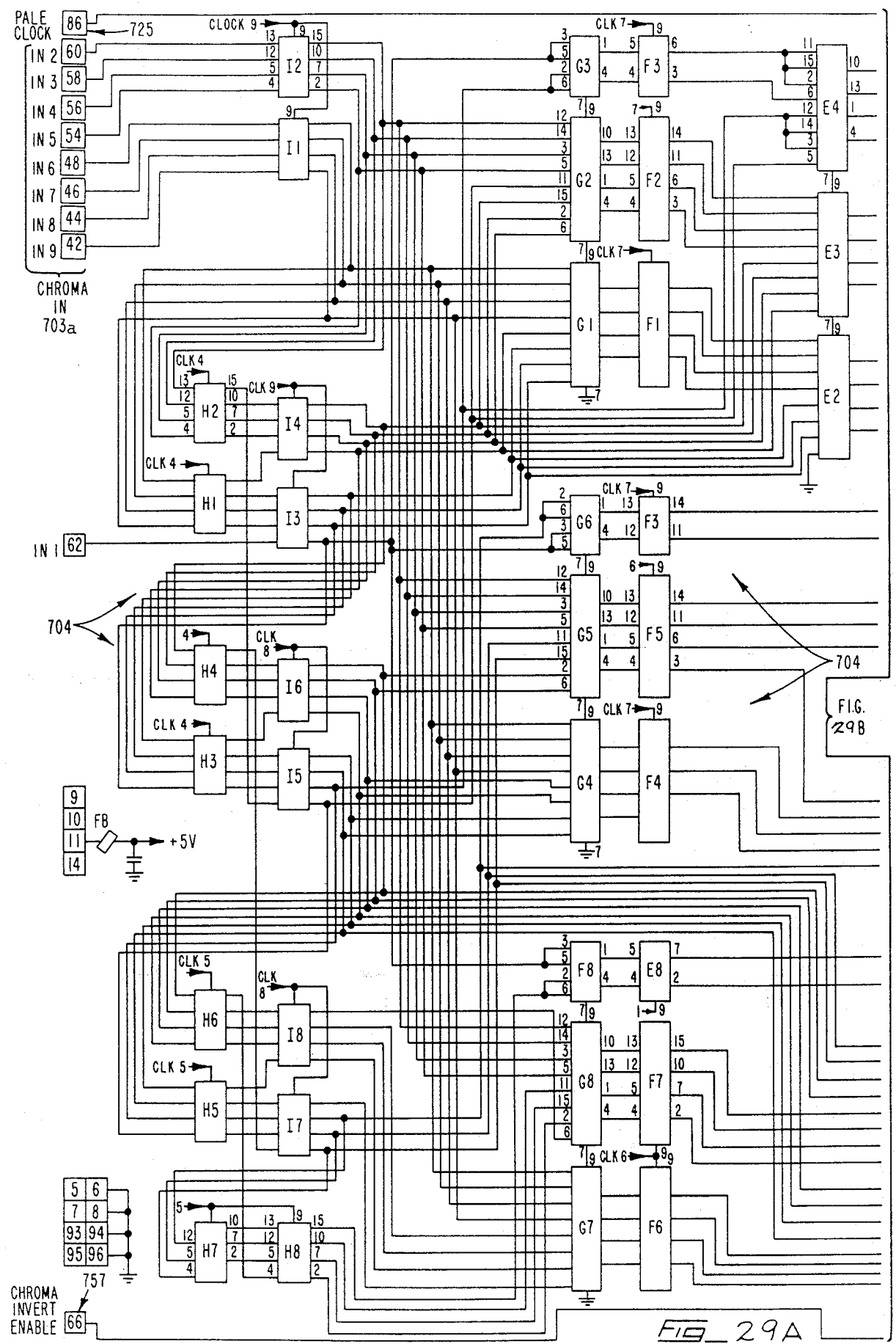

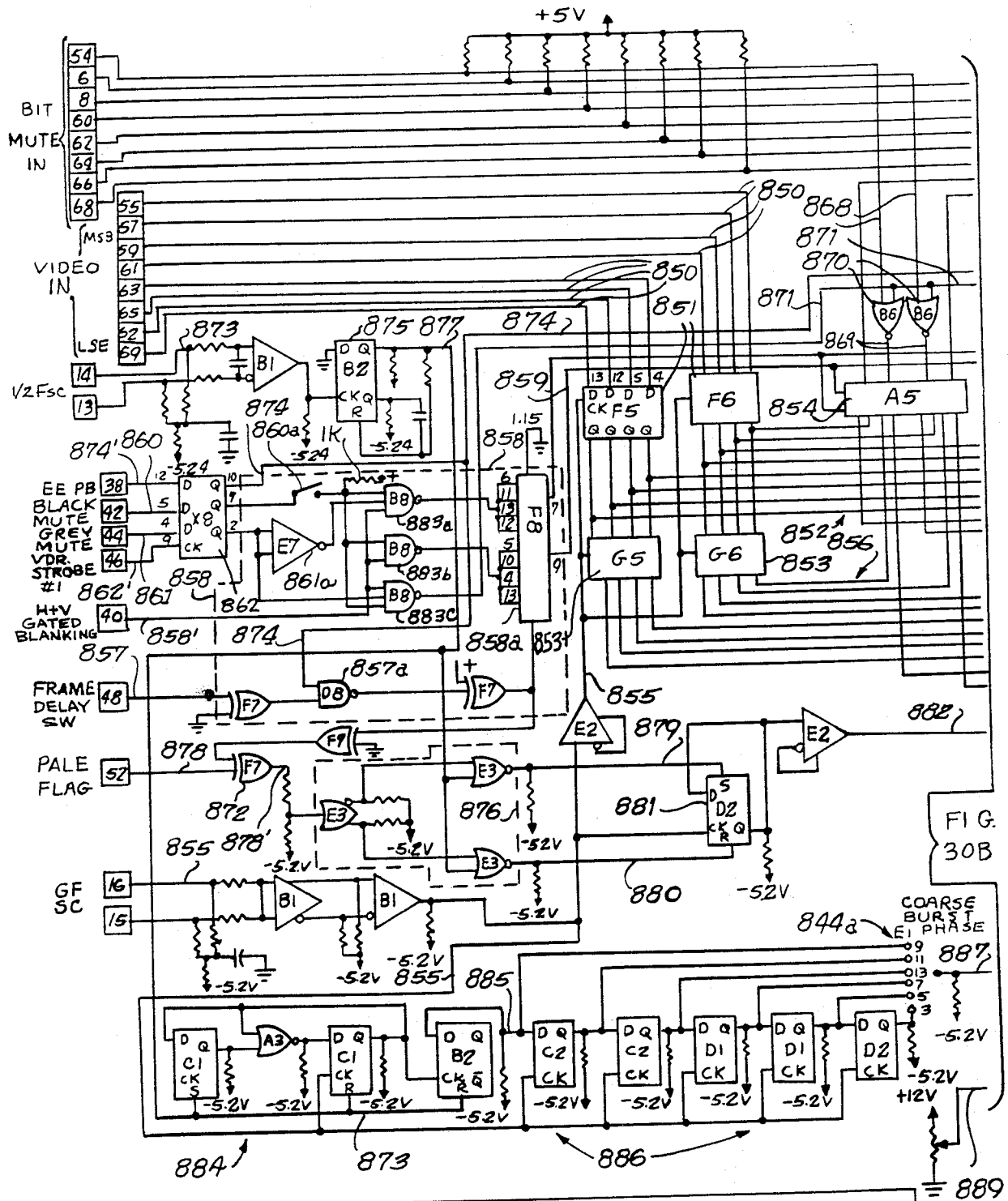
Fig_30A

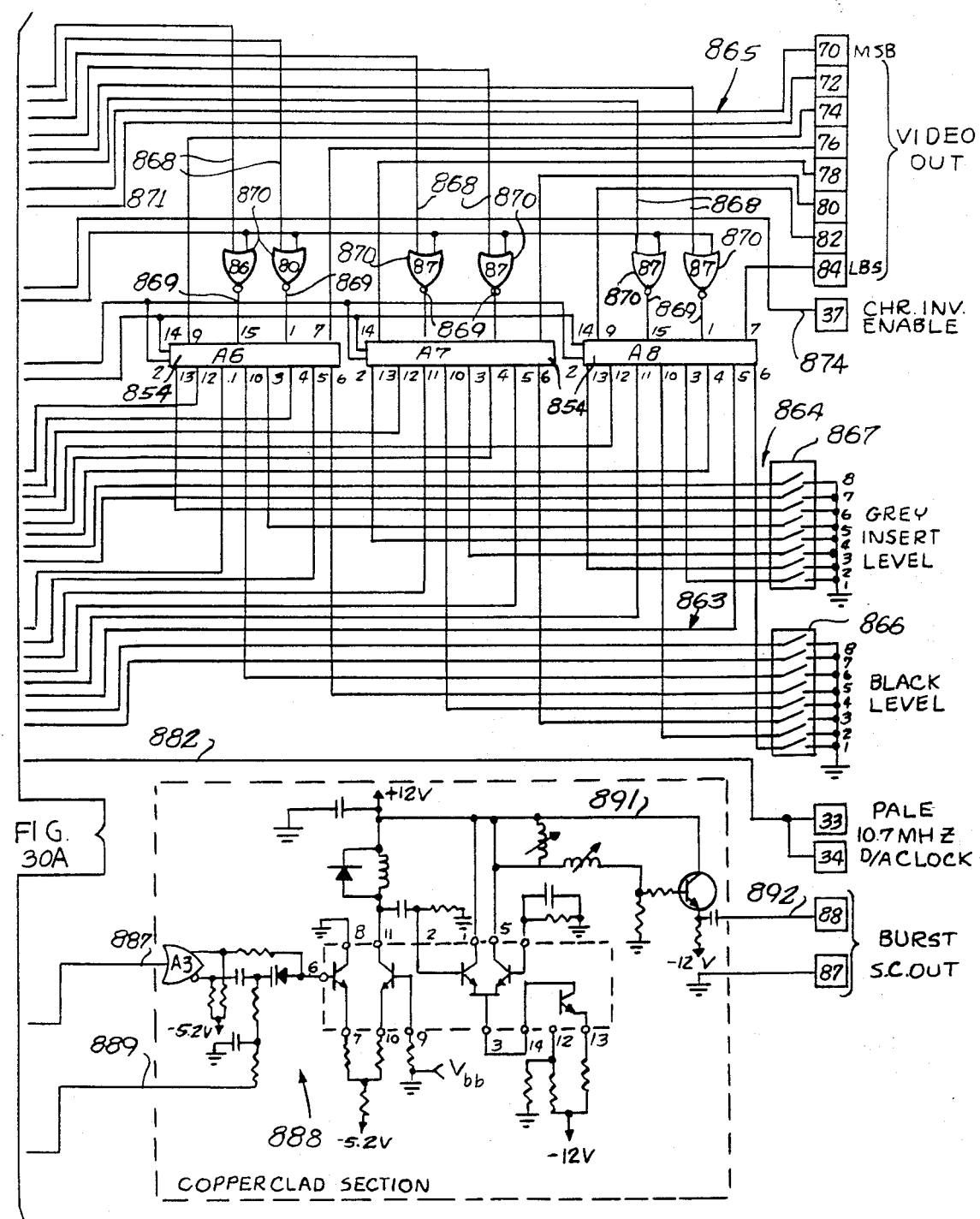

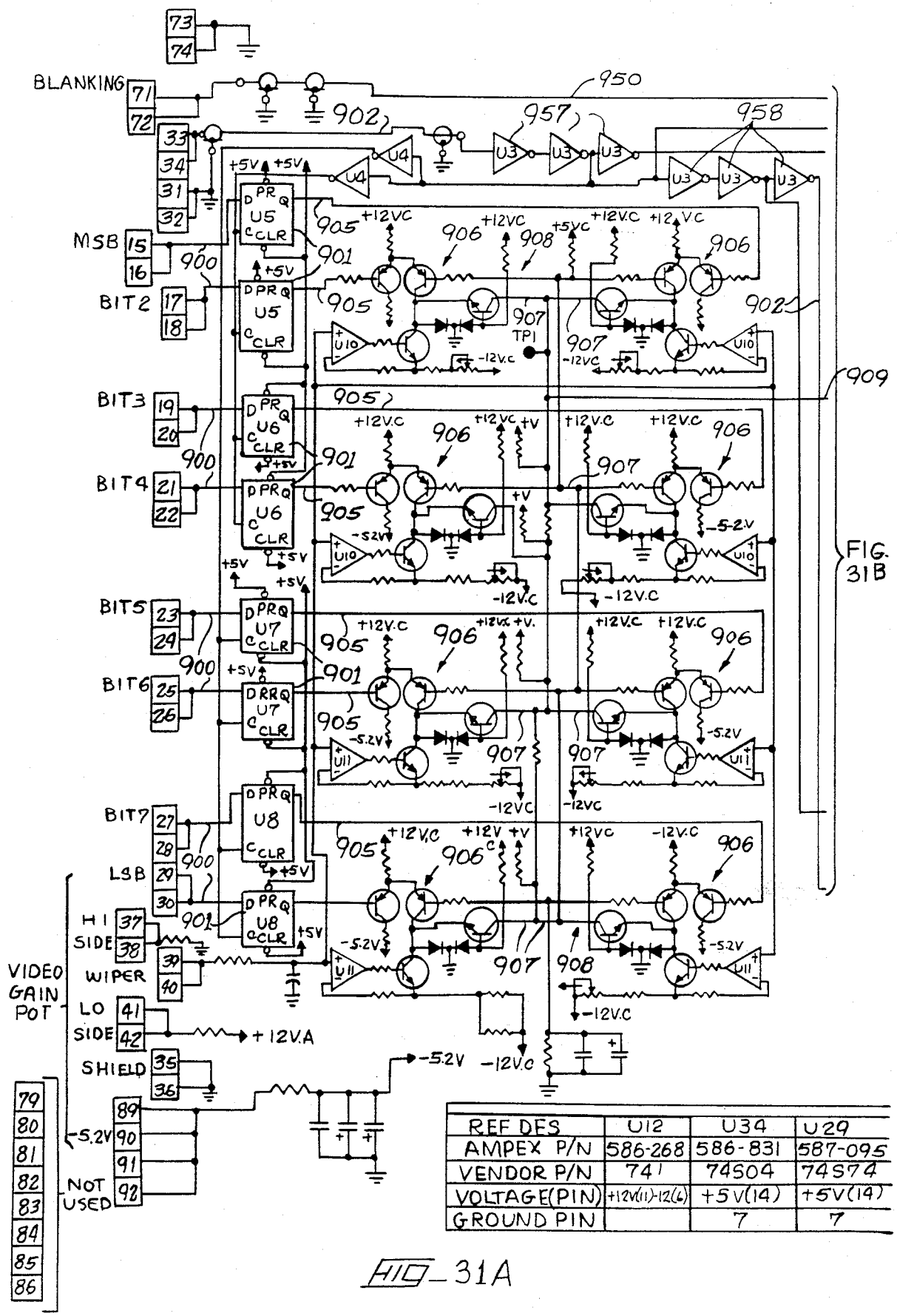
FIG_31A

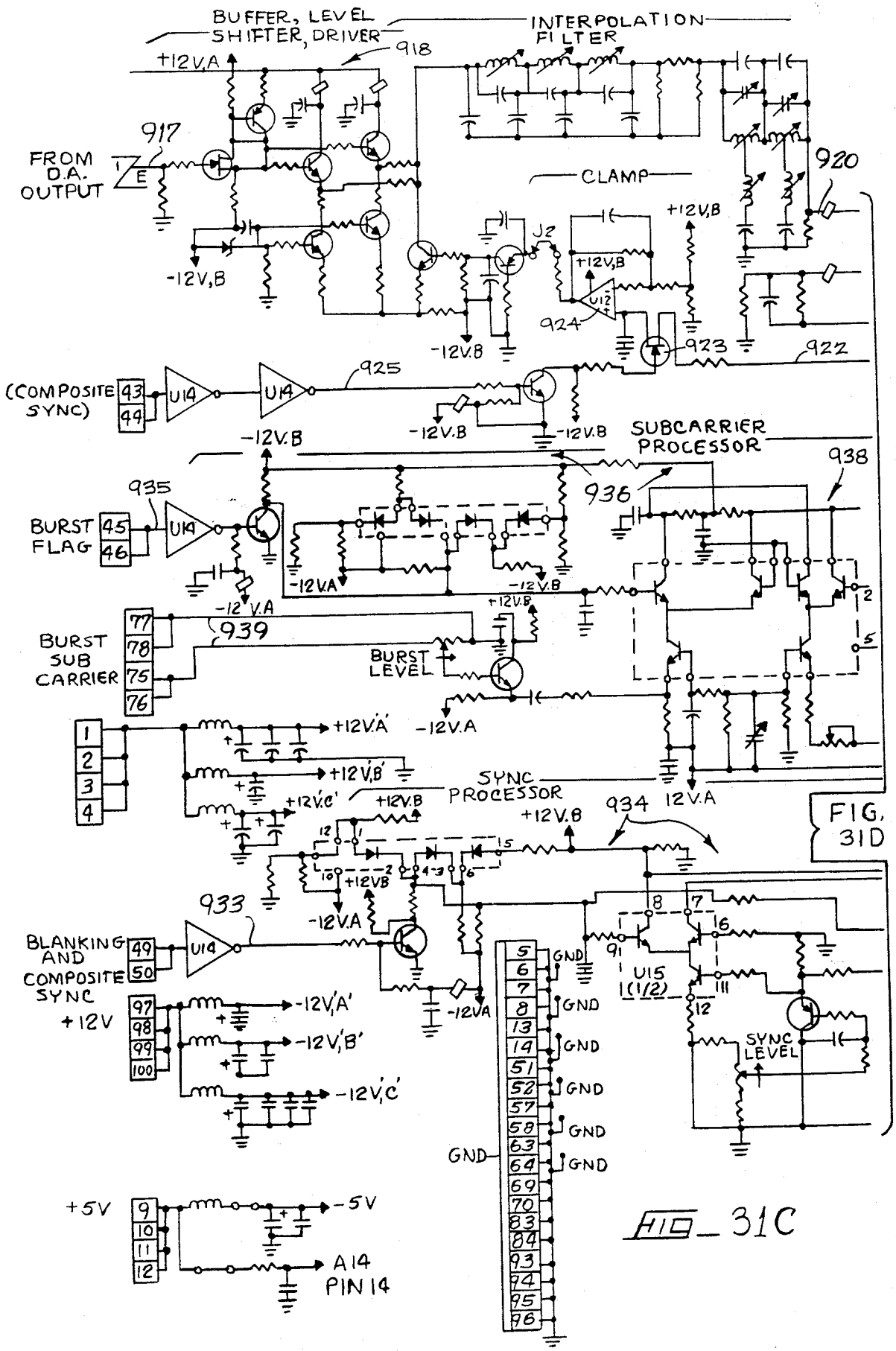

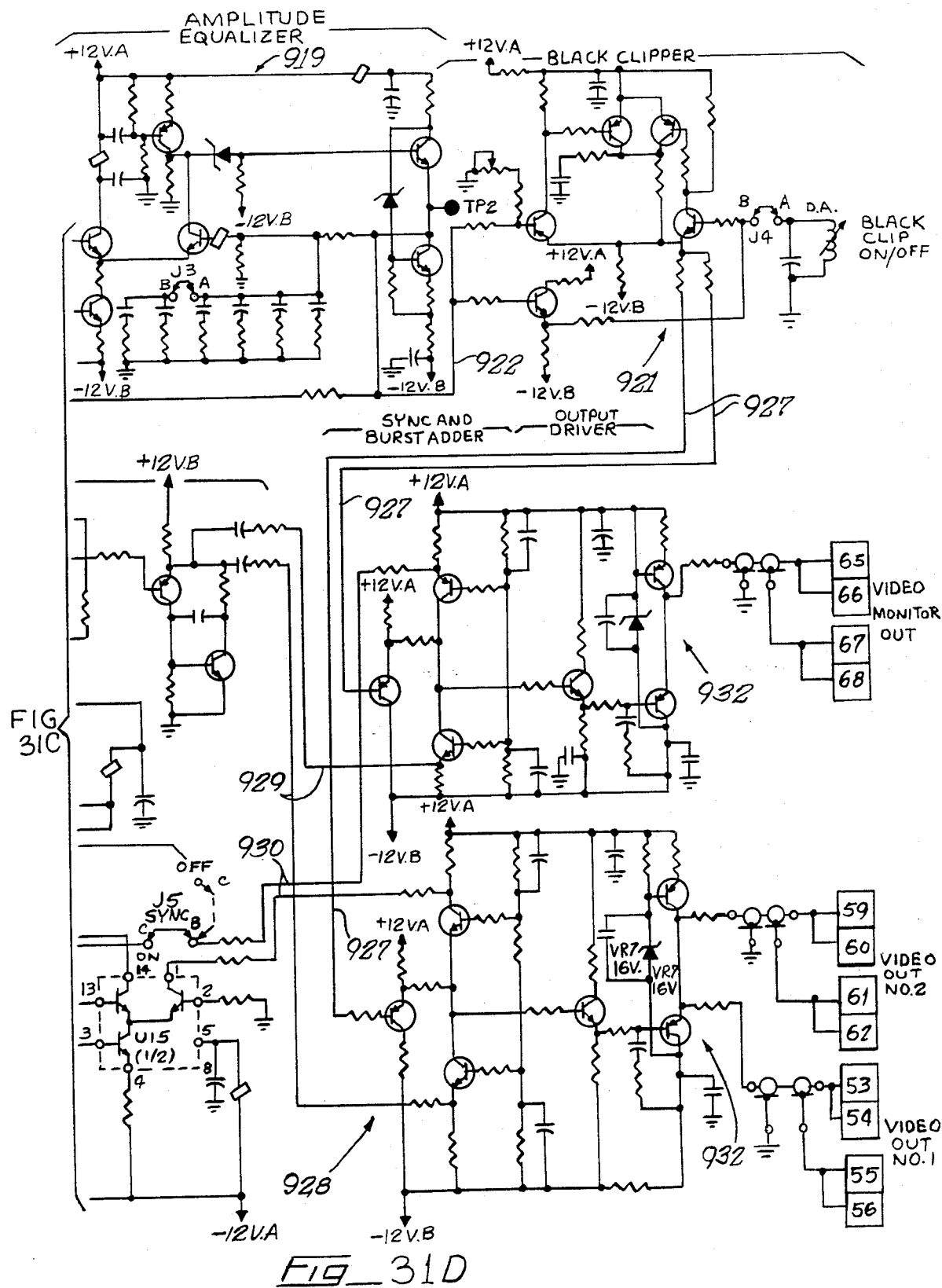
FIG_31D

METHOD AND APPARATUS FOR PROCESSING COLOR VIDEO SIGNALS FOR RECORDING AND REPRODUCING

This is a divisional of application Ser. No. 763,762, filed Jan. 28, 1977, now U.S. Pat. No. 4,181,817.

CROSS REFERENCE TO RELATED APPLICATIONS AND PATENTS

VIDEO FRAME STORAGE RECORDING AND REPRODUCING APPARATUS, Ser. No. 763,371, filed Jan. 28, 1977, by Joachim P. Diermann and Thomas W. Ritchey, Jr., now U.S. Pat. No. 4,270,150.

PLAYBACK APPARATUS ASSIGNMENT MEANS, Ser. No. 763,462, filed Jan. 28, 1977, by Howard W. Knight and Edwin W. Engberg, now abandoned.

TELEVISION SIGNAL DISC DRIVE RECORDER, Ser. No. 763,795, filed Jan. 28, 1977, by Howard W. Knight and Edwin W. Engberg, abandoned in favor of continuation application Ser. No. 48,357, filed June 14, 1979, now U.S. Pat. No. 4,477,847.

DISK DRIVE RECORDING PROTECTION APPARATUS, Ser. No. 763,761, filed Jan. 28, 1977, by Edwin W. Engberg, now abandoned.

TELEVISION SUBCARRIER PHASE CORRECTION FOR COLOR FIELD SEQUENCING, Ser. No. 763,942, filed Jan. 28, 1977, by Luigi C. Gallo, now U.S. Pat. 4,145,704.

METHOD AND APPARATUS FOR PROVIDING DC RESTORATION Ser. No. 763,461, filed Jan. 28, 1977, by Luigi C. Gallo, now U.S. Pat. No. 4,122,492.

METHOD AND APPARATUS FOR INSERTING SYNCHRONIZING WORDS IN DIGITIZING TELEVISION SIGNAL DATA STREAM, Ser. No. 763,463, filed Jan. 28, 1977, by Luigi C. Gallo, now U.S. Pat. No. 4,122,477.

PRECISION PHASE CONTROLLED CLOCK FOR SAMPLING TELEVISION SIGNALS, Ser. No. 763,453, filed Jan. 28, 1977, by Daniel A. Beaulier, Luigi C. Gallo, now U.S. Pat. No. 4,122,487.

DIGITAL TELEVISION SIGNAL PROCESSING SYSTEM, Ser. No. 763,941, filed Jan. 28, 1977, by Luigi C. Gallo, now U.S. Pat. No. 4,119,999.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo, now U.S. Pat. No. 4,122,478.

PHASE LOCK LOOP FOR DATA DECODER CLOCK GENERATOR, Ser. No. 763,793, filed Jan 28, 1977, by Kenneth Louth and Luigi C. Gallo, now U.S. Pat. No. 4,180,701.

A CIRCUIT FOR DIGITALLY ENCODING AN ANALOG TELEVISION SIGNAL, Ser. No. 762,901, filed Jan. 26, 1977, by Daniel A. Beaulier, now U.S. Pat. No. 4,075,656.

DATA RATE AND TIME BASE CORRECTOR, Ser. No. 763,794, filed Jan. 28, 1977, by Luigi C. Gallo, now abandoned.

A DIGITAL CHROMINANCE SEPARATING AND PROCESSING SYSTEM AND METHOD, Ser. No. 763,251, filed Jan. 26, 1977, by Robert P. MacKenzie, abandoned in favor of continuation application, Ser. No. 765,563, filed Feb. 4, 1977, now U.S. Pat. No. 4,143,396.

FREQUENCY RESPONSE EQUALIZER, Ser. No. 762,902, filed Jan. 26, 1977, by Jerry W. Miller and Luigi C. Gallo, now U.S. Pat. No. 4,110,798.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh, abandoned in favor of continuation application, Ser. No. 765,564, filed Feb. 4, 1977, now U.S. Pat. No. 4,130,842.

BACKGROUND AND FIELD OF THE INVENTION

The present invention generally relates to recording and reproducing apparatus and, more particularly, to apparatus that is adapted to record and reproduce television signals, using digital techniques.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total file on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Moreover, following their use during broadcasting, the slides must be removed and returned to the file. The entire assembling, use and refiling of the slides represents a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the present invention described herein facilitates the use of a recording and playback apparatus that will record and reproduce still images, with the still image video information being stored on magnetic media. The magnetic recording and playback apparatus utilizes generally standard computer disk drives (though modified in some respects) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

The present invention uses digital techniques to process color video information signals for recording and reproducing with respect to a record medium to generate special effects television displays. To generate such displays from a single or a number of television fields less than the number forming a color frame, it is desirable to separate the luminance and chrominance components forming the color video information signal and selectively invert the chrominance component to maintain the proper field-to-field color phase sequence in the color video information signal used to produce the special effects display. In digital color video information signal systems, comb filters are widely used to separate the luminance and chrominance components. Typically, the separation is accomplished by arithmetically combining quantized samples from at least three consecutive television lines of the same field at vertically aligned picture element locations in lines. If the color video information signal is sampled at a rate that is an odd multiple of the chrominance subcarrier frequency, the signal will be sampled during consecutive lines at different times relative to the start of the consecutive lines, or at times corresponding to picture element locations in the displayed signal that are not in vertical alignment.

To facilitate the separation of the luminance and chrominance components in digital video systems in which the color video information signal is sampled at a rate equal to an odd multiple of the subcarrier frequency, the present invention utilizes a particular sequence of phase reversed and phase continuous clock signals to control successive processing of the color video information signal. More specifically, the analog color video information signal is sampled at times determined by a first clock signal of a predetermined frequency whose phase is reversed on every consecutive horizontal line. The obtained samples are digitized and encoded for recording on a magnetic record medium. A phase continuous second clock signal at the predetermined frequency is utilized to clock the encoded data. Upon the reproduction of the encoded data, the data is decoded and reclocked relative to a third clock signal at the predetermined frequency whose phase is reversed on every consecutive horizontal line. Following reclocking, the chrominance component is separated from the composite color video data and selectively inverted. The selectively inverted chrominance component is combined with data from which it was separated to form a new composite digital color video signal. The new composite signal is converted to analog form using a fourth clock signal at the predetermined frequency whose phase is reversed on every consecutive horizontal line.

Processing color video information signals under the control of the aforedescribed sequence of phase reversed and phase continuous clock signals results in obtaining samples at vertically aligned picture element locations in the horizontal lines while avoiding phase discontinuities in the signal that is recorded on the record medium. Furthermore, the sequence of clock signals is such that the samples of the color video information signal are in proper alignment for separating the luminance and chrominance components.

OBJECTS OF THE INVENTION

Accordingly, it is an object of the present invention to provide an improved method and apparatus for processing an analog color video information signal for recording and reproducing with respect to a record medium that facilitates the generation of special effects displays from portions of the color video information signal.

Another object of the present invention is to provide a method and apparatus of the above type that facilitates the separation of the luminance and chrominance components contained in a digital color video information signal formed by sampling the analog color video information signal at a rate equal to an odd multiple of the chrominance subcarrier frequency.

Other objects and advantages will become apparent upon consideration of the following description and claims in conjunction with the accompanying drawings.

DESCRIPTION OF THE DRAWINGS

FIG. 4 is a broad functional and simplified block diagram of the entire apparatus of the present invention;

FIG. 5A illustrates a portion of a typical television signal illustrating the vertical interval thereof;

FIG. 5B illustrates a portion of a color television signal, particularly illustrating the horizontal synchronisation pulse and color burst signal;

FIGS. 8A and 8B together comprise a block diagram illustrating the system for the apparatus of the present invention, including control interconnections between the various blocks;

FIG. 10A is a functional block diagram of the reference logic circuitry which is a portion of the signal system shown in FIG. 8A;

FIG. 10B is a timing diagram for the PALE Flag generator included in the reference logic circuitry shown in FIG. 10A.

FIG. 12 is a functional block diagram of the encoder and sync word insertion circuitry which is a portion of the signal system shown in FIG. 8A;

FIGS. 13A and 13B are functional block diagrams of different parts of the data transfer circuitry which is a portion of the signal system shown in FIG. 8A;

FIG. 14 is a block diagram of one embodiment of the chroma separator and processing circuitry of the signal system shown in FIG. 8A wherein the chrominance inverter portion is a digital transversal filter with odd symmetry;

FIG. 15 is a more detailed block diagram of the chroma inverter portion of the circuitry shown in the block diagram of FIG. 14;

FIGS. 16 and 17 are block diagrams of alternative embodiments of the chroma separator and processing circuitry of the signal system shown in FIG. 8A;

FIG. 18 is a block diagram of an alternative embodiment of the circuitry employed to reconstitute four fields of color television signals from a single stored field;

FIG. 19 is a functional block diagram of the blanking insertion and bit muting circuitry which is a portion of the signal system shown in FIG. 8A;

FIGS. 21A, 21B, 21C and 21D together comprise an electrical schematic diagram of the input circuitry of the signal system shown in the block diagram of FIG. 9;

FIGS. 22A, 22B, 22C and 22D together comprise an electrical schematic diagram of the reference logic circuitry of the signal system shown in the block diagram of FIG. 10A;

FIGS. 23A, 23B, 23C and 23D together comprise electrical schematic diagrams of the reference clock generator of the signal system shown in the block diagrams of FIG. 11A;

FIGS. 24A, 24B, 24C and 24D together comprise an electrical schematic diagram of the encoder and sync word inserter circuitry of the signal system shown in the block diagram of FIG. 12;

FIG. 24E is a timing diagram illustrating the operation of the data encoder circuitry shown in FIGS. 24A, 24B, 24C and 24D;

FIGS. 25A and 25B together comprise an electrical schematic diagram of the data decoder;

FIG. 25C is on a table listing and identifying the integrated circuit components included in the data decoder illustrated in FIGS. 25A and 25B.

FIG. 25D is a timing diagram illustrating the operation of the data decoder circuitry shown in FIGS. 25A and 25B;

FIGS. 26A and 26B together comprise an electrical schematic diagram of the data transfer circuitry of the signal system shown in the block diagram of FIGS. 13A and 13B.

FIGS. 27A, 27B and 27C together comprise electrical schematic diagrams of the chroma separator of the chroma portion of the signal system shown in FIG. 14;

FIGS. 28A and 28B together comprise electrical schematic diagrams of the chroma inverter circuitry for use in the chroma portion embodiment illustrated by the block diagram of FIG. 15 and timing control therefor;

FIG. 28 is a functional block diagram of the timing control portion of the chroma inverter circuitry of the signal system schematically illustrated in FIGS. 27A, 27B, and 27C;

FIG. 28D is a timing diagram illustrating the operation of the timing control portion of the chroma inverter shown in FIG. 28C;

FIGS. 28E and 28F together comprise electrical schematic diagrams of the chroma inverter circuitry for use in the chroma portion embodiment illustrated by the block diagram of FIG. 17 and timing control therefor;

FIGS. 29A and 29B together comprise electrical schematic diagrams of the chroma band pass filter circuitry of the chroma portion of the signal system shown in the block diagram of FIG. 14;

FIGS. 30A and 30B together comprise an electrical schematic diagram of the blanking and bit muting circuitry of the signal system shown in the block diagram of FIG. 19;

FIGS. 31A, 31B, 31C and 31D together comprise an electrical schematic diagram of the digital-to-analog converter and burst and sync insertion circuitry of the signal system shown in the block diagram of FIG. 20;

Figure 1:
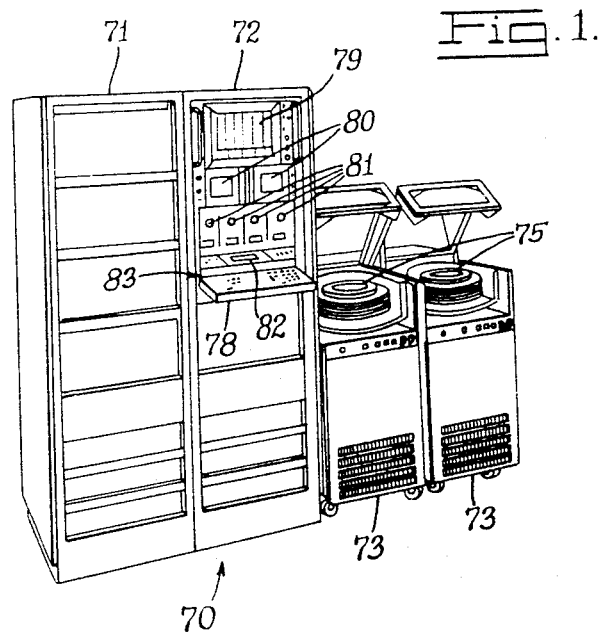
FIG. 1 is a perspective view of the apparatus embodying the present invention, illustrating its overall appearance, including the internal access station and two disc drive units.
Figure 2:
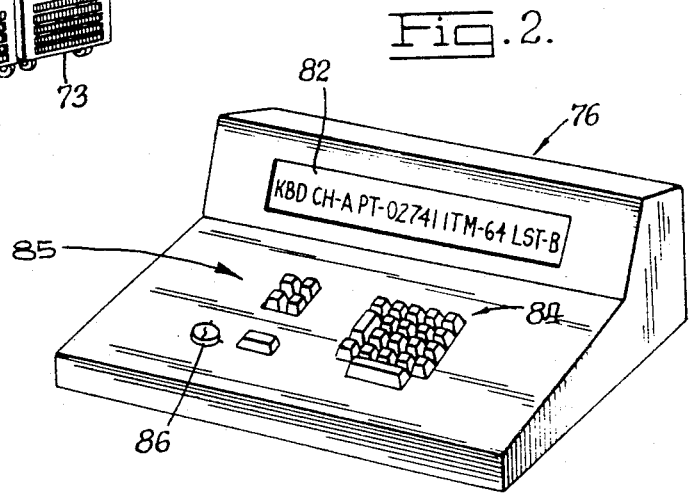
FIG. 2 is an enlarged perspective view illustrating a representative remote access station that an operator can use to control the operation of the apparatus of the present invention.
Figure 3:
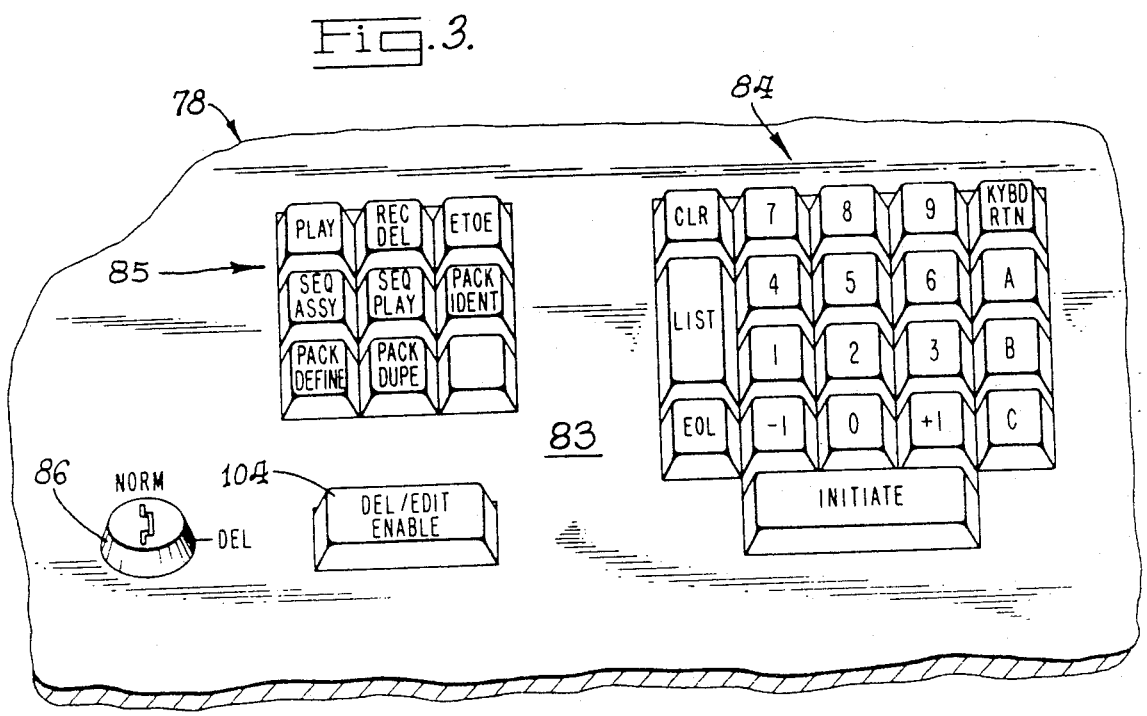
FIG. 3 is an enlarged top view of a portion of the internal access station keyboard shown in FIG. 1 particularly illustrating the various keys and bars that an operator uses during operation.

Broadly stated and referring to FIGS. 1-3, the present invention is directed to a recording and reproducing apparatus, indicated generally at 70 in FIG. 1 which includes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and that in the preferred embodiment, up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. The keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Referring to the very simplified block diagram shown in FIG. 4, the apparatus receives a video input signal which is processed by record signal processing circuitry 88 and is then applied to record signal splitter circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal splitter circuitry 89. Switcher circuitry can be substituted for the signal splitter and associated gate circuitry so that the signal provided by the record signal processing circuitry 89 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal splitting and switching circuitry and disc drives for controlling the overall operation of the various components of the apparatus and also interfaces the remote access stations and internal access station. An operator can select a particular disc in which to store a still, provided that the disc pack is on-line, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a disc drive at any one time. Thus, in the event the apparatus has two disc drives, only two disc packs can be on-line at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Figure 6:
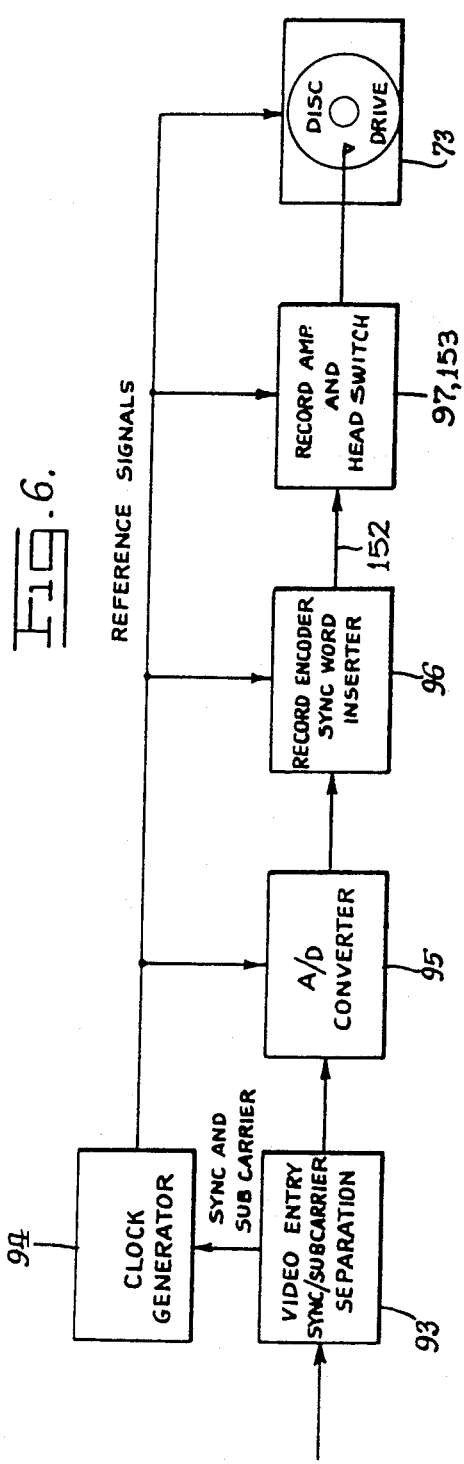
FIG. 6 is a functional block diagram broadly illustrating the signal flow path through the apparatus during a record operation.

Turning first to the record signal flow block diagram of FIG. 6, the composite video input signal is applied to the input stage circuitry 93 where clamping of the signal takes place and the synchronization and subcarrier components are stripped from the composite video signal. The input stage also regenerates the synchronization (hereafter often referred to merely as "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a nonreturn to zero code (NRZ) which means that it is a binary code defining a ONE as a high level and a ZERO an an equivalent low level. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic rexcording in that it minimizes DC content of a data stream. The circuitry also inserts a synchronizing word on alternate television lines with respect to a particular phase angle of the color subscarrier as represented by the color burst sync component. The sync word is used as a reference for correcting time base and skewing errors that occur during playback among the eight parallel bits of data that must be combined to define the value represented by each sample. The digital video information in the eight parallel lines is then applied to a recording amplifier circuitry 153 and head switch circuitry 97 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry 153 and head switch circuitry 97 is commanded to activate another set of heads for simultaneously recording the second field of a television frame on another set of eight disc surfaces so that a picture frame, ie, two interlaced television fields, is recorded on two revolutions of the disc drive, using 16 heads. Each disc pack located on a disc drive preferably contains 815 clinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder id sefined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available fo recording a parity bit and 16 surfaces are used to record the video data as will be explained further hereinbelow. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disk pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moiré and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing.

Figure 7:
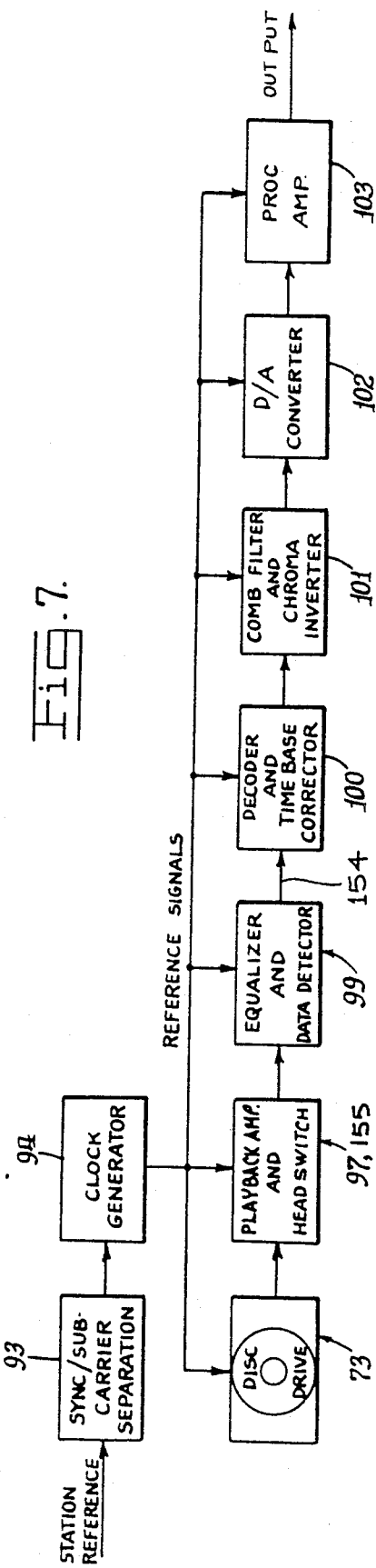
FIG. 7 is a functional block diagram broadly illustrating the signal flow path through the apparatus during a playback operation.

During playback and referring to FIG. 7, the heads read, i.e., reproduce the digital video information from the eight surfaces per field and obtain the recorded channel encoded digital video signal from the odd and even fields. The reproduced signal is applied to a playback amplifier circuitry 155 and head switch circuitry 97 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed for transmission to the playback circuitry of the signal system over a twisted pair line. The processes channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter circuitry 101 which separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired.

While the signal flow paths for both the recording and playback operations have been briefly and broadly described, the signal processing system for the composite television signal is much more detailed than is shown by the signal flow diagrams contained in FIGS. 6 and 7. The video signal system will now be described in greater detail in conjunction with the block diagram illustrated by FIGS. 8A and 8B which contains additional blocks than previously identified. However, the reference numbers previously identified will remain where corresponding functions are performed. The block diagram of FIGS. 8A and 8B also includes wider lines representing the video data flow through the signal system as well as other interconnecting lines that are necessary for controlling the timing and synchronization of the circuitry represented by the various blocks. The input and output lines from the various blocks in FIGS. 8A and 8B which have an asterisk adjacent to them are lines which extend to the computer control system 92. A computer control system particularly suited for use with a preferred embodiment of the present invention is described in U.S. Pat. No. 4,119,999.

It should also be understood that the apparatus of the present invention will be described herein with respect to use in an NTSC system which has a television field comprised of 525 lines, horizontal synchronizing pulses occurring at a rate of about 15,734 Hz (often referred to herein as "H sync") which means that the period between successive H pulses is approximately 63.5 microseconds. Moreover, the vertical blanking rate in the NTSC system occurs at a 60 Hz frequency and the chrominance information is modulated on a subcarrier signal having a frequency of about 3.58 megahertz (MHz). The subcarrier frequency of 3.58 MHz will often be referred to herein simply as SC which means 1 times the subcarrier frequency and, similarly, other commonly used clocking frequencies in the described apparatus include ½/SC, 3SC and 6SC. The 3 times subcarrier frequency (3SC) often occurs for the reason that during sampling of the analog composite video signal for digitizing the signal, a sampling rate of 3 times the subcarrier frequency, i.e., 10.7 MHz is used.

Referring again to FIG. 8A, but before discussing the functions of each of the blocks shown therein, some broad general considerations should be understood with respect to the overall operation of the illustrated signal system. Firstly, the video input signal that is fed to the video input circuitry 93A is an analog signal which is processed and applied to an analog-to-digital converter 95. The output of the converter contains the video information in digital format and the digitized data is further processed and recorded on a disc pack in a digital format. Similarly, it is played back from the disc pack, time base corrected and chroma separated and processed using digital techniques and is not converted to an analog signal until one of the final steps where the digital-to-analog converter and sync and burst insertion circuitry provides the analog composite video output as shown.

In the analog-to-digital converter 95, the analog composite video signal is sampled three times per nominal subcarrier cycle, or at a sampling rate of 3SC (10.7 MHz), and each sample is digitally quantized into an 8 bit digital word. A sampling clock having a frequency of three times or any odd multiple of the NTSC subcarrier frequency is necessarily an odd multiple of one-half of the horizontal line frequency. If such a sampling clock is phase continuous from line to line, its phase at the start of consecutive lines changes. Using such line to line phase continuous sampling clocks will result in the instantaneous amplitude of the analog signal being sampled during consecutive lines at different times relative to the start of the consecutive lines. Because of this, the quantized samples are not in vertical alignment from line to line. Vertical alignment of the samples from line to line is desired to facilitate the use of a digital comb filter to obtain a separated chrominance component of a television signal by combining quantized samples from three consecutive (all odd or all even fields) television lines of a television field, which may be designated T (for top), M (for middle), and B (for bottom) in proportion to the formulae (Chrominance) $C = M - \frac{1}{2}(T+B)$ (Luminance) $Y = M + \frac{1}{2}(T+B)$.

It should be appreciated that if the samples of the NTSC television signal are taken at an even multiple of the subcarrier frequency, the comb filtering technique would be ideal because the phase of the sampling clock would not change from line to line. Hence, the digital code words or quantized samples would describe the instantaneous amplitudes of each line of the analog signal at the same times relative to the start of each line and all of the samples in the consecutive lines would be aligned vertically from top to middle to bottom.

Figure 8C:
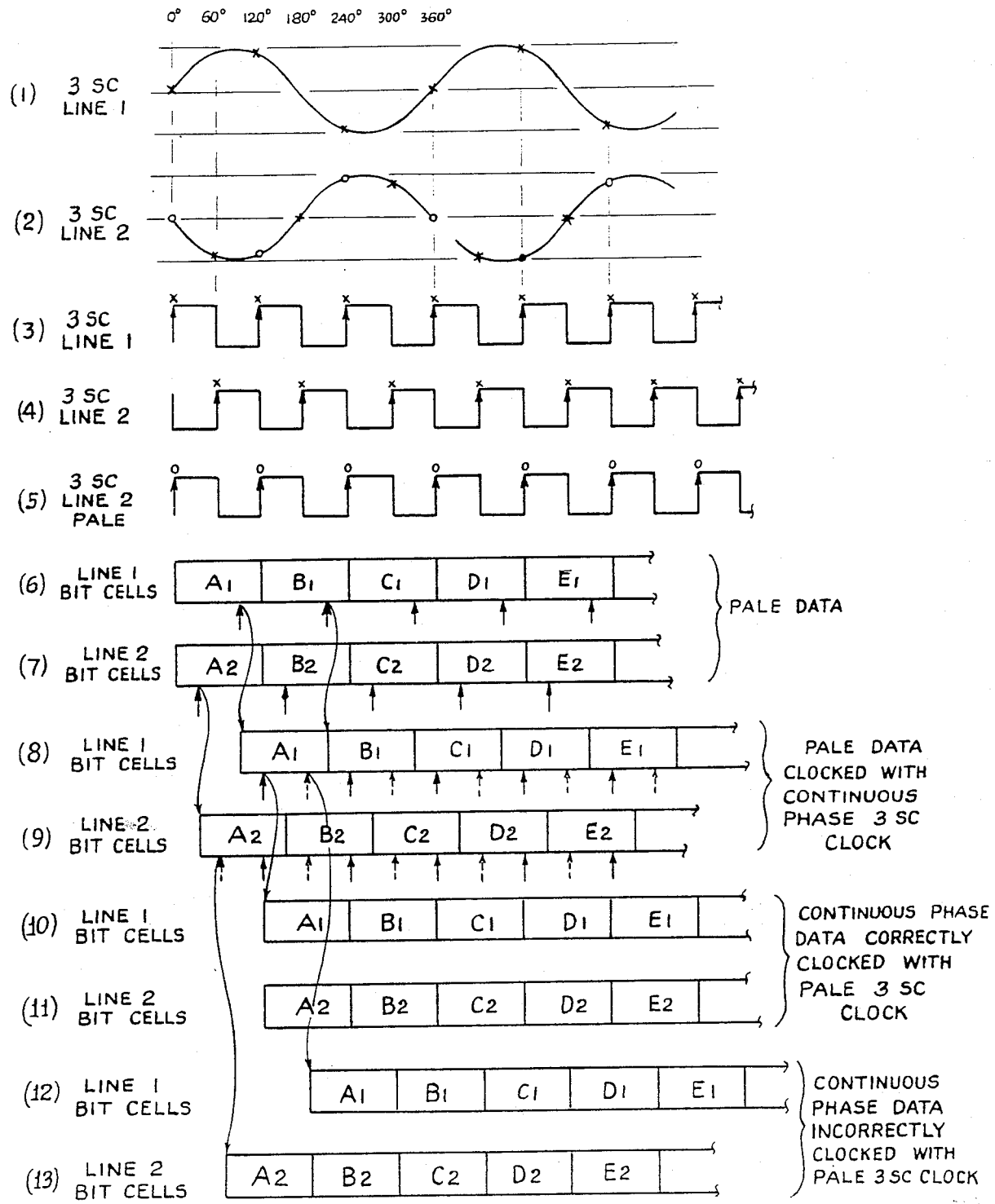
FIG. 8C is a timing diagram illustrating sampling of a television signal and phase relationships that occur at different locations of the signal system.

The lack of vertical alignment of the samples of consecutive lines when using a 3SC, line to line phase continuous sampling clock can be more readily appreciated with reference to FIG. 8C(1) which shows a number of cycles of subcarrier in television line 1 that are sampled by the positive transition of a 3SC sample clock (FIG. 8C(3)) wherein the upward transition has an arrow depicting an "X" sample point that is also placed on the subcarrier for television line 1 at every sample point (FIG. 8C(1)). As shown, there are three samples for each cycle off the subcarrier. However, during television line 2, i.e., the next consecutive line, the subcarrier has a reversed phase as shown in FIG. 8C(2) and similarly, the sampling clock 3SC is of opposite phase (FIG. 8C(4)) relative to its phase in line 1 (FIG. 8C(3)) so that during television line 2 the samples are taken where shown by the X's of the television line 2 subcarrier (FIG. 8C(2)) on the upward transitions and it is seen that the X samples from line 1 to line 2 are misplaced by 60° with reference to SC, which detrimentally affects the response of the comb filter, which utilizes the instantaneous amplitude of the analog signal in the above mentioned equations for properly deriving the chrominance information. It should be appreciated that the samples taken on all odd lines will be vertically aligned and that the samples taken on all even lines will be vertically aligned but that the samples taken on even lines will be displaced 60° with reference to SC relative to those samples on the odd lines.

To avoid the problem created by sampling at an odd multiple of subcarrier frequency, i.e., 3SC in accordance with the present invention described herein, vertical alignments of samples in all lines is achieved by changing the phase of the sampling clock on alternate lines. In the examples shown in FIG. 8C, reference is made to FIG. 8C(5) which illustrates the 3SC sampling clock for television line 2 which has its phase reversed relative to what it would have been for television line 2, which is shown in FIG. 8C(4). By sampling on the upward transitions at the "O" sample points, samples marked by the "O" on the subcarrier for line 2 result as shown in FIG. 8C(2). Thus, the sample points in the subcarrier for television line 1 ("X's") are vertically aligned relative to the sample points ("O's") that are sampled using the alternated phase sample clock shown in FIG. 8C(5) rather than what would have normally occurred as shown by FIG. 8C(4). This technique is commonly referred to as phase alternate line encoding or PALE and the terms PALEd, PALEing and the like will commonly be referred to throughout the description of the apparatus described herein.

Another important aspect of the present invention that is a result of the use of PALEing will also be described with respect to FIG. 8C. By changing the phase of the sampling clock on every consecutive line, a phase discontinuity necessarily occurs with respect to SC. It is more convenient during the channel encoding of the signal for use in subsequent recording to channel encode the digitally quantized samples with respect to a continuous phase clock, i.e., no phase discontinuities from line to line. For this reason during recording, the PALEd data that results at the output of the analog-to-digital converter 95 is clocked out of the channel encoder 96 with a clock that has a continuous (i.e., no discontinuities) 3SC phase from line to line. However, clocking the encoder with a line to line continuous phase clock shifts the data in time on alternate lines by $\frac{1}{2}$ cycle of 3SC, which disturbs the line to line sample time alignment created by sampling with a PALE clock. Since during playback the chroma processing circuitry requires the samples of data to be vertically aligned from line to line, which was the reason that a PALE sample clock was used in the analog-to-digital converter in the first place, it is necessary to retime or reclock the data from the continuous phase clock back to the PALE clock so that the sample time disturbance is removed and the chroma processing comb filter can process the data without error. Succinctly stated, the A/D converter 95 samples the analog signal using a PALE clock having line to line phase discontinuities. For recording, the channel encoder 96 encodes the PALE data with a line to line continuous phase clock, which requires, during playback and after decoding, the retiming of the NRZ information to a PALE clock for use by the chroma processing circuitry. However, the latter retiming from a continuous to a PALE clock is not performed during transfer modes of operation when the video data recorded on one disc drive memory is played back to be transferred and recorded on another disc drive memory. In such cases, the line to line continuous phase data clocking of the played back video data is retained and the data is rerecorded without disturbing the data clocking.

The above considerations will now be described in conjunction with FIG. 8C where the PALE data for lines 1 and 2 are shown in FIGS. 8C(6) and 8C(7), respectively. The bits A1 through E1 are consecutive bit cells that represent the instantaneous samples of the analog video signal that occur in line 1 corresponding to the X's shown in FIG. 8C(1), with each bit cell lasting a full clock cycle of the 3SC clock shown in FIG. 8C(3). Similarly, the line 2 bit cells A2 through E2 represent data that is derived by the sampling at the "Os" in FIG. 8C(2) using the PALE sample clock, which for television line 2 is shown in FIG. 8C(5). To clock the PALE data with a llne to line continuous phase 3SC clock, arrows beneath the bit cells shown in FIGS. 8C(6) and 8C(7) depict the clocking points of the line to line continuous phase clock that produce the bit cells that are shifted and are in the relation shown in FIGS. 8C(8) and 8C(8). The start of each bit cell occurs at the clocking point and the level of the cell will be continuous through the bit cell interval so that the bit cells maintain their identity during the clocking.

To retime the data from the line to line continuous phase clock back to PALE clock so that the bit cells (samples) are vertically aligned as they should be, i.e., A2 is vertically aligned with A1, B2 with B1, etc., the retiming from the continuous phase clock to the PALE clock must be correctly done or misalignment of the bit cells will result. In this regard, the retiming or reclocking must be complementary, i.e., a bit cell that was clocked in the right portion thereof in a PALE-to-continuous reclocking must be left clocked in the continuous-to-PALE reclocking to insure proper playback. Thus, given the line to line continuous phase clocked data shown in FIGS. 8C(8) and 8C(9), the solid arrows illustrate the proper complementary clocking for the two television lines and produce the retiming of the data to the PALE clock having the A1 and A2 bits vertically aligned as shown in FIGS. 8C(10) and 8C(11). It should be noted that where bit cells that were right clocked going from PALE-to-continuous reclocking, are left clocked in the opposite conversion as is evident from viewing any of the bit cells, e.g., A1, with their associated clocking arrows in FIGS. 8C(6) and 8C(8). In the event that complementary clocking is not performed, then the bits will not be properly aligned as is shown by the dotted clocking arrows in FIGS. 9C(8) and 9C(9) which produce the ralationship shown in FIGS. 8C(12) and 8C(13). The reclocking from either PALE to continuous or the converse is performed at various locations as will be evident from the ensuing description.

It should also be realized that the NTSC television signal does not have any specified, defined relationship between the horizontal sync pulse occurring at each line and the phase angle of the subcarrier signal with the exception that the phase of the subcarrier changes 180° from line to line. In other words, the phase angle of the subcarrier signal relative to the H sync signal can very from one video source to another and this variance makes the H sync an undesirable signal to control the operation of the apparatus. Accordingly, the apparatus herein uses the input signal's subcarrier as represented by the color burst sync component as the basic timing reference for the system and defines a new H sync related signal that is used for timing purposes instead of the signal's H sync. The new H sync related signal is chosen to be at a frequency of ½ of the nominal horizontal line frequency because it represents a whole number of cycles of the subcarrier frequency, i.e., two complete horizontal lines of subcarrier frequency or 455 cycles. Moreover, the H sync related signal is given a definite relation to the subcarrier, i.e., it is synchronized with respect to the phase angle of the subcarrier. In the record portion of the signal system a synchronizing word is inserted in the video signal on alternate television lines at a location corresponding approximately to that of the video signal's H sync and phase coherent with respect to a particular phase angle of SC generated from the video signal color burst subcarrier synchronizing component. The location of the new H sync related signal is defined at the beginning of each frame and is maintained for the duration of the frame to provide the video signal with an H sync related signal accurately and consistently defined with respect to the phase of the video signal's subcarrier. For the playback portion of the signal system, an H sync related signal designated H/2 is provided that is redefined to be coherent with respect to a particular phase angle of the reference input subcarrier, which phase angle is selectable through the playback system phase control.

The redefined H sync related signal, H/2, is used as a basic timing reference signal for the system during playback operations.

By using the redefined H sync related signal as the horizontal sync reference for the system, processing signals for recording, playback and other operations of the system is facilitated because a consistent time relationship is established between the video signal's subcarrier and redefined H sync related signal.

Additionally, the use of internal horizontal and subcarrier reference signals that can be varied in time relative to the television station reference sync, permits timing control that will enable the television signal to reach a remote location at the proper time after having experienced the usual propagation delays that occur.

Referring again to the block diagram of FIGS. 8A and 8B, the analog video input is applied to the input of input circuitry 93A where several operations occur in the processing of the analog video signal before it is applied to the analog-to-digital converter 95. More specifically, the input circuitry 93A amplifies the analog video signal, provides DC restoration, separates the sync components contained in the video signal for use in generating timing signals for the signal system, detects the level of the tip of the H sync and thereafter clips the same. Moveover, the H sync is separated using a precision sync circuit for use in producing a regenerated sync. The circuit also produces a regenerated SC signal that is derived from the burst of the video input or, in the absence of burst, from an H/2 reference signal that is generated and is derived from the video input H sync.

It should be understood that the video input circuitry 93A and the reference input circuitry 93B shown in the lower left of FIG. 8A perform similar functions, the video input circuitry primarily for the signal recording portion of the signal system and reference input circuitry primarily for the playback portion of the signal system. Therefore, for convenience of manufacturing and service, identical circuitry is used. However, the input circuits are connected in the apparatus to receive only the input signals required to perform their respective functions and while the same signals are produced by each circuit, they are not all utilized from each circuit. The reference input to the reference input circuitry is the station reference color black video signal which contains all components of a color television signal except that the active video portion of it is at a black level. Thus, the burst, H sync and the like are present at the reference input circuitry 93B as they are at the video input circuitry 93A. In addition, the reference input circuitry 93B uses an H phase position adjusting circuit that receives H position control signals from an operator controlled thumb wheel switch or the like for adjusting the H phase position of the regenerated H sync used in the playback portion of the signal system.

As shown, many of the output signals provided by the input circuits 93A and 93B are applied to the reference logic circuits 125A and 125B associated with the respective input circuits. The reference logic circuit 125A during the record mode of operation uses the inputs from the video input circuitry 93A, the analog-to-digital converter 95 and the computer control system 92 and through precision phase lock loop circuitry, generates a number of recording clocks at frequencies of 6SC, 3SC, ½SC and a PALE flag signal. The PALE flag and 3SC signals are used by the reference logic circuit 125A to generate a 3SC PALE sampling clock signal whose phase is set for each line of the video signal by the PALE flag, which is at a frequency of H/2. The PALE flag signal changes state at that rate although it does so asymmetrically, i.e., the two states of the PALE flag signal are of unequal time intervals. It is made asymmetrical so that the sampling clock phase for the color burst portion of the video signal is constant with the phase of the subcarrier and only the portion of the television line thereafter has a sampling phase which is alternated on consecutive lines. This PALE clock is coupled to the analog-to-digital converter 95 and is the sampling clock signal for deriving the samples at 3SC or 10.7 MHz.

The reference logic circuit 125B uses inputs from the reference input circuitry 93B and the computer control system 92 and generates a clock reference signal at a frequency of SC and various other timing control signals. These signals are used in the operation of the apparatus in modes other than that of recording input video signals.

During the record and playback modes of operation, the reference logic circuits also generate servo sync signals for each of the disc drives for properly operating the disc drives at the proper phase.

During playback and other modes of operation other than that of recording input video signals, a reference clock generator 98 generates various clocks and additional timing control signals required by the various parts of the signal system used in such modes. The reference clock generator uses the inputs from reference input circuitry 93B, reference logic 125B, the playback portion of the signal system, an operator's control switch and generates clock signals at frequencies of 6SC, 3SC, SC and ½SC and various other timing control signals. The reference logic circuitry 125A and 125B and the reference clock generator circuitry 98 together comprise the signal system's clock generator 94 that provides the system timing control signals.

The clamped and H sync stripped analog video signal from the video input board is applied to the analog-to-digital converter 95 which converts the signal to an 8 bit binary coded signal in a PALEd NRZ (non-return to zero) format which is applied to the encoder switch 126. The analog-to-digital converter 95 is not shown in detail herein as it is identical in its design and operation to the one incorporated in the Ampex Corporation digital time base corrector No. TBC-800. More specifically, the schematic diagrams of the analog-to-digital converter 95 are shown in the catalog No. 7896382-02 issued October 1975. The specific circuitry for the analog-to-digital converter is shown in schematic drawing No. 1374256 appearing on page 3-31/32 of the catalog and in schematic drawing No. 1374259 appearing on page 3-37/38 of the catalog. These schematics are incorporated by reference herein.

The output from the analog-to-digital converter is then fed to an encoder switch 126 which comprises switching circuitry that ordinarily receives either the 8 bit digitized video data from the converter or from data transfer circuitry 129. The data transfer circuitry 129 enables the video information to be transferred from one disc drive to another disc drive. During the transfer mode of operation, the digitized information is read off of the disc drive, decoded to the NRZ digital format, time base corrected and is then applied to the encoder switch which can select either source of digitized video information for the encoder 96. Because the channel encoded data recorded on the disc drives 73 has been clocked with a continuous phase clock, the NRZ data received by the data transfer circuitry 129 also is timed with respect to the continuous phase clock. Ordinarily, the data transfer circuitry 129 is provided with a PALE flag signal that is used to effect retiming of the NRZ digital data with respect to a PALE clock signal so that the data provided to the chroma separator and processing circuitry 101 is in the correct PALEd format. During the transfer mode of operation, this retiming is not necessary. The encoder switch 126 has circuitry for interrupting the coupling of the PALE flag signal to the data transfer circuitry 129 and thereby preventing the retiming of the NRZ data with respect to the PALE clock during the data transfer mode.

The encoder switch 126 is controlled by the computer control system 92 to gate the video data from either the video or transfer paths. It also switches between video and reference 6SC and ½SC timing signals since the reference timing signals are used during the data transfer mode and the video timing signals during the record mode. The encoder switch is also adapted to generate a signal that will produce a blinking cross through the TV image which is a visual indication that the still location or address for a still is unoccupied and therefore available for recording and also to provide signals for performing diagnostic functions.

The 8 bit data from the encoder switch 126 is then applied to the encoder 96 which initially generates a parity bit and then encodes the PALEd data into a Miller squared channel code format, which is a self-clocking, DC free, non-return to zero type of code. While PALEd data is applied to the encoder, the output of the encoder is a 9 bit data stream (if parity is included) that has a phase continuity with respect to 3SC. The continuous phase clocked data is easier to process, particularly, during the decoding operations. The DC free code avoids any possible DC component that could occur due to a preponderance of one logical state over a period of time which could have an effect of disturbing the data in the playback process. Reference is made to the application by Jerry Wayne Miller U.S. Ser. No.

668,679, entitled "DC Free Encoding For Data Transmission System" filed Mar. 19, 1976 and assigned to the same assignee as the present invention, now U.S. Pat. No. 4,027,335.

As is comprehensively described therein, the coded format can be characterized as a DC free, self-clocking, nonreturn to zero format. It provides for transmitting binary data over an information channel of limited bandwidth and signal to noise, where the data is transmitted in self-clocking format that is DC free.

In limited bandwidth information channels which do not transmit DC, binary waveforms suffer distortions of zero crossing location which cannot be removed by means of linear response compensation networks. These distortions are commonly referred to as base line wander and act to reduce the effective signal to noise ratio and modify the zero crossings of the signals and thus degrade the bit reliability of the decoded signals. A common transmission format or channel data code that is utilized in recording and reproducing systems is disclosed in Miller U.S. Pat. No. 3,108,261 issued Oct. 22, 1963. In the Miller code, logical 1's are represented by signal transitions at a particular location, i.e., at mid-cell, and logical 0's are represented by signal transitions at a particular earlier location, i.e., near the leading edge of the bit cell. The Miller format involves the suppression of any transition occurring at the beginning of 1 bit interval following an interval containing a transition at its center. Asymmetry of the waveform generated by these rules can introduce DC into the coded signal and the so-called Miller "squared" code used in the present apparatus effectively eliminates the DC content of the original Miller format and does so without requiring either large memory or the necessity of a rate change in the encoding and decoding.

The encoder circuitry 96 also generates a unique sync word in the form of a 7 digit binary number and inserts the sync word on alternate lines in a precise location determined by the 6SC and ½SC clock signals. In the record mode of operation, clock signals generated from the synchronizing components of the input video signal by the reference logic circuitry 125A are provided to the encoder circuitry 96 by the encoder switch 126 and result in the sync word being inserted at a location that approximately corresponds to where the video signal's horizontal sync pulse was previously located. In other modes of operation, the 6SC and ½SC clock signals are generated from the synchronizing components of the station reference color black video signal by the cooperative action of the reference logic circuitry 125B and reference clock generator 98. The encoder gates the H sync related sync word into the data stream on alternate television lines at the proper time relative to the regenerated subcarrier phase.

Data track information to be recorded on the data track of the disc drives 73 is also encoded by the encoder 96 prior to recording. The data track information is provided by the computer control system 92 through its data track interface.

With reference to FIG. 8B, the ten data streams of encoded digital data appearing at the output of the encoder 96 is applied to an electronics data interface 89 which is merely signal splitting and buffering circuitry which couples the encoded data to the three disc drives 73 for selective recording on a disc pack 75. Each disc drive includes a disc drive interface 151 adapted to receive the encoded digital data from the electronics data interface 89 and send it to the record amplifier circuitry 153 and head switch circuitry 97 for recording on an associated disc pack 75 as well as to receive reproduced or detected data from the playback amplifier circuitry 155 and head switch circuitry 97 and send it to the data select switch 128. In addition, the disc drive interface 151 receives the multiplex servo reference signal through the electronics data interface and sends it to the timing generator of the disc drive control circuitry. This signal is selected by the computer control system 92 from either reference logic circuitry 125A or 125B. The timing generator employs the multiplex servo reference signal to time the operation of the disc drive system so that record and playback operations and the rotational position of the disc pack 75 within the disc drive 73 are synchronized to the appropriate signal system timing reference.

The disc drive control circuitry returns pre-record timing and data timing signals through the disc drive data interface 151 to the electronics data interface 89 of the signal system. In the particular embodiment of the apparatus described herein, only two fields of the four field NTSC color television signal color code sequence are recorded, with each of the two fields recorded during separate revolutions of the disc pack 75. Immediately prior to the recording of the two fields of video data, the pre-record timing signal is generated and coupled to the electronics data interface 89. The interface sends the pre-record timing signal to the encoder 96 to cause the generation for an interval equivalent to two fields data equivalent to color black, which is digitally defined by logical 0's in the apparatus described herein. The two field interval of color black data is returned through the interfaces for recording on the disc pack at the track location selected for recording video data and its associated data track information. The recording of the two fields of color black data occurs during two revolutions of the disc pack 75 immediately preceding the two revolutions during which the two fields of video data are to be recorded. This conditions the track location for the subsequent over recording of the video and data track data. Because over recording previously recorded digital data with new digital data can be conducted to obliterate the previously recorded digital data and leave a recorded signal of sufficient quality to provide an acceptable signal to noise ratio upon playback, the pre-record cycle of operation could be eliminated from the apparatus and the recording of the two fields of video data and associated data track data accomplished in only two revolutions of the disc pack 75.

The data timing signal is returned to the electronics data interface 89 to time the generation and recording to the data track information during the second or last field of the two fields of video data. The signal is a pulse which begins after the vertical sync occurring between the two fields of video data and terminates at the end of the second field. It is during this interval that the data track information is recorded on the data track of the disc pack 75. The electronics data interface 89 couples the returned data timing signal to the computer control system 92 for identifying the data track recording interval to the system. In response, the computer control system 92 performs functions incident to the recording of data track information, including the provision to the signal system of the data track information associated with recording video data on a specified track of a specified disc pack. The encoder 96 receives the data track information and processes it as described herein for sending to the disc drive 73 and recording simultaneously with the last field of video data.

The record and playback amplifier circuitry 153 and 155, the head switch circuitry 97, and the disc drive control circuitry of the apparatus described herein are arranged together so that the playback amplifier circuitry 155 and head switch circuitry 97 are activated to reproduce data from the associated disc pack 75 at all times except when a record operation is being performed. Hence, except during record operations, reproduced data is always being received by the disc drive interface 151, which in turn always provides the reproduced data to the data select switch 128. To record data, a record command provided by the disc drive control circuitry is coupled to the record and playback amplifier circuitry 153 and 155 to activate the record amplifier circuitry 153 and disable the playback amplifier circuitry 155. The disc drive control circuitry also provides a 30 Hz head switch signal to the head switch circuitry 97 during record operations to cause the head switch circuitry to couple the data streams to one set of heads during the first field of two consecutive fields of data to be recorded and to the second set of heads during the second field. The 30 Hz head switch signal is continuously available and is similarly employed during playback operations to control the head switch circuitry 97 to switch the playback amplifier circuitry 155 between the two sets of heads for the reproduction of both fields of a desired video data signal.

Returning to FIG. 8A, during playback operations, the reference input circuitry 93B together with the reference logic 125B produces the regenerated subcarrier frequency for application to the reference clock generator 98 and the reference clock generator has outputs of 6SC, ½SC and H/2 for providing the basic timing for playback operations. The reference clock generator outputs are applied to the data decoder and time base corrector 100, data transfer circuitry 129 and the chroma separator and processor 101 in addition to a video playback output circuit 127 that inserts blanking, performs selective bit muting, and provides a selected picture frame video signal for output by the signal systems when the heads associated with a disc drive coupled to the playback channel are moved between track locations. The 8 bits of digital information are then applied to the digital-to-analog converter and sync and burst insertion circuitry 102 and 103. Moreover, during the transfer and diagnostic modes of operation, the reference clock generator 98 supplies the basic timing clocks for the encoder 96 through the encoder switch 126 as shown.

During playback, the 10 bit parallel data stream comprising 8 bits of video data, the parity bit and data from the data track reproduced from a disc pack is amplified, equalized and detected and is then applied through the disc drive data interface circuitry 151 to a data select switch 128 which can switch any of the outputs of the three disc drives onto one or more of three channels. Thus, the data select switch can switch the information from disc drive No. 1 into channel A, or to two channels while simultaneously applying a data stream from another disc drive onto another channel. While information from two drives can not be simultaneously applied to a single channel, the converse is possible. The data select switch 128 comprises conventional switching circuits which are not set forth in detail herein.

Each of the detected nine bit streams of video data and parity data from the data select switch 128 is then applied to nine individual data decoders and time base correctors 100 which decode the data and then independently time base correct each of the nine data streams with respect to a common H/2 reference, which is defined with respect to the phase of the regenerated reference subcarrier, to remove any timing errors that may be present among the nine lines of data, i.e., it aligns all sync words so that each 9 bit parallel byte comprises the correct 9 bits of data. The other bit stream from the data track is coupled by the data select switch 128 to only the decoder portion of the decoder and time base corrector circuitry 100 and the decoded data track information is coupled to the computer control system 92. The time base corrector does its correction using a continuous phase clock. However, the data is again retimed with respect to a PALE clock by the data transfer circuitry 129, i.e., the phase of the signal is alternated by reclocking it at every horizontal line, so that the 8 bit data stream that comes from the data transfer circuitry is a true PALEd signal. The data transfer circuitry 129 also performs a parity check of the off disc data and performs error masking of individual byte errors when they occur by substituting what is likely to be the most similar previously appearing byte for the byte that was detected as being in error. In this regard, the byte that is substituted is the third previous byte, which is the most recent sample that was taken with the same phase relation to SC.

The output of the data transfer circuitry is applied to the chroma separator and processing circuitry 101 in the event that the video information is desired for viewing, as opposed to being recorded on another disc drive (transfer), in which case the data from the data transfer circuitry 129 is coupled to the encoder switch 126. The chroma separation and processing circuitry 101 works in the digital domain and separates the chroma information from the luminance using comb filter techniques and inverts the chroma information on alternate frames to form a four field composite NTSC signal that is then applied to the video playback output circuitry 127 which inserts a reference black level during the blanking period, inserts gray level signals during the interval between the playback of consecutive stills, and performs bit muting operations if desired. The bit muting effectively mutes any bit or bits of an 8 bit television signal by shutting down that data bit stream and by so doing, achieves unusual visual effects in the resulting television signal such as producing exaggerated tones, ghostlike images and the like. The output from the blanking insertion and bit muting circuitry 127 is then applied to the digital-to-analog converter 102. The digital-to-analog converter receives clock signals from the blanking insertion and bit muting circuitry 127 and converts the data to its analog form and also inserts the sync and burst components of the signal to produce a full composite analog television signal.

The video input and reference input circuitry 93A and 93B broadly described with respect to the block diagram of FIG. 8A contain substantially similar circuitry in both locations, although different inputs are received by each and all of the outputs that ae available from each are not used. During record operations, the composite video input signal to be recorded is applied to the video input circuitry 93A which is used to obtain a regenerated subcarrier signal, and various vertical and horizontal sync rate related signals that are used by the apparatus in the performance of the record operations. The video input circuitry also provides an amplified and filtered video signal suitable for feeding the A/D converter 95. During playback operations, a reference color black video signal is applied to the reference input circuitry 93B which provides similar signals for use by the apparatus in the performance of the playback operations.

Figure 9:
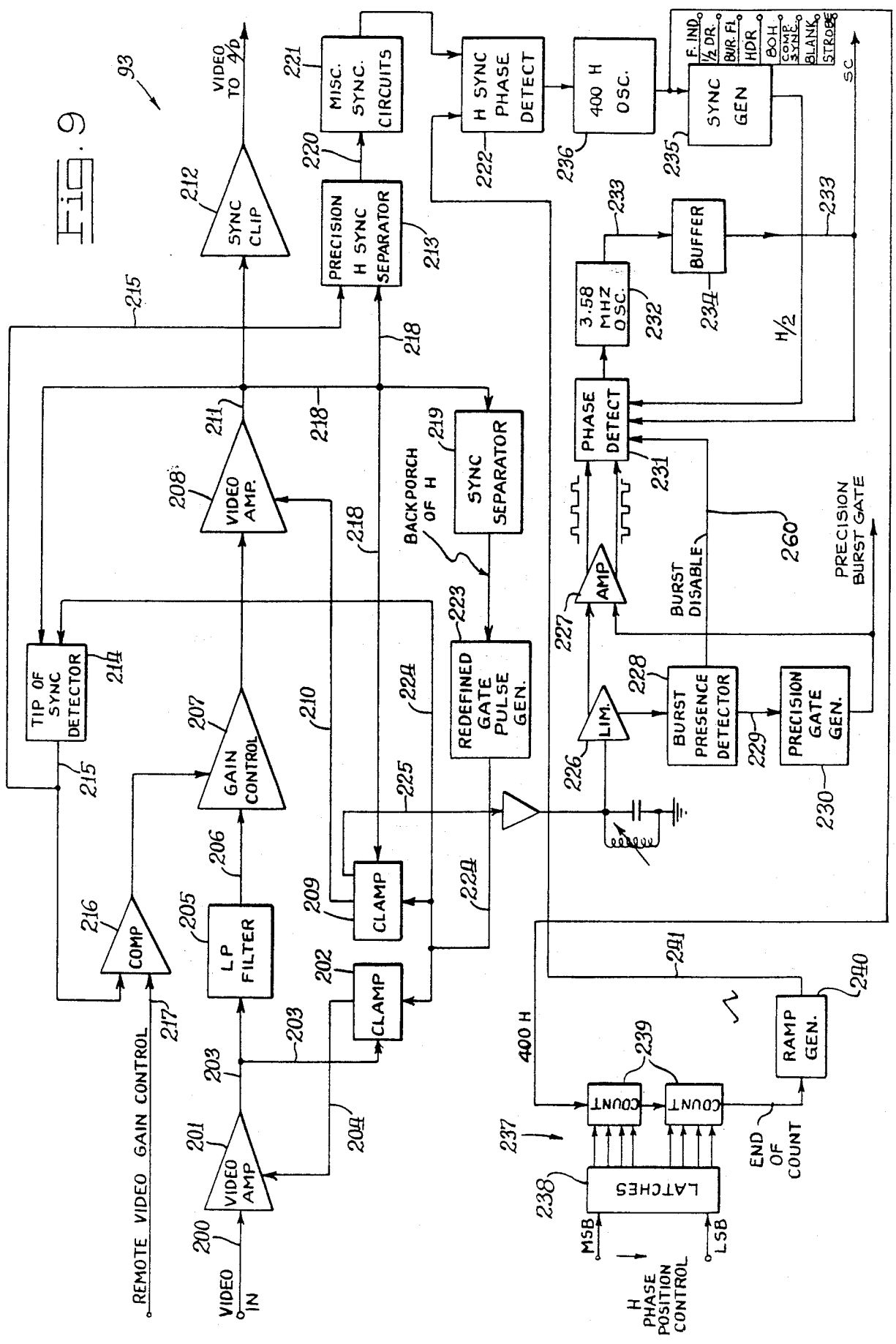
FIG. 9 is a functional block diagram of the video input circuitry (substantially similar to the reference input circuitry) which is a portion of the signal system shown in FIG. 8A.

Referring more specifically to the block diagram for the video and reference input circuits shown in FIG. 9, the video signal is applied on line 200 into a video amplifier 201 which amplifies the signal and restores the DC component through a clamp 202. The clamp 202 samples the output of the amplifier on line 203 and produces a DC component on line 204 that extends to the amplifier 201. The DC restored video signal on line 203 is then passed through a low pass filter 205, the output of which appears on line 206 extending to a video gain control amplifier 207. The amplifier 207 is connected to another video amplifier 208 where a second clamp circuit 209 assures that the blanking level of the signal is at ground level by the application of a DC control signal via the line 210 to the video amplifier 208. The output of the video amplifier appears on line 211 and is coupled by one of the lines 218 extending therefrom to the sampling input of the clamp 209. Line 211 also extends to a gated sync clipping circuit 212 as well as to a precision sync separator 213. A tip of sync detector 214 detects the level of the tip of sync which appears on line 215 that extends to a comparator 216 as well as to the precision sync separator 213. In the video input circuitry 93A, a remote video gain control signal on line 217 is also applied to the comparator 216 for controlling the gain control amplifier 207 from a remote location. In the reference input circuitry 93B, the gain of amplifier 207 is not controlled from a remote location. The output of the tip of sync detector 214, which may contain alternating current ripple, is applied to one input of the precision H sync separator 213 while the other input to the separator is provided by one of lines 218 that extends from the output of the video amplifier 208. The two inputs to the precision sync separator 213 will both have AC ripple thereon if present in the signal and, accordingly, they are common moded so that the separator produces an AC ripple free precision separated sync on line 220 that is applied to miscellaneous sync circuits 221 and to an input of a horizontal sync phase detector 222. Another of the lines 218 from the output of the video amplifier 208 extends to a less precise sync separator 219 that produces a generally less precise separated sync signal which is applied to a gate pulse generator 223, outputs of which appear on lines 224 that extend to both clamps 202 and 209 as well as to the tip of sync detector 214. When the horizontal sync signal is detected and separated, a gate is produced by the pulse generator 223 which closes the clamps as well as the sync tip detector at the appropriate time during horizontal blanking.

The clamp 209 is closed during burst time for a whole, integral number of cycles, rather than an arbitrary period, so that the blanking level of the video signal can be accurately obtained using integration techniques as will now be described in detail. The burst appears on line 210 as well as on line 225 which is applied to a burst limiter circuit 226 that is in turn connected to an amplifier 227 providing complementary outputs of the limited burst input. The output of the limiter circuit 226 is also connected to a burst presence detector circuit 228 having an output on line 229 that extends to a precision gate generator 230 as well as an output on line 260 that extends to a phase detector 231. When the presence of burst is detected, the precision gate generator 230 generates a precision burst gate signal that is coupled to enable the amplifier 227 and permit it to pass the middle three cycles of burst to apply them to the phase detector 231. The phase detector responsively provides an error signal to a voltage controlled oscillator 232 that reflects the difference in phase between the output of the oscillator and the phase of the burst cycles from the amplifier 227. The effect of the phase detector circuit controlling the oscillator 232 is to correct for longer term changes and not short term changes in the phase of the three cycles of burst that are used on every line as the subcarrier reference. The output of the oscillator 232 appears on line 233 after having been buffered by a buffer 234. The output of the oscillator is a continuous regenerated subcarrier signal SC (3.58 MHz) that is phase locked to the color burst when burst is present. However, in the event that the burst detector circuit 228 fails to detect burst, then the phase detector 231 compares the phase of an H/2 signal with the regenerated subcarrier output of the oscillator 232, the H/2 signal being produced by a sync generator 235 from an oscillator 236 that is controlled by the horizontal sync phase detector 222.

A horizontal phase position control, indicated generally at 237, is provided for use in the reference input circuitry 93B to adjust the horizontal positioning of the regenerated sync. An 8 bit binary number is loaded into latches 238 by an operator controlled thumb wheel switch or the like to preset a counter 239 which is clocked by a 400H clock derived from the oscillator 236. When the counter reaches its terminal count, it triggers a ramp generator 240 having an output 241 which extends to a second input of the H sync phase detector 222. Thus, by adjusting the latches, up to plus or minus 20 microseconds can be inserted in the feedback loop on line 241 and the phase of the regenerated sync signal an be adjusted for horizontal positioning of the picture during playback. Since a delay in the feedback loop means that the regenerated sync will be advanced, the horizontal position control can effectively advance the picture to compensate for propagation delays during transmission of a signal through cabling in a television station. As will be explained hereinafter in the detailed description of the reference clock generator circuitry 98, this horizontal phase position control is operated in conjunction with a subcarrier phase control whereby the amount of delay can be controlled in small increments, which in the embodiment of the apparatus described herein is about ±0.8 nsec.

The output of the oscillator 236 also is used by the sync generator 235, which is of conventional design for television signal processing equipment, to generate the various vertical and horizontal sync rate related signals indicated in FIG. 9. These sync rate related signals are generated with respect to the phase of the precisely regenerated H sync as provided by the phase detector 222 and, therefore, will always have a phase related to the input signal.

An important aspect of the circuitry shown in FIG. 9 is that the H sync of the video signal is clipped at precisely ½ its value and the level of the blanking is precisely clamped to ground. The regenerated subcarrier is phase locked with the burst and a precision horizontal sync signal is regenerated utilizing the precision sync separator. This signal is used by the sync generator 235 to provide a reset pulse (30 Hz field index pulse) for resetting a line identification or synce word inserter that will be hereinafter described. Since the clamp circuitry 209 examines for a zero average level of video at burst time using a clamping pulse which lasts precisely a whole number of cycles of burst, there is no need for low pass filtering the video and rejecting the burst before clamping is performed. This is due to the fact that resulting integration of the burst is equal to zero and there is no H/2 ripple introduced by integrating a signal that does not contain complete cycles of burst.

The block diagram shown in FIG. 9 describes the functional operation of the input circuitry and specific circuitry which can be used to carry out the operation thereof is shown in FIGS. 21A through 21D which together comprise a single circuit diagram for the input board.

With respect to the operation of the clamp 209 (see FIG. 42C), the voltage at the output of the amplifier 208 appears on lines 211 and 218, one of the latter of which extends downwardly to the base of an emitter follower transistor 244 that provides a voltage drop. Under equilibrium conditions, the blanking level of the video signal appearing on line 218 will be at ground potential. This signal is shifted by about 0.7 V toward the negative as a result of the voltage drop through the emitter follower 244. A matching emitter follower transistor 245 with its emitter connected to the negative input of a differential amplifier 246 by line 247 shifts the comparison level (ground) toward the negative as does transistor 244. The emitter of the transistor 244 is connected to the positive input of the differential amplifier 246 when a transmission gate or switch 248 is closed during and for a whole number of cycles of burst by a signal on the line 224 that is produced by the redefined gate pulse generator 223 shown in FIG. 21D. Thus, during the burst time, switch 248 is closed charging a capacitor 249 to the average level of the burst. The switch is closed for an integral number of cycles of the subcarrier. This eliminates the need for low pass filtering the video to remove the burst before the clamping is performed, which is ordinarily done in the prior art in order to eliminate H/2 modulation of the clamping level. The charge on the capacitor 249 reflects exactly the average value of the burst and the differential amplifier 246 output represents an error that is applied to the video amplifier 208 through line 251, transistor 252 and line 210 which is connected to the emitter of the transistor 252. The blanking level of the signal on line 211 is thus held very close to ground due to the high DC gain of the differential amplifier 246. The operation of the clamp 202 is substantially similar to the operation of the clamp 209 and is shown in FIGS. 21A and 21B.

Figure 21A:
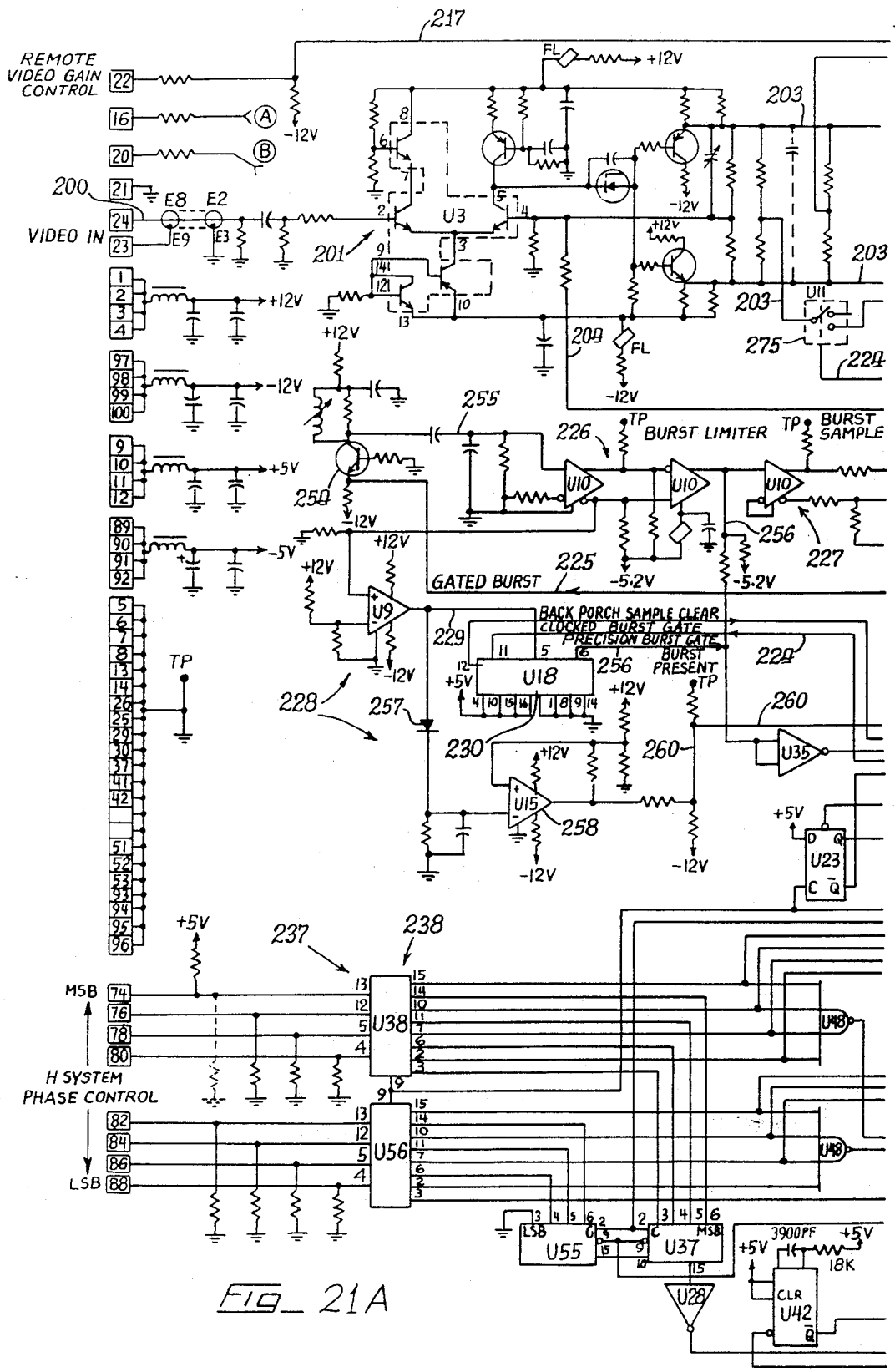
Figure 21B:
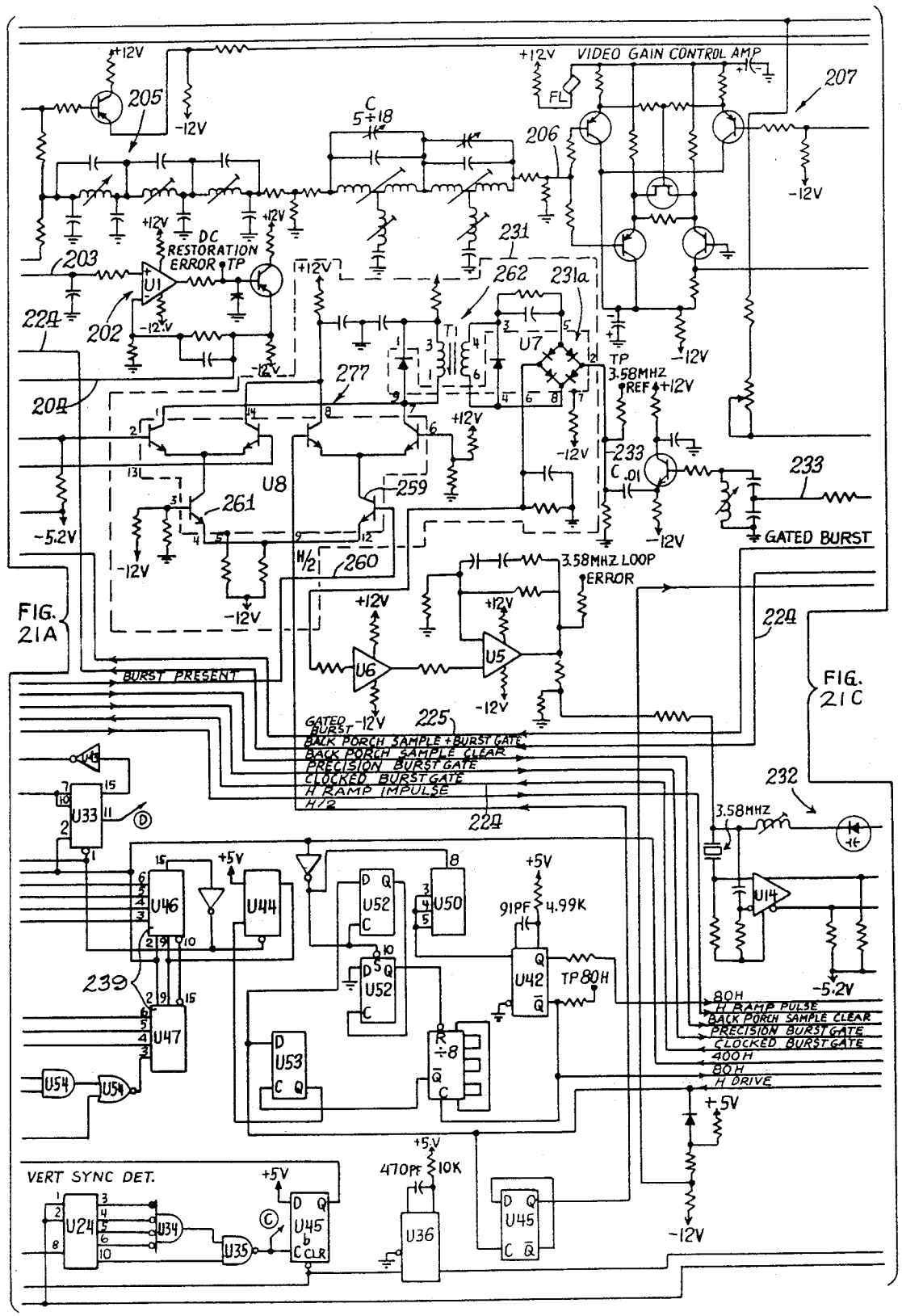

Referring again to FIG. 21C, the closing of the switch 248 gates burst through the switch into capacitor 249 and onto line 225 which extends leftwardly to FIG. 21A which is connected to the emitter of a transistor 254 and the burst therefore appears on the collector and on line 255 that extends to the burst limiter circuit 226. When burst is present, the burst presence detector circuit 228 provides a limited burst signal on its output line 229 that clocks the precision gate generator 230. A counter is employed as the precision gate generator and counts cycles of the limited burst signal and produces a precision burst gate during the middle three cycles of the nine to eleven cycle burst interval that is coupled by line 256 to enable the amplifier 227. Therefore, except for the middle three cycles of burst, the amplifier 227 is disabled by the output of the burst presence detector circuit 228. When burst is present, the diode detector 257 and following latch circuit 258 of the detector circuit 228 provides a more negative level on line 260 extending to a switching transistor 259 (FIG. 21B) of the phase detector 231. When burst is present, switching transistor 259 is shut off and another switching transistor 261 of the detector 231 is turned on. When transistor 261 is on, the three cycles of burst from the amplifier 227 is applied by the driver 277 to a transformer 262 of the detector 231. The driver is in turn connected to the phase comparator 231a for comparing the phase of the burst with the phase of the output of the 3.58 MHz (SC) oscillator 232 that is present on line 233. When burst is not detected by the detector circuit 228, transistor 259 is switched on, which applies the signal H/2 to the other input of the driver 277 that is also connected to the transformer 262 and the phase of the oscillator output on line 233 is compared with the phase of the H/2 signal.

Figure 21C:
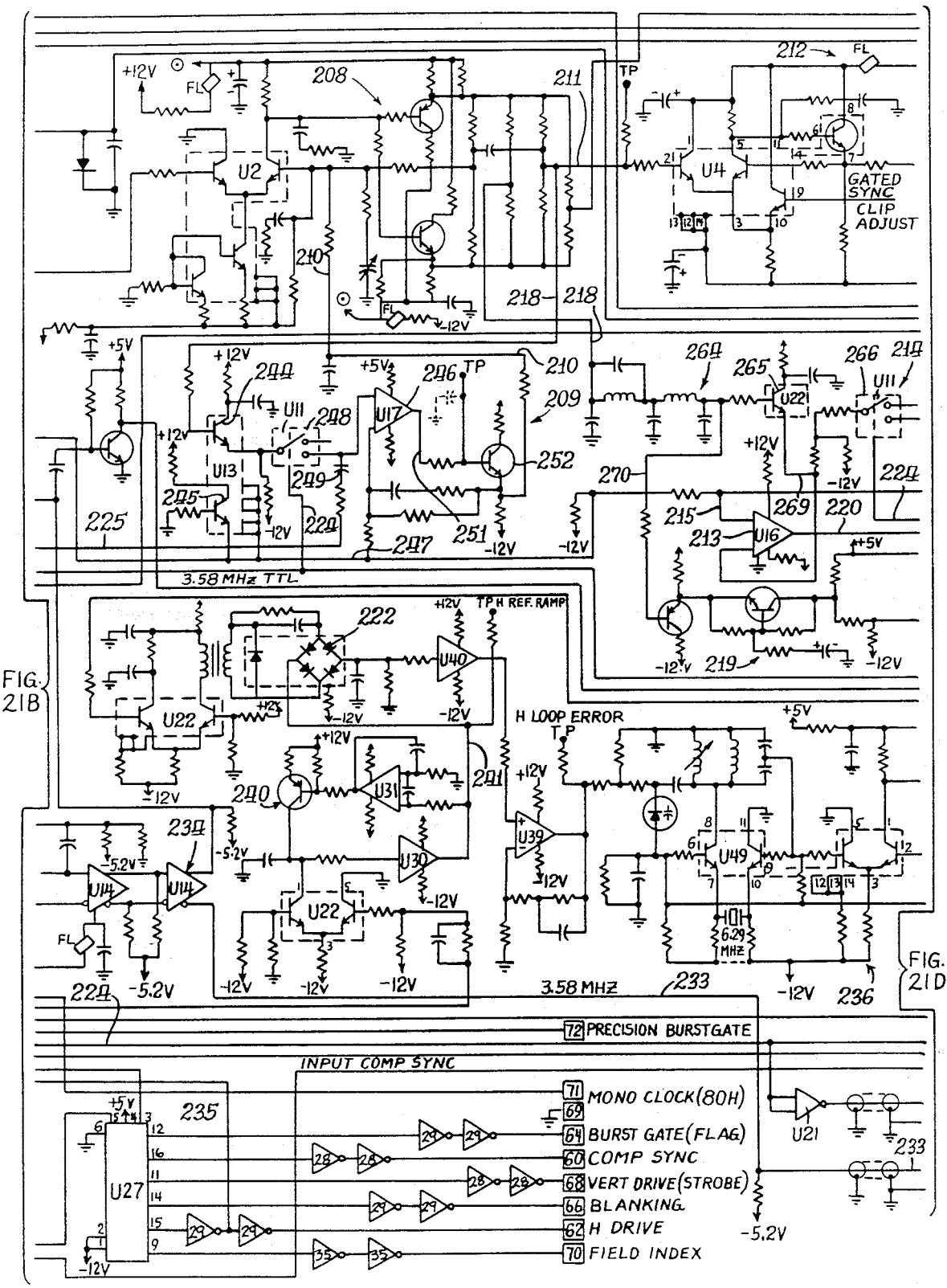
Figure 22B:
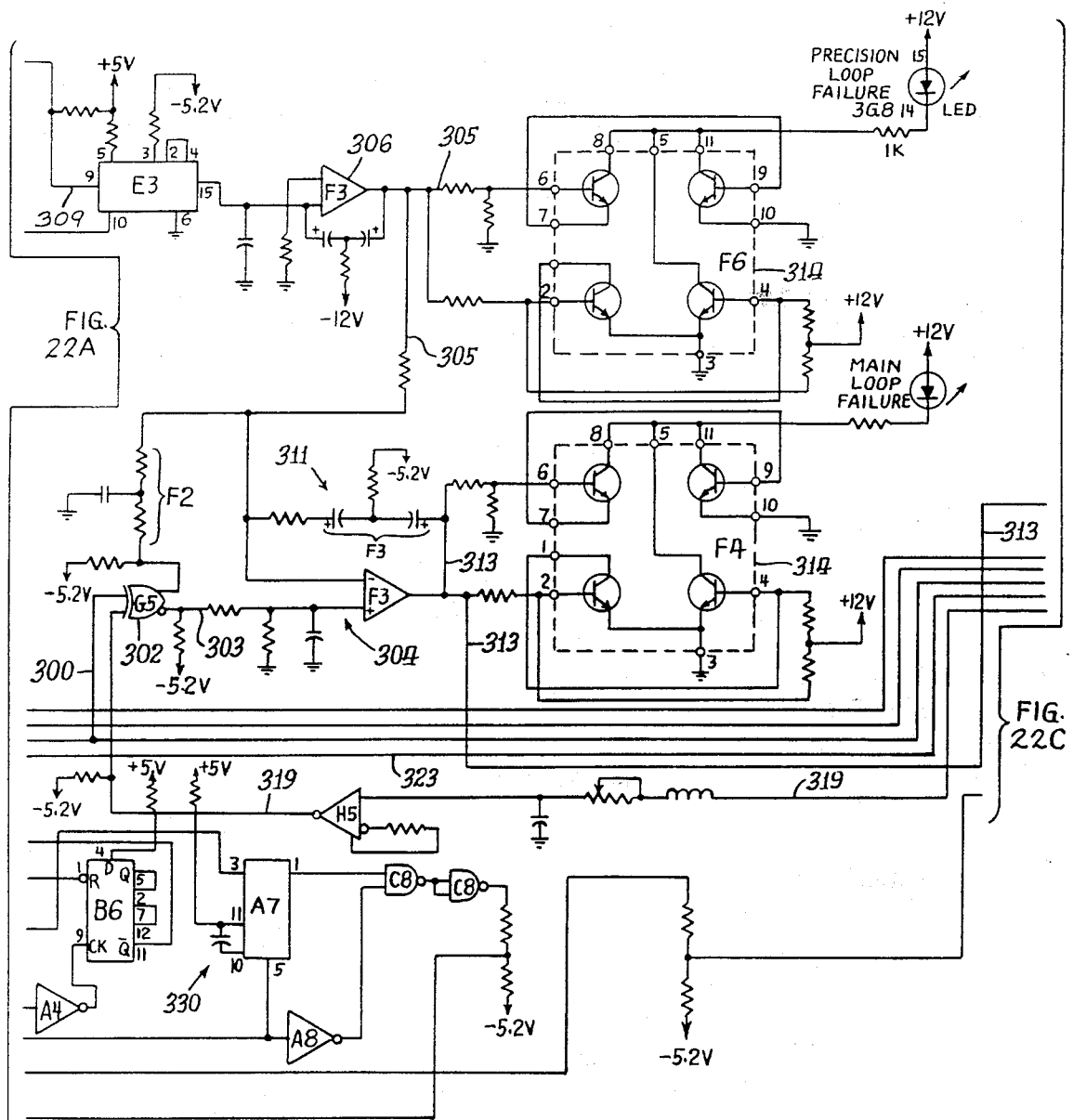
Figure 22C:
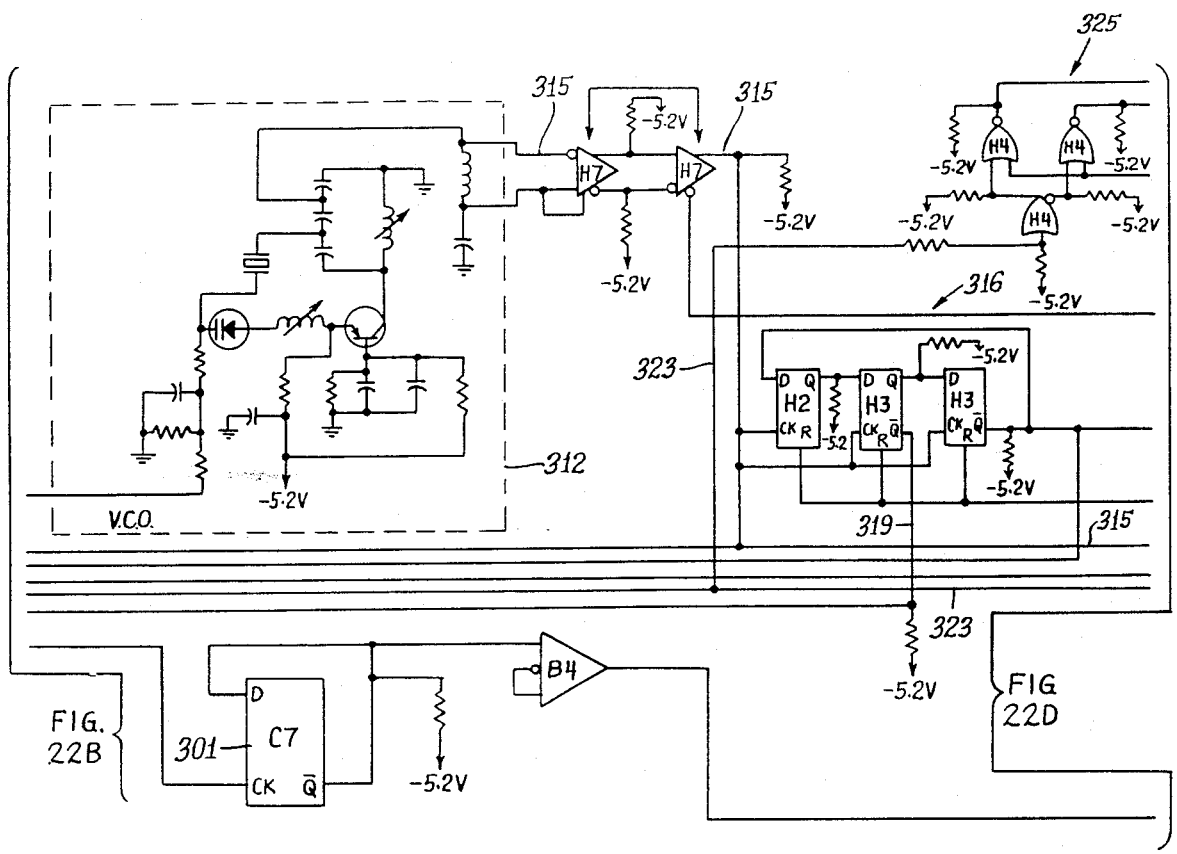

Turning now to the detailed circuitry for performing the precision H sync separation and referring to FIG. 21C, the sync is taken from the amplifier 208 on the line 218 extending to a low pass filter 264 whose output is coupled to the base of a transistor 265. The emitter of transistor 265 is connected to a transmission gate or switch 266 that is closed during the presence of sync by control line 224. The level of the sync is determined by charging a following capacitor 267 (FIG. 21D), which is buffered by a unity gain amplifier 268, and ½ of the DC level of the tip of sync together with the full level of AC ripple present in the signal is then applied via line 215 to one input of comparator 213, the other of which is supplied by line 269 that comes from the emitter follower transistor 265. In this manner, the output on line 220 is a separated sync whose timing is not affected by AC ripple on the video, because any AC ripple will appear on both inputs of the comparator 213 and will be prevented from appearing in the output of the comparator because of common mode rejection. The sync appearing on line 220 is a precision sync that is used by other parts of the signal system to generate horizontal line related synchronizing signals redefined in relation to a particular phase angle of the subcarrier signal which serve as timing references in the signal system for processing the video signals. Also, the horizontal line related synchronizing signal used in the system is at a rate of ½ H sync because there are a whole number of subcarrier cycles for every two horizontal lines (227.5×2=455) and this consideration becomes important in the operation of apparatus described herein as will be evident from the ensuing description.

A less precise separated sync is also developed by taking the sync from the low pass filter 264 via line 270 to the imprecise sync separator 219, the output of which appears on line 271 that is applied to the gate pulse generator 223 which includes a one shot serving as a sync presence detector 276. The upper circuit, indicated generally at 272, generates a gate for use by the switch 266 to close the switch during the presence of sync, a circuit 273 produces a backporch sample and a circuit 274 redefines with respect to SC phase a burst gate signal. With respect to the detector 223, it should be appreciated that if no sync is present and therefore does not appear on line 271 from the imprecise sync detector 219, the synce presence detector 276 will through circuit 274 close the switch 248 in the clamp circuit 209 as well as a similar switch 275 in the clamp 202 so that all clamps operate on a DC feedback loop rather than permitting them to remain open. Thus, if sync is not present, the level on line 224 is placed high until sync returns and is detected. In addition, as a precautionary measure in the event the precision gate generator 230 does not receive the necessary number of burst cycles to clock it to its terminal state or count after its count cycle has been initiated, the detector 276 is coupled through circuit 274 to provide the burst gate signal to the precision gate generator 230 to assure termination of its count cycle and provision of the precision burst gate signal. This assures that the precision gate generator 230 will always properly respond to every input burst signal.

Because of the desirability of having a field index signal in the encoder switch 126 that is accurately related in phase to the input video signal's vertical sync, the output of the precision H sync separator 213 and an output of a vertical sync detector 278 (FIG. 21B) are provided to a NOR gate 279 (FIG. 21D) which provides the desired field index signal.

The reference logic circuitry 125A and 125B shown in the block diagram of FIG. 8A receive various signals from the input circuitry 93A or 93B relating to horizontal and vertical sync signals, regenerated subcarrier and the like and respectively generate a number of clock and timing control signals used in the operation of the apparatus. In addition, the computer control system 92 provides control signals to both logic circuitry 125A and 125B which cause the generation of servo sync signals which control the operating phase of the disc drives in accordance with the operation, viz, record, playback, transfer and the like, being performed by the apparatus. The reference logic circuitry is essentially duplicated so that one reference logic circuit is provided for use with the video input circuitry 93A and another for the reference input circuitry 93B, with the function of the reference logic circuitry being somewhat different during different operations of the apparatus such as recording, playback, transfer and the like. Because the logic circuitry 125A and 125B perform different functions, different inputs are received by each and all outputs that are available from each are not used.

The operation of the reference logic circuitry will now be explained in further detail with reference to a functional block diagram shown in FIG. 10A that has a dotted line extending horizontally in approximately the middle of the drawing. As is shown thereon, the upper portion of the circuitry is used only during a recording operation, whereas the lower portion is used during recording, playback and other operations performed by the signal system. The function of the upper portion of the circuitry is to generate various phase locked clock signals for recording operations using the regenerated subcarrier that was produced by the video input circuitry 93A from the color burst as has been previously described. The circuitry also generates a nonsymmetrical PALE flag signal at a rate of H/2 which is used within the circuitry to alternate the phase of the analog-to-digital converter sampling clock in consecutive horizontal lines for the reasons that have been hereinbefore described. The PALE flag is also available as an output form the reference logic circuitry 125B for use by other parts of the signal system, primarily those used in processing playback signals. The circuitry also generates a drive synchronization signal for operation of the servo control of the disc drive motors, providing a set of three pulses at a rate of 15 Hz which is multiplexed with H sync for use in controlling the disc drive servo. Other timing control signals are provided by the reference logic circuitry 125B as will be described in the following detailed description.

Referring to the upper portion of FIG. 10A, the subcarrier signal (SC) from either the video input circuitry 93A for the reference logic circuitry 125A or reference input circuitry 93B for the reference logic circuitry 125B is applied on line 300 and it is extended to a phase comparator 302, the output of which appears on line 303 to a summer 304 that has a second input on line 305 provided by an integrator 306. A precision digital burst phase decoder 307 receives the actual digitized video data taken from the output of the analog-to-digital converter 95 on line 308 and decodes whether the samples were taken at the proper phase of burst and produces a plus or minus error signal to the integrator 306 via line 309 for use in adjusting the phase of the sample clock so that the video signal is always correctly sampled. The output of the summer 304 appears on line 310 which is applied to a loop amplifier and filter 311 that is connected to a voltage controlled oscillator 312 by line 313 which also extends to one of two trouble lamp drivers 314. The output of the oscillator 312 appears on line 315 at a frequency of 6SC which is applied to a divide by 6 counter 316 as well as to a divide by 2 counter 317 which produces a PALE clock output at a frequency of 3SC on line 318. The divide by 6 counter has an output on line 319 at a frequency of 1SC which is applied to a divide by 2 counter 320 as well as to the other input of the phase comparator 302. The output of the divide by 2 counter 320 is a ½SC signal on line 321 which also extends to a pulse former 322 that is used to set and reset the divide by 2 counter 317 on alternate lines, the control being supplied through line 323 at an H/2 rate that is supplied by a PALE flag generator 324 as will be discussed hereinafter.

The operation of the upper portion of the circuit is to generate a 6SC frequency signal at the output of the voltage controlled oscillator 312 that is precisely controlled so that sampling that is performed by the analog-to-digital converter 95 is done precisely at the same phase of the color burst synchronizing signal at all times. This is important when it is considered that the phase of the video that is sampled will ultimately determine the color that is produced by the apparatus. Thus, the phase comparator 302 having one input supplied by the divided output of the VCO 312 through line 319 provides a phase lock loop that will lock the phase of the output relatively close to the video or reference subcarrier phase appearing on line 300 supplied to the other input of the comparator 302. The divided output of the VCO 312 through the phase lock loop produces an SC signal that is generally within approximately 10°. However, the digitized video output from the analog-to-digital converter 95 is also applied through line 308 to the precision digital burst phase decoder 307 which is enabled by the precision burst sampling gate signal received from the video input circuitry 93A over line 307a to generate an error signal derived during the burst interval of the video that is integrated by integrator 306 to provide an average value that is applied to the summer 304. This causes the voltage level out of the loop amplifier 311 controlling the VCO 312 to be adjusted to correct variations in the sampling times of the video signal as reflected in the burst samples provided to the decoder 307. The burst samples will represent the same quantity values for all lines if no variation in sampling times occur. By examining the sampled data actually appearing at the output of the analog-to-digital converter 95, it can be precisely determined whether the samples were taken at the proper phase and in this manner, the VCO output on line 315 which is applied to the divide by 2 counter 317 produces a PALE 3SC clocked on line 318 which controls the analog-to-digital converter 95 for keeping the sampling at the proper phase. The precision digital burst phase decoder 307 effectively corrects any errors that may be produced due to temperature drifting and the like which can be on the order of 5° to 10°. In this regard, the phase of the video (or reference) subcarrier, synchronizing signal on line 300 provides the basic lockup for the VCO 312 and the precision correction that appears on line 305 in the reference logic circuitry 125B is arranged to change the phase by a few degrees, i.e., up to about 20°.

With respect to the lower portion of the block diagram of FIG. 10A, the PALE flag generator 324 produces a PALE flag signal at the H/2 rate for switching a switch 325 which steers ½SC pulses into the set or reset terminals of the divide by 2 counter 317 that produces the PALE clock on the output line 318. The PALE flag changes state every line as will be described herein with respect to FIG. 10B. The PALE flag signal is nonsymmetrical so that the phase of the 3SC PALE clock is never reversed during the burst interval of the video signal even though it is reversed during the active video of alternate lines. Thus, the net effect is that only the portion of the line after burst is sampled with a clock signal whose phase is reversed on alternate lines i.e., a nonsymmetrical signal. As is shown in FIG. 10A, the PALE flag generator 324 has inputs from the video (or reference) input circuitry 93A or 93B of H drive applied on line 326, a field index pulse on line 327 and a burst flag on line 328. The burst flag keeps the PALE flag generator from producing the PALE flag signal on line 323 until after burst has occurred, since the sampling phase of burst must not be altered for the operation of the burst phase decoder 307 in the upper portion of FIG. 10A. The PALE flag generator 324 provides an H/2 rate transfer reset pulse which is sent over line 324a to the encoder switch 126 which employs it during data transfer operations to generate a signal that is used by the encoder 96 to reset it sync word inserter.

The H drive and field index signals are also applied to a drive servo sync generator 330 which has an output extending to a drive sync switcher 331 through line 332 and it provides the basic drive sync signals on line 334 for each of the disc drives 73 when commanded by the control line 333 from the computer control system 92. The sync signals are required for all operations in which the information is transferred between a disc pack 75 and the signal system. The computer system 92 differentiates whether a record or playback operation is desired. The sync information is in the form of a multiplex sync signal that appears on lines 334 that extend to the disc drive units and includes a set of three consecutive wide pulses to indicate the first field being recorded or played back at a 15 Hz set rate as well as horizontal sync pulses (at H rate) and is used for control of the spindle servo motor. Color frame and related sync signals also are provided for control of the servo drive and for use by the reference clock generator in generating control signals used during playback operations. The color frame related sync signal is obtained from a color frame generator 301, which receives the 30 Hz field index pulse signal over line 327 and frequency divides it by 2 to obtain the 15 Hz color frame signal. The color frame signal is sent over line 329 to the disc drives 73 and the reference clock generator 98.

The specific circuitry that can be used to carry out the operation of the block diagram shown in FIG. 10A is illustrated in FIGS. 22A through 22D, which together comprise an electrical schematic diagram of the reference logic circuitry. Since the operation of the circuitry shown in the detailed schematic diagram is carried out generally in the manner as has been previously described with respect to FIG. 10A, it will not be described in detail herein. However, with respect to the digital burst phase decoder 307 shown in the upper portion of FIG. 22A, the digitized video subcarrier sychronizing signal or color burst in the form of 8 bits that is derived from the output of the analog-to-digital converter 95, appears on lines 308 which are connected to arithmetic logic units 335 which in turn connect to shift registers 336. The shift registers 336 are clocked by the logic circuitry, indicated generally at 337, which is activated upon receipt of the precision burst sampling gate over line 307a and together with the arithmetic logic units 335 perform the arithmetic steps that are necessary to determine the sign of the phase of the digitized color burst on line 309. The error of any sampling is determined by examining the quadrature component of the samples which would be zero if the samples are taken at the proper phase of the subcarrier color burst signal. More specifically, the quadrature component is proportional to the function $X1 - \frac{1}{2}(X2+X3)$ where the samples X1, X2 and X3 are 120° apart. The clocking logic 337 performs the sequence that enables the arithmetic units 335 and shift registers 336 to carry out the arithmetic computation which will produce either a plus or minus signal on line 309 indicating an error in the phase of the actual samples.

Turning now to FIG. 12A which contains circuitry 324 for generating the PALE flag signal on line 323, the H drive signal is inverted by inverter 342 and is applied via line 338 into the clock input of an FF 339 which is a divide by 2 having output line 340 applied to the input of a second FF 341 that is clocked by the burst gate or flag signal on line 328. Line 340 also extends to a NAND gate 343 as does the output line 344 from the FF 341. The operation of the PALE flag generator 324 will now be described in connection with the timing diagrams shown in FIG. 10B which has the H drive signal (line 326) shown in FIG. 10B(1), the signal on line 340 shown in FIG. 10B(2), the signal on line 344 shown in FIG. 10B(3), the burst gate clock on line 328 shown in FIG. 10B(4) and the output of the NAND gate on line 345 appearing in FIG. 10B(5). The PALE flag signal on line 323 is the inverse of the signal on line 345 by virtue of inverter 346. While the PALE flag signal occurs at a rate of H/2, FIG. 10B(5) shows it to be nonsymmetrical because the output of FF 341 appearing on line 344 and applied to the NAND gate 343 is delayed with respect to the output from the first FF 339 because the FF 341 is clocked by the burst gate rather than by H drive.

The reference clock generator 98 produces the basic timing signals for the apparatus during playback, data transfer, diagnostic and other like operations during which input video signals are not recorded and uses as its input timing reference the regenerated SC (3.58 MHz) that is produced by the input circuitry 93B and passed through the reference logic circuitry 125B. The reference clock generator has phase shifting capability for shifting the entire system phase and includes a phase locked loop and assorted counters and logic circuits to generate the timing signals with the desired system phase. It also generates control signals used by the data decoder and time base corrector 100 and the chroma separator and processing circuit 101.

Figure 11A:
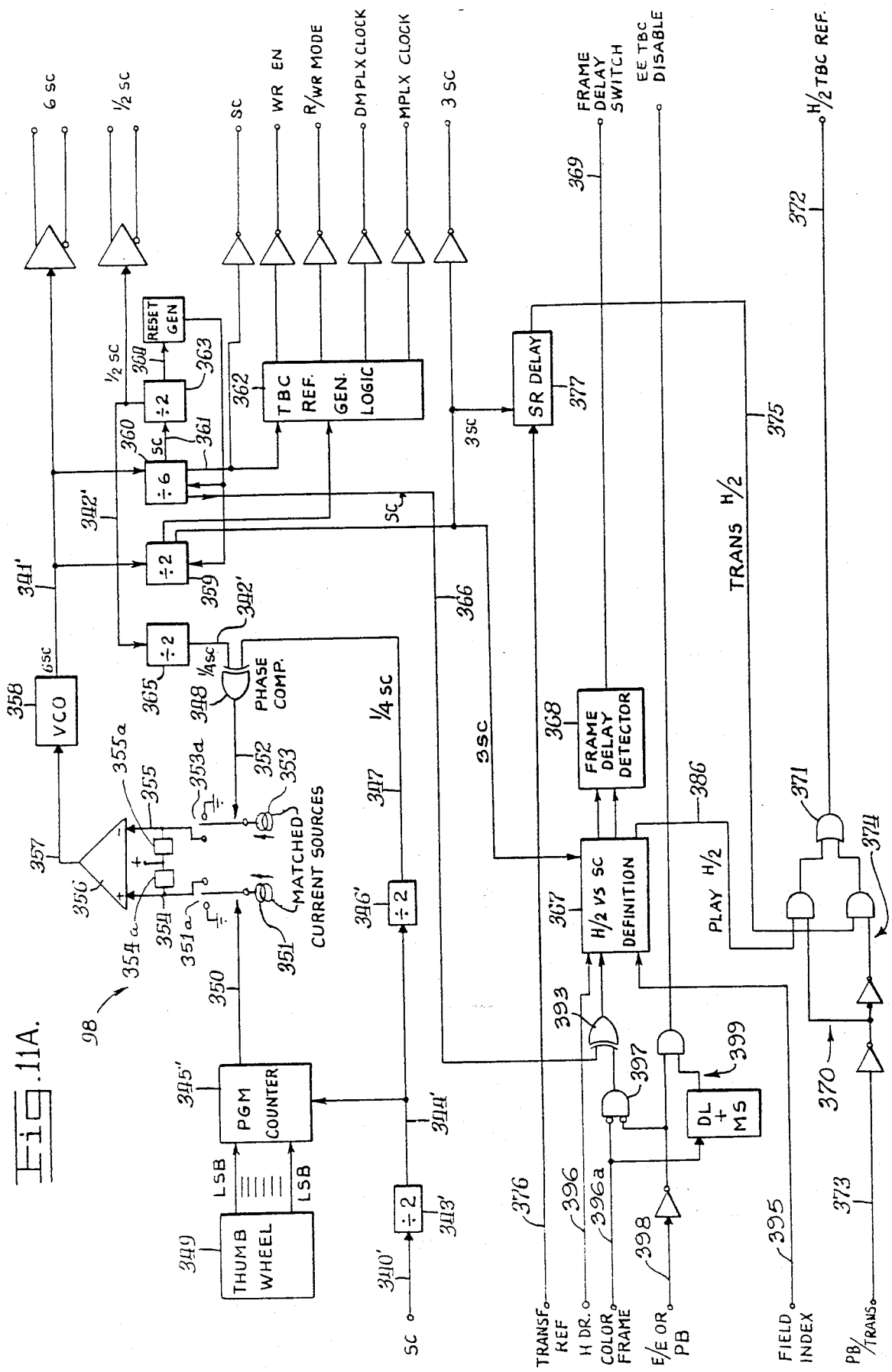
FIG. 11A is a functional block diagram of the reference clock generator circuitry which is a portion of the signal system shown in FIG. 8A.

The operation of the reference clock generator 98 will now be described in more detail in conjunction with the block diagram shown in FIG. 11A. As is shown therein, the top half of the circuitry produces various timing signals including several clock signals and the bottom half uses reference synchronizing information, such as color frame from the reference logic circuitry 125B and field index and horizontal drive signals from the reference input circuitry 93B and generates the control signals used by the time base corrector and chroma circuitry. More specifically, the SC signal is applied to the reference clock generator 98 at input line 340', causing the generator to produce $\frac{1}{4}$SC, SC, 3SC and 6SC clock timing signals and various time base corrector pulse timing signals as indicated at the right of FIG. 11A. The reference lock generator 98 includes circuitry that is controllable by an operator through, for example, a thumb wheel switch 349 so that the phase of the output signals can be adjusted relative to the phase of the regenerated SC signal on the input by introducing various amounts of phase shift into the circuit and thereby set the playback system phase. Using the horizontal sync position control included in the reference input circuitry 93B and the SC phase control together enables an operator to determine and control the delay introduced to the playback signal channel over a large range in small increments. To control the phase of SC, the input regenerated SC signal on line 340' is divided by 2 by a divider 343', the output of which appears on line 344' that extends to two locations, one being the programmable counter 345' while the other is another divide by 2 divider 346' which in turn is connected by line 347 to a phase comparator 348. The thumb wheel switch 349 introduces a ten bit BCD number, ranging from 0 to 399, into the programmable counter 345' which has the effect of varying the phase of the subcarrier over a range of 0° to 399° in 1° increments. The output of the programmable counter, which is a periodic signal whose duty cycle may be varied in increments of precisely 1/720 of its basic period by means of the thumb wheel switch 349, extends to a current switch 351a which modulates the current from a current source 351 of one of two matched current sources 351 and 353. This modulated current is coupled to low pass filter 354a which develops a DC voltage proportional to the duty cycle of the signal on line 354.

A circuit of identical DC characteristics comprising the other matched current source 353, a current switch 353a and a low pass filter 355a, develops a DC voltage on line 355 which is proportional to the duty cycle of the output of the phase comparator 348. The voltages on lines 354 and 355 are applied to a differential amplifier 356, the output of which is extended by line 357 to the control input of a voltage controlled oscillator 358, which operates at a nominal frequency of 6SC. A number of dividers 360 (divide by 6), 363 (divide by 2) and 365 (divide by 2) sequentially operate on the output of the oscillator 358, producing a signal with a nominal frequency of $\frac{1}{4}$SC on line 342' which extends to the second input of phase comparator 348, so that the duty cycle of the signal at the phase comparator output varies with the phase angle between its inputs. Under steady state conditions, the duty cycle of the signal on line 352 is forced to be equal to that of the signal on line 350 within a very small margin of error due to close matching of the current sources 351 and the DC impedance of filters 354a and 354b.

A change in the duty cycle of the signal at the phase comparator 348 output of 1/720 of its basic period requires a change of phase of 0.25° between its inputs, which have a frequency of $\frac{1}{4}$SC, and this in turn requires a change of 1° between lines 340' and 361, where the frequency is 1SC. Thus, changing the value by one on the thumb wheel switch 349 causes a 1° change in phase of the SC signal on line 361. The total range of phase comparator 348 (180° at $\frac{1}{4}$SC) corresponds to 720° at 1SC. For convenience, the thumb wheel switch is limited to 399°, which still insures adequate overrange capability with respect to the necessary 360°.

The phase controlled oscillator 358 provides the phase continuous 6SC clock timing signal over its output line 341' and, through the cooperative operation of the chain of dividers 359, 360 and 363, causes phase continuous 3SC, SC and $\frac{1}{4}$SC clock timing signals to be provided at the outputs as designated in FIG. 11A. The dividers also furnish 3SC and SC clock signals to the logic circuitry 362 that produces phase continuous SC rate read/write (R/WR) mode, write enable (WR EN), demultiplex (DMPLX) clock and multiplex (MPLX) clock signals used by the time base corrector circuitry 100. The schematic diagram illustrated by FIGS. 23A through 23D together with the timing diagram of FIG. 11B disclose the operation of one embodiment of logic circuitry 362 for providing phase continuous time base corrector clock signals with the desired timing relationships.

With respect to the lower portion of the circuitry shown in the block diagram of FIG. 11A, the circuitry redefines an H sync related, namely, H/2, signal so that it is synchronous with the phase continuous 3SC signal that is produced by the upper portion of the circuitry and is placed in a proper position relative to reference H sync. As will become apparent upon consideration of the description of H/2 vs SC definition or reclocking circuit 367 hereinbelow, maintaining H/2 synchronized with respect to reference subcarrier and also so that it occurs at the first line of the first field of every two reference field sequence (which corresponds to the placement of the sync word in the video signal), requires frame rate phase inversion of the subcarrier rate clock controlling the reclocking circuit 367 to redefine H/2 with respect to the phase of SC. Subsequent reclocking of the redefined H/2 signal with the phase continuous 3SC clock signal within the circuit 367 introduces a 46 ns ($\frac{1}{2}$ cycle of 3SC) picture frame to picture frame motion of redefined H/2 relative to reference H sync. This motion occurs because the reclocked and redefined H/2 is mispositioned relative to the proper reference H sync position on alternate picture frames and causes the time base corrector circuitry 100 to misposition the sync word a corresponding amount, or $\frac{1}{2}$ cycle of 3SC, on alternate reproduction of a frame. As will be explained hereinbelow upon consideration of the sync word insertion circuitry portion of the encoder 96, the H/2 rate sync word is inserted in the video signal on alternate picture frames at a position that is displaced $\frac{1}{2}$ cycle of SC from that corresponding to the reference H sync. This is because the sync word inserter is reset every picture frame and because the sync word is positioned on the first line of every frame, it being understood that the first line of successive picture frames have oppositely phased SC. The time base corrector circuitry inherently removes all of this displacement except for the aforementioned ½ cycle of 3SC. A frame delay detector 368 of the reference clock generator 98 generates a frame delay switch signal used by the blanking insertion and bit muting circuitry 127 to correct for such motion. Also, it is not desirable to have the H/2 positive going transition of the unredefined H/2 signal coinciding exactly with a subcarrier transition in the reclocking circuit 367 because an ambiguously timed redefined H/2 pulse signal will be produced for use by the time base correctors 100 and errors in time base correction will result.

To produce an H/2 signal redefined with respect to the phase of the phase adjusted, phase continuous regenerated subcarrier signal, SC, provided by divider 360 is coupled to one input of a phase inverter 393 formed by an exclusive OR gate circuit. The other input of the phase inverter is coupled through a NAND gate circuit 397 to receive the 15 Hz color frame pulse signal generated by the reference logic circuitry 125B and present on input line 396a. The level of the color frame pulse signal at the input of the phase inverter 393 determines the phase of SC at the output of the inverter, a high level resulting in the inversion and a low level not. Inversion of the phase of SC is necessary because an H/2 signal is required that is phase coherent with H sync. (In the recorded video signal, a sync word is inserted in the same lines for all picture frames of the video signal, which in this apparatus are the odd numbered lines of the 525 lines forming an NTSC picture frame.) Without inversion of the phase of SC, the phase of the redefined H/2 signal would change at a 15 Hz rate with respect to H sync by one half of an SC cycle. Such an H/2 signal would not be suitable as a reference for use in processing reproduced video signals during playback operations. The SC signal output by the phase inverter 393 is provided to the reclocking circuitry 367 and is used together with the reference H drive signal received over line 396 and the field index signal received over line 395 to generate the H/2 signal defined with respect to the phase of SC. The reclocking circuitry 367 includes logic circuitry to assure that an unambiguously times H/2 signal is produced and defined with respect to the phase of SC.

The output of the reclocking circuitry 367 is then applied to the frame delay detector 368 which produces the frame delay switch signal on line 369 that identifies the first or second playing of a reproduced still composed of two television fields or a picture frame, so that the clocking circuitry for the blanking insertion and bit muting circuitry 127 will know whether to insert an additional ½ period of 3SC offset for correcting the previously mentioned 46 ns frame to frame motion of H/2.

The redefined H/2 pulse signal generated by the reclocking circuitry 367 appears on line 386 that is gated through gate circuitry 370 and 371 to appear on line 372 for use as the basic reference in the time base corrector circuitry during playback operations, which is signified by an enabling signal provided on line 373 by the encoder switch 126 from control signals issued by the computer control system 92. During playback operations, a high level signal appears on line 373 and the playback H/2 on line 386 will satisfy AND gate circuitry 370 and will appear on line 372.

In other operations, such as E to E and transfer, involving the processing of video signals in a playback channel, the H/2 signal as ordinarily generated by the H/2 vs SC definition circuitry 367 is not used. In E to E operations, continuous time base correction is not necessary since the video signal does not experience a record and reproduce process. Hence, the EE or PB command provided by the encoder switch 126 from control signals issued by the computer control system 92 is coupled over line 398 to the reference clock generator 98 associated with the playback channel selected for use to disable the phase alteration of SC. The phase alteration is disabled through the operation of the NAND phase circuit 397 placing a low level signal on the second input of the phase inverter 393. Furthermore, the EE or PB command is coupled to logic circuitry 399 that responsively generates an EE TBC disable signal used to allow the time base corrector circuitry 100 to operate for approximately ten lines at the beginning of each color frame and, thereby, generate the proper timing correction for each color frame or every 15 Hz. This timing correction is required because during the sync word insertion process for E to E operations the sync word generator is reset every two fields, i.e., frame. This results in a discontinuity of one half SC cycle in the position of the sync word every other frame or every 15 Hz.

When the apparatus is performing a transfer operation through a playback channel, a low level signal is placed on line 373 of the reference lock generator 98 associated with that playback channel. This enables the AND gate circuit 374 to pass a transfer H/2 signal present on line 375 to the OR gate circuit 371 which gates the transfer H/2 to the output of line 372. The transfer H/2 is derived from the sync word inserter portion of the encoder 96 circuitry. An output pulse from the encoder 96 that is coincident with the sync word or line identification is produced and that pulse is used as the time base corrector reference. The pulse appears on line 376 and passes through a shift register delay circuit 377 which correctly positions the pulse that is present on line 376. The transfer H/2 signal is positioned so that the digitized video signal provided to the encoder 96 during a transfer operation has a correctly identified location for insertion of a new sync word.

Specific circuitry that can be used to carry out the operation of the block diagram shown in FIG. 11A is shown in FIGS. 23A through 23D. The operation of the specific schematic circuitry will not be described in detail since it carries out the operation as has been previously described with respect to FIG. 11A. However, with respect to the generation of the H/2 signal so that it is unambiguously redefined with respect to SC, the reclocking circuitry 367 includes an H/2 signal generator 378 comprising a divide by 2 counter and following pulse former respectively formed by an edge triggered flip-flop and following self resetting flip-flop. The counter receives at its clock input H drive signals present on input line 396 and provides an H/2 signal at its output. The H/2 signal is formed into a train of negative pulses, each at a positive going transition, by the H/2 generator's pulse former. The 30 Hz field index signal resets the counter portion of the generator 378 at beginning to the first field of every picture frame so that the pulse of the H/2 signal is the same at the time of the first line of the first field of every picture frame.

The SC signal provided by the phase inverter 393 is also formed into a train of negative pulses by a pulse former 393a. A pulse coincidence detector circuit 378a formed by a low level AND gate and following D latch examines for a coincidence of the SC transition related pulses received from the pulse former 393a and the H/2 transition related pulses provided by a timing selection circuit 379 in response to each negative pulse provided by the pulse former portion of the generator 378. If the positive transition of the H/2 signal provided by the generator 378 becomes too close in time to the positive transition of the SC signal, the transition relates pulses will overlap in time at the coincidence detector circuit 378a resulting in the toggling of the latch of the detector circuit. Toggling of the latch changes the level at an input of an exclusive OR gate 379a included in the timing selection circuit 379 to change it between its inverting and non-inverting mode. The timing selection circuit 379 includes a self resetting, edge triggered flip-flop 379b having its clock input coupled to the output of the exclusive OR gate 379a. By selectively inverting and not inverting the negative pulses provided by the H/2 signal generator 378, the positive edge of the pulse output of the exclusive OR gate is moved relative to SC. The timing selection circuit 379 cooperates with the coincidence detector circuit 378a to position the positive edge of the pulse output of the exclusive OR gate 379a so that unambiguous redefinition of H/2 will always result.

Redefinition of H/2 is performed by the reclocking edge triggered flip-flop 367a having its reset input coupled to an output of the timing selection circuit 379 and its clock input coupled to receive the SC signal provided by the phase inverter 393. Each H/2 transition related pulse resets the flip-flop 367a and the immediately following positive transition of the SC signal received at the clock input changes its state to thereby generate the redefined H/2 transition. A following latch 367b couples the redefined H/2 transition signal to a delay means 391 composed of a counter and following shift register operated to provide a properly timed H/2 signal on the line 380 extending to the frame delay detector circuit 368. The redefined H/2 transition signal output by the latch 367b is coupled to reset the delay means 391 and an SC signal, opposite in phase to that utilized in the reclocking circuitry 367, provided over line 392 clocks the delay means to effect issuance of the redefined H/2 transition signal to the detector 368.

Figure 11C:
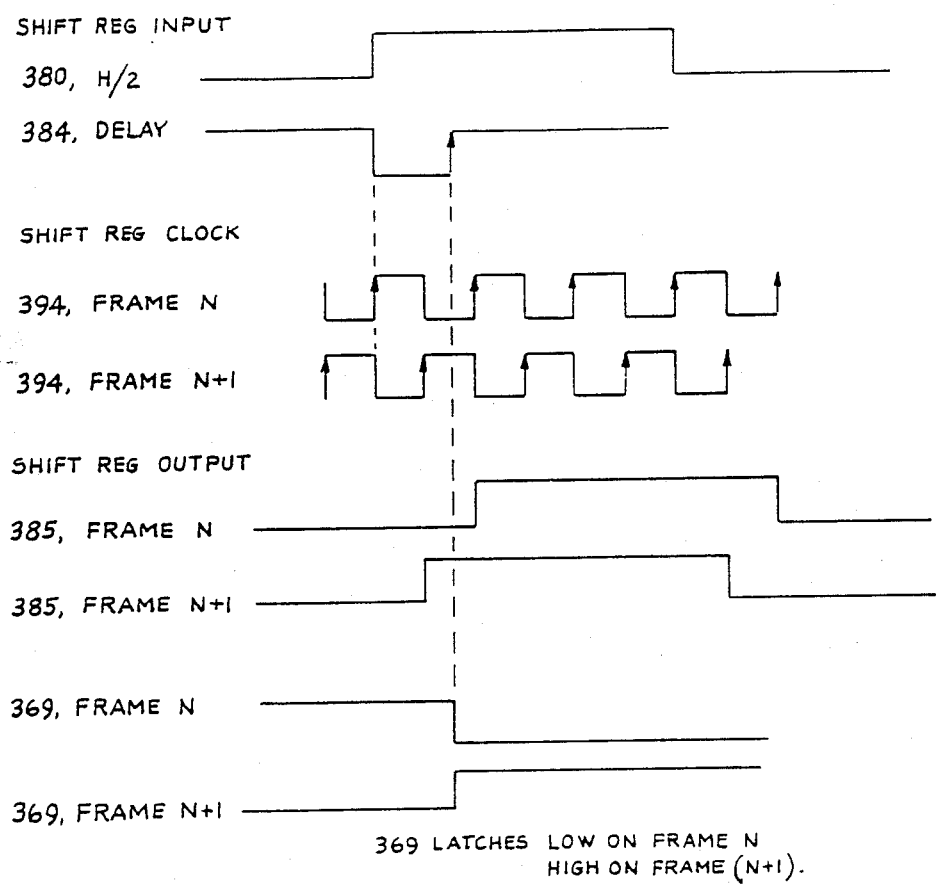
FIG. 11C is a timing diagram illustrating the operation of portions of the reference clock generator shown in FIG. 11A.
Figure 11B:
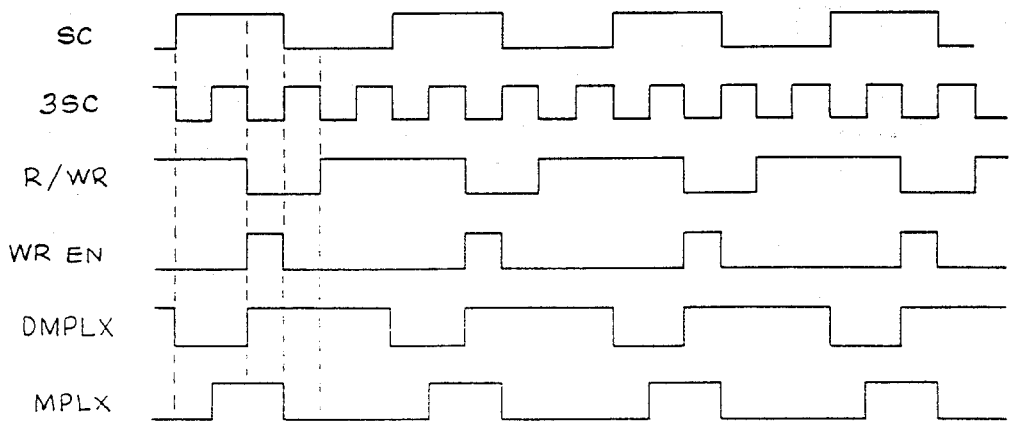
FIG. 11B is a timing diagram illustrating the timing relationships of various signals generated by the reference clock generator circuitry shown in FIG. 11A.
Figure 23B:
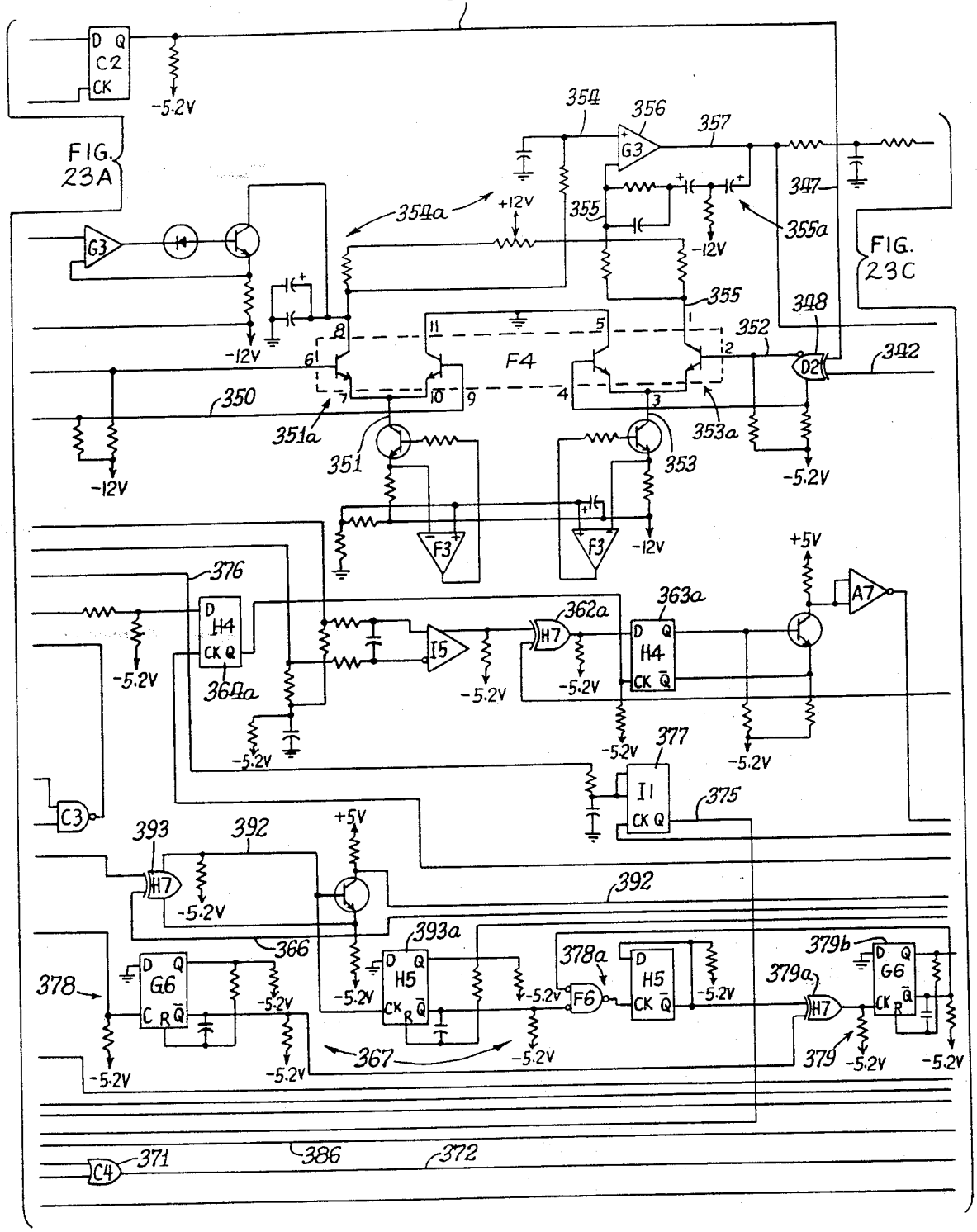
Figure 23D:
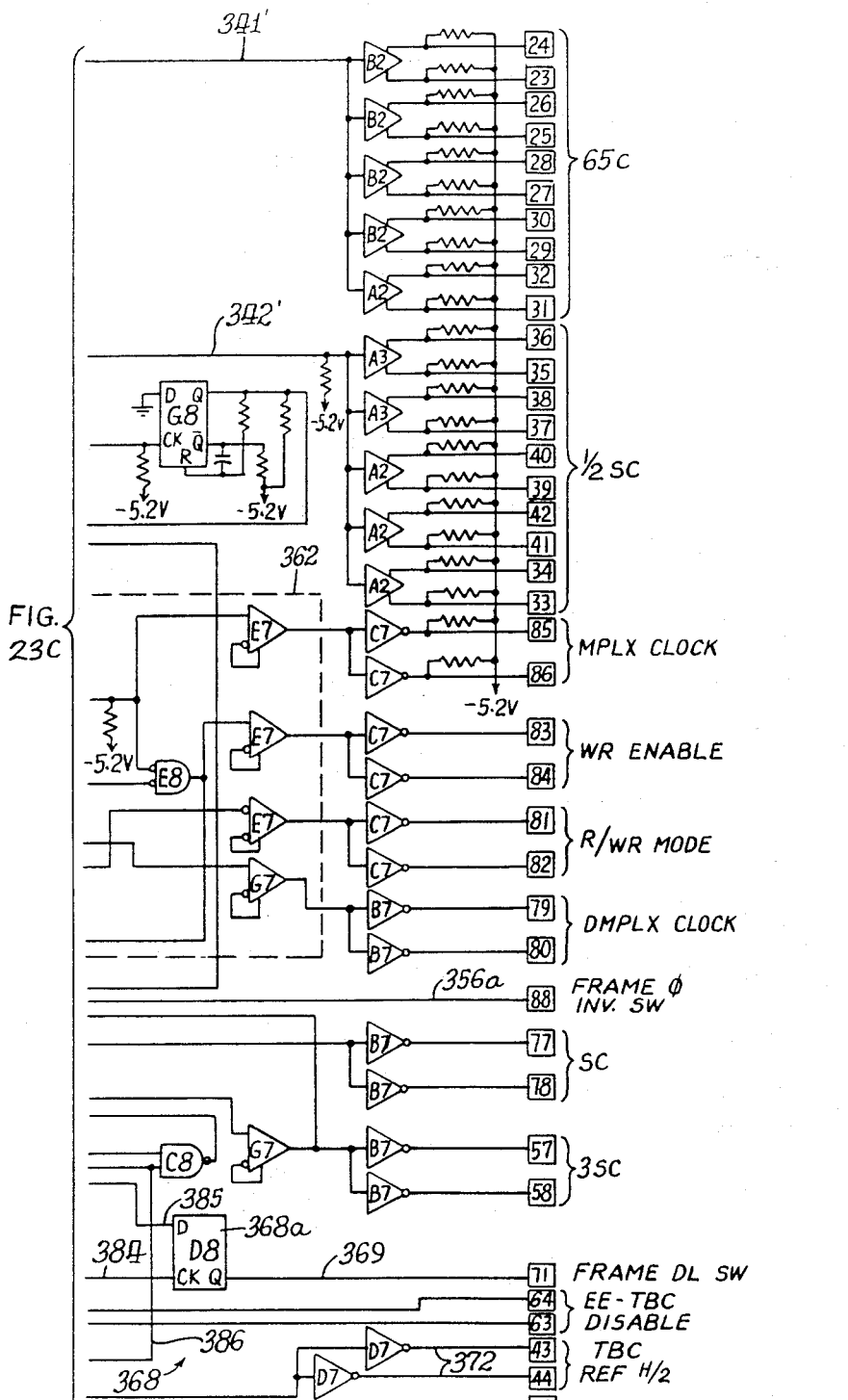
Figure 24A:
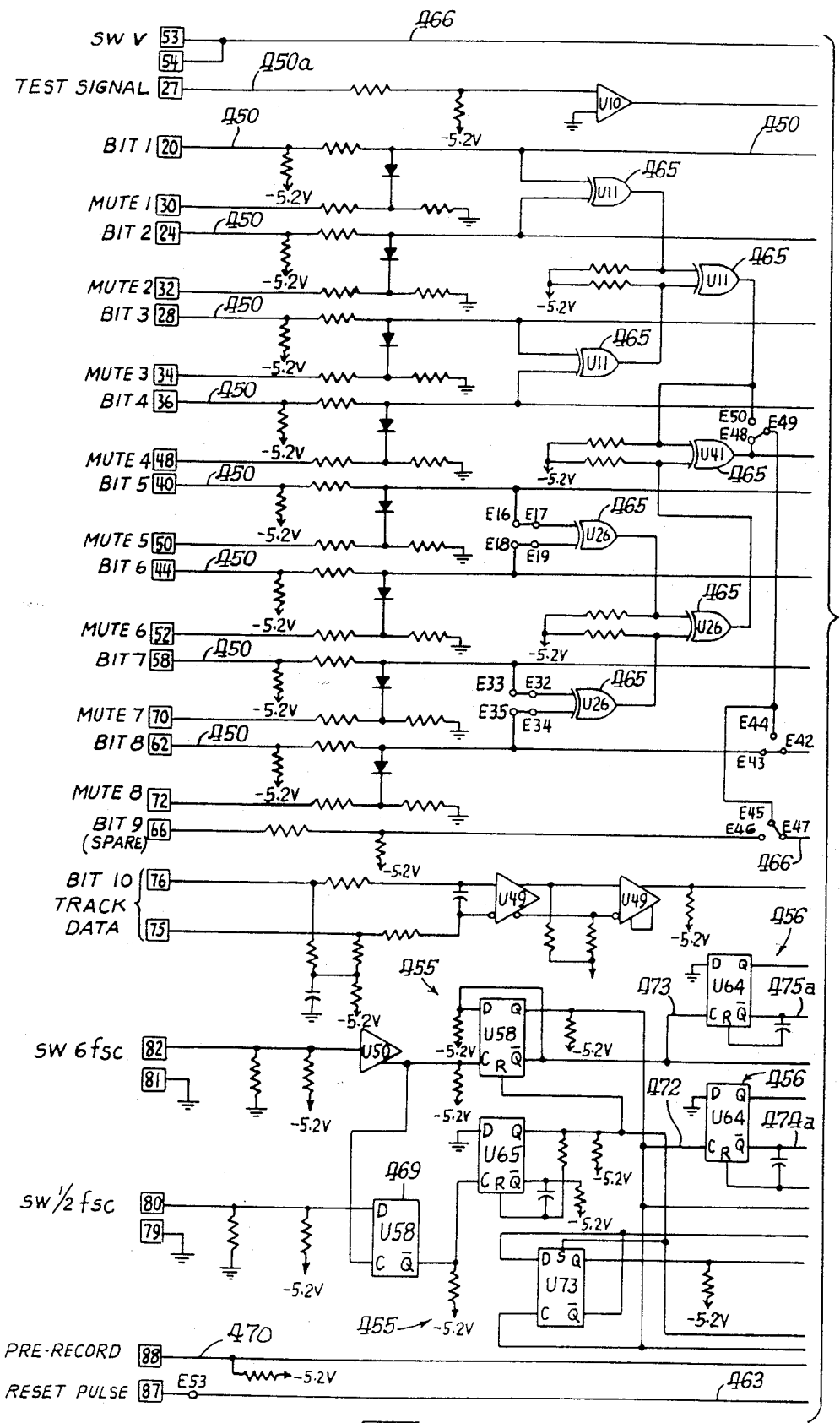
Figure 24C:
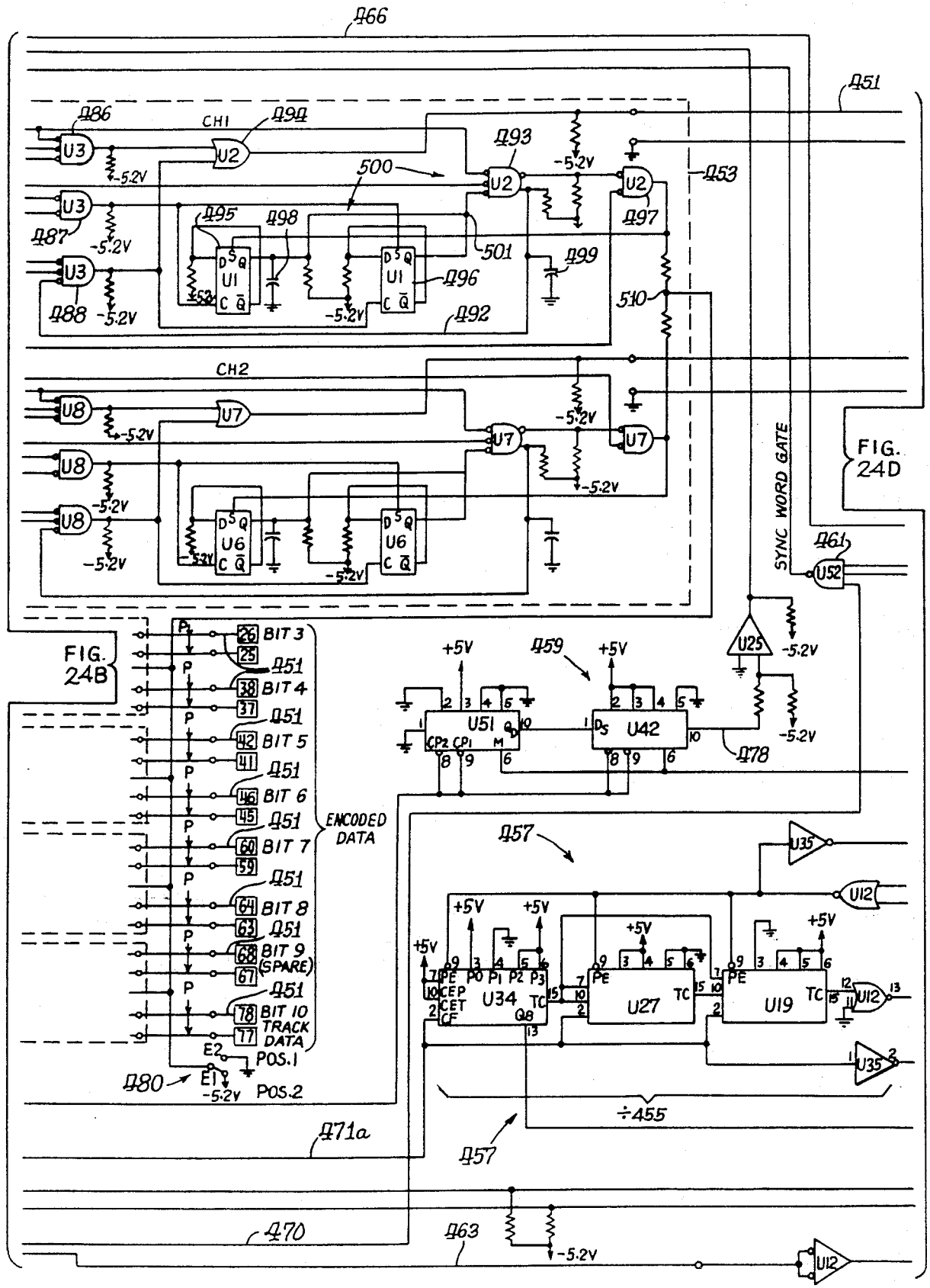

With reference to the frame delay switch signal that appears on line 369 in FIG. 23D, it is a signal that changes level on alternate picture frames and is used in the blanking and bit muting circuitry 127 for adjusting the half cycle of 3SC mispositioning of alternate picture frames as previously discussed. The operation of this portion of the circuitry will now be discussed in connection with FIG. 11C. The signal appearing on line 380 if an H/2 rate pulse signal which has been unambiguously redefined with respect to the phase of the regenerated SC that is inverted on alternate frames so as to insure that the SC redefined H/2 transition signal is stationary with respect to H sync reference. This transition signal is clocked into a shift register 381 by a phase continuous 3SC signal appearing on line 394 and appears on the first output line 385 delayed and synchronized to the 3SC signal. Because the continuous phase 3SC clock is an odd multiple of one half the picture frame frequency, its phase during a first picture frame is 180° different with respect to H sync reference than its phase at the same time during the next picture frame and, hence, is also 180° different frame to frame with respect to the redefined H/2 pulse. Because of this 180° phase relationship difference, the positive transition of the 3SC clock shifts one half cycle picture frame to picture frame relative to the redefined H/2 pulse and consequently the clocking of the shift register 381 relative to the occurrence of the stationary H/2 pulse will change frame to frame by one half of the 3SC clock period. To detect the relationship between the redefined H/2 signal and the phase continuous 3SC clock signal, a stationary pulse is generated from the positive transition of the redefined H/2 signal and is used by the frame delay detector latch or D type flip-flop 368a to determine the phase of the 3SC clock at the beginning of alternate picture frames and provide the phase indicative frame delay switch on line 369 as shown in FIG. 11C. More specifically, the pulse forming circuitry comprised of inverter 382, resistor 388, capacitor 387 and NAND gate 389 generates a stationary pulse from the leading edge of the H/2 pulse signal present on line 380 at the input of the shift register 381. The stationary pulse has an interval of ¾ of a cycle of 3SC and its leading edge (as well as that of the H/2 pulse signal) corresponds to the positive transition of the redefined H/2 signal. Because the shift register 381 is clocked by the phase continuous 3SC clock, the H/2 pulse signal will appear on the shift register's output line 385 at different times relative to its presence on the input line 380 depending upon the phase relationship of the redefined H/2 signal and 3SC signals. When the signals are in phase, the H/2 pulse signal appears on line 385 one cycle of 3SC after its presence on the input line 380. When the signals are out of phase, the H/2 pulse signal appears on line 385 ½ cycle of 3SC earlier. The signal level on line 385 is strobed into the D flip-flop 368a by the positive going transition of the stationary pulse on line 384, which occurs ¾ of a cycle of 3SC after the occurrence of the redefined H/2 pulse signal at the input of the shift register. The output of latch 368a on line 369 indicates whether the H/2 pulse was present on line 385 after a delay of ¾ period thereby determining if the time delay between the positive going signals on lines 394 and 385 is ½ period or 1 period of 3SC. This signal on line 369 in turn is coupled to the blanking insertion and bit muting circuitry 127 to selectively insert a ⅙ 3SC period offset in the clocking of the video data, compensating for the aforedescribed 46 ns frame to frame motion of the redefined H/2.

With reference to the frame phase inverter switch signal that appears on line 356a in FIG. 23D, it is a signal that changes levels on alternate picture frames and is used in the chroma separator and processing circuitry 101 to effect inversion of the chrominance component included in the reproduced video signal on alternate reproductions of the two field color video signal. The playback burst is provided on input lines 361a by the data transfer circuitry 129 and is phase compared with the phase continuous SC by the exclusive OR gate 362a. SC and playback burst alternate between in phase and out of phase conditions with alternate reproductions of the two field color video signal, causing the level of the output of the exclusive OR gate 362a to change at a 15 Hz rate with the change occurring at the time of playback burst. The frame phase inverter switch signal is obtained by clocking the output of exclusive OR gate 362a through a latch 363a with one properly timed clock at every burst flag. The latch 364a receives at its D input the burst flag signal provided on line 360a by the reference input circuitry 93B and is clocked by the phase continuous SC provided at its clock input by the divider 360. Each time a burst flag signal is present on input line 360a, the latch 364a issues a pulse to the latch 363a defined with respect to the phase of SC. This pulse is used to clock the level at the input of the latch 363a to its output. Because the level at the input of the latch 363a changes with alternate reproductions of the two field color video signal, the level at the output of the latch 363a also changes with alternate reproductions to produce the 15 Hz frame phase inverter switch signal on line 356a that defines when the chrominance should be inverted or not in the chroma separator and processing circuitry 101.

The encoder 96 shown in the block diagram of FIG. 8A of the video signal system contains circuitry which performs functions in addition to channel encoding the digitized data on each of the eight video data bit lines, the parity bit and the data track sequence as described hereinbelow. One of the additional functions involves the use of a parity generator to perform a parity check to verify that the data is correct on all of the eight data bit lines. The parity bit is optional and requires an extra data bit line such as is available in the apparatus described herein. The encoder 96 also generates and inserts the sync word (also referred to herein as the line identification or line ID). The sync word is in the form of a 7-digit binary number which is placed in alternate television lines, generally where the horizontal sync pulse had been previously located, it being understood that the horizontal sync had been stripped from the composite video signal by the video input circuitry 93. The sync word is inserted within one cycle of SC of the location previously occupied by the horizontal sync pulse, and the encoder 96 inserts the sync word into each of the eight video data lines, the parity bit line and the data track line before the channel encoding is performed so that the output of the encoder 96 which is connected to the record signal splitter 89 contains the sync word in each of the 10 data streams recorded on a disc pack 75 (or sent to the playback channel 91 during E to E operations).

The encoder 96 operation will now be described in conjunction with a block diagram shown in FIG. 12 and schematic circuit diagrams of FIGS. 24A-D. NRZ-L data from the encoder switch 126 enters on input line 450 and exits on output line 451 of each data bit line after having been (i) checked for parity, (ii) had the sync word inserted in alternate (odd) lines and (iii) channel encoded in a format that is conducive to magnetic recording and reproducing the digitized information with respect to one of the disc packs 75. The input data on each data bit line is applied to one input of a data input AND gate 452 which is connected to a channel encoder 453, which may be switched between two channel encoding formats, both of which will be described hereinafter. In the schematic circuit diagram of FIGS. 24A-D, identical channel encoders for two video data bit lines are shown in their entirety. Identical channel encoders for the other video, parity and data track data lines are contained in dotted line enclosures below the encoders shown in their entirety. A sync word input AND gate 454 in each of the 10 bit lines is used to gate the sync word into the encoder at the proper time. These AND gates are also arranged to insert a test signal in the 10 bit lines if desired, the test signal being provided on line 450a (FIGS. 24A and 24B) by a suitable test signal source, such as digital test pattern generator. A first clock generator 455 has input signals 6SC and ½SC applied thereto by the encoder switch 126 and provides various SC and 3SC outputs as shown. Two the the 3SC outputs are applied by lines 472 and 473 to a second clock generator 456 which provides two time displaced 3SC clock signals on the two lines 474 and 475 that are extended to the channel encoder 453 for clocking the same. The clock signal on line 475 is a $\phi 1$ clock and is displaced one-half cycle of 3SC from the clock signal on line 474, which is a $\phi 2$ clock. During recording operations, these time displaced clocks are derived from the continuous phase 6SC, ½SC signals generated by the reference logic circuitry 125A and provided to the encoder 96 by the encoder switch 126. During other operations, such as recording the blinking cross delete signal, the reference clock generator 98 provides the clock signals. The $\phi 1$ and $\phi 2$ 3SC clock signals are used to drive the channel encoder 453 so that a continuous channel encoded digital signal without phase discontinuities is provided at the output on line 451.

The clock generator 455 has an SC clock output 471a driving a ÷455 divider 457 which can also be reset by a reset pulse provided by the encoder switch 126 on line 463 at a 30 Hz rate. The divider 457 sets a flip-flop (FF) 458 through the start line 464 and subsequently resets the FF 458 when a pulse appears on the stop line 465 extending to the reset pin. The START and STOP pulses define a window during which a single 7-digit binary sync word provided at the output of a sync word generator 459 can be inserted in all data bit lines simultaneously.

During the vertical blanking period, a pulse is applied to a monostable multivibrator 460. The multivibrator is active for a period of about 10 lines of the vertical blanking period by switch vertical signal provided on line 466 by the encoder switch 126 and its output is applied to one side of gate 461 (shown in this block to be an NAND gate), the other side of which is supplied by the output of the window generating FF 458. The output of the NAND gate 461 extends to the other input of the AND gate 454 as well as through on inverter 462 to one side of the AND gate 452.

During the operation of the encoder circuitry 96, it is desired that the data stream for each bit be applied on an input such as input 450 which is representative of the eight separate data input lines, each of which is connected to a separate encoder 543 and the associated data and sync word input AND gates 452, 454 and inverter 462 so that a data output line 451 exists for each of the data bits and each of the data streams is properly channel encoded and has a sync word inserted therein. Since it is desired that the sync word occur close to the former location of the horizontal sync pulse and since it is also desired that it not be confused with data of the data stream, the data bit lines input to the channel encoders 453 are disabled by the data input gates 452 when the sync word is inserted during a sync word gate window that is generated by the divider 457 and FF 458. More specifically, the divider 457 provides a START pulse for setting the FF 458 and this enables one input of each AND gate 454 while simultaneously disabling each AND gate 452 thereby clocking the data entering on lines 450. The divider 457 issues a pulse over line 467 to the sync word generator 459 twelve data bit intervals after the generation of the START pulse and the sync word generator 459 then generates the 7-digit binary word which is applied to the upper input of all AND gates 454 which have previously been enabled. The AND gates 454 pass the sync word into each channel encoder 453 where it is encoded onto the data stream. After the sync word has been generated, the divider 457 issues a STOP pulse 29 data bits later which resets the FF 458, disabling all AND gates 454 and simultaneously enabling all AND gates 452 so that the data on lines 450 will be passed into the channel encoders. It should be understood that the data stream line 450 is continuous in its flow and that disabling the AND gates 452 merely blocks it from passing. Hence, the information is only discarded in a sense during the insertion of the sync word. However, since the sync word is inserted approximately at the previous location of the horizontal sync pulse, no active video informational data is lost.

During the vertical blanking interval, the multivibrator 460 provides an output to the NAND gate 461 which occurs for an interval of about 10 lines. This disables the data input AND gate 452 during the 10-line interval of the blanking period so that the received data is prevented from passing to the channel encoder during this interval. Thus, the only data or logical 1 bits that appear on the output data line 451 during the 10 line interval of the vertical blanking period are those in the sync words that appear every other line, as previously described, and pass through the sync word gate 454. This insures that the decoder and time base corrector circuitry 100 will be locked on the actual sync word during playback rather than some randomly occurring sync word bit pattern that might be contained in the active video information during the flow of the data stream.

Another aspect of the operation of the encoder 96 will be more clearly understood by referring to FIGS. 8A and 8B. The record signal splitter 89, disc drive data interface 151 and data select switch 128 couple the encoder 96, disc drive 73 and decoder and time base corrector circuitry 100. It should be appreciated that during a seek operation when the heads in the disc drive 73 are moving between tracks, it is desirable to prevent the introduction of perturbances in the signal system. Ordinarily, the record signal processing system 88 will provide at the output of its encoder 96 digitized data even in the absence of an input video signal. While this signal will represent noise information, the digital signal processing electronics of the apparatus cannot distinguish between digitized noise and digitized video information. This factor is taken advantage of when the apparatus is performing a seek operation. During seek operation, the transducing heads create noise signals that do not conform to the channel encoded format of the digital data ordinarily present in the signal system. Such noise signals, if permitted to enter the playback channel 91, undesirably disturb the phase lock loops of the decoder and time base corrector circuitry 100. To avoid such disturbances, the disc drive data interface 151 is switched (as in an E-to-E operation) to reroute the output provided by the encoder 96 to the decoder and time base corrector circuitry 100. In this manner, the decoder and time base corrector circuitry 100 are receiving channel encoded digital signals that maintain the respective phase lock loops in the circuitry 100 within their normal operation range. Hence, when the heads of the disc drive 73 are properly positioned and playback data provided to playback channel 91, the decoder and time base corrector circuitry 100 are prepared to immediately provide the output decoded and time base corrected signals.

In addition, the encoder 96 also serves to cause black level data to be generated for use in recording on the disc surfaces as previously described during the first two revolutions of the disc pack 75 prior to the recording of the video signal information on the subsequent two revolutions of the disc pack. Accordingly, the pre-record line 470 (FIG. 24A) extending from the electronics record signal splitter 89 is activated as a result of signals provided by the disc drive data interface 151 and causes NAND gate 461 to block any logical "1's" as may be present on the input lines 450 thereby producing the black level at the input of the channel encoder circuitry 453. It should be noted, however, that the encoder 96 still functions to insert the sync word in the black level signal.

The NRZ-L data in each data bit line 450 is channel encoded selectively by the channel encoder 453 into the DC free self clocking channel code described in the aforementioned U.S. Pat. No. 4,027,335 or the self clocking channel code described in U.S. Pat. No. 3,108,261. As will be described further hereinbelow, the two position code selection switch 480 selects between the two channel codes. In both codes, the NRZ-L data bit stream on a data bit line is broken into discrete bit times commonly designated as data bit cell times. For the channel code described in the U.S. No. 3,108,,261 Patent, the code rules followed result in logical first bits, e.g., logical 1's to be represented by signal transitions at a particular location in the respective bit cells, specifically at mid-cell, and logical second bits or logical 0's to be represented by signal transitions at a particular earlier location in the respective cells, specifically at the beginning or leading edge of each bit cell. Any transition occurring at the beginning of one bit interval following an interval containing a transition at its center is suppressed.

In the channel code described in the aboveidentified U.S. Pat. No. 4,027,335, the input data stream in each data bit line may be viewed as the concatenation of variable length sequences of three types: (a) sequences of the form 1111—111, any number of logical 1's but no logical 0's; (b) sequences of the form 0111—1110, any odd number of consecutive 1's or no 1's, with 0's in the first and last positions; (c) sequences of the form 0111—111, any even number of consecutive 1's preceded by a 0. A sequence is of type (c) only if the first bit of the next following sequence is a zero. Sequences of types (a) and (b) are encoded according to the code rules described in the No. 3,108,261 Patent. A sequence of type (c) is encoded according to the No. 3,108,261 Patent rules for all bits except the last logical 1, and for this 1 the transition is simply suppressed. By this means, the type (c) sequence, viewed in isolation, is made to appear the same as a type (b) sequence, that is, the final logical 1 looks like a logical 0.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, than a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded and 1 and 0 in that order, then no transitions are output during the next two bit intervals. If the next subsequent bit is another 0, then it is separated from its predecessor by a transition in the usual aforementioned No. 3,108,261 patent code fashion. This channel code provides for the transmission of data in binary form over an information channel such as a magnetic record/playback system, incapable of transmitting DC, the information being transmitted in self-clocking fashion.

With respect to the channel code, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

The channel encoders 453 illustrated by the FIGS. 24A through 24D operate in accordance with the aforedescribed code rules. FIG. 24E is a timing diagram depicting the operation of the channel encoder 453 included in one of the data bit lines 450. With switch 480 shown in FIG. 24B in the indicated position, the channel encoders 453 provide encoded data in accordance with the code rules of the aforementioned No. 4,029,335 patent. In its other position, the channel encoders 453 provide encoded data in accordance with the code rules aforementioned No. 3,108,261 patent.

The channel encoder will now be described with the code selection switch 480 set as shown in FIG. 24B to effect channel encoding of one of data bit streams according to the code rules of the aforementioned No. 4,029,335 patent. A description of the differences in the operation of the encoder when the switch 480 is set in its other position to effect channel encoding of the data bit stream according to the code rules of the aforementioned No. 3,108,261 Patent will follow.

As described above, data encoded according to the 4,027,335 patent code rules requires examining two successive data bits to be encoded whenever the modulo-2 count of logical 1's previously encoded is odd. For this purpose, each channel encoder 453 includes a pair of serially connected input latches 481 and 482 clocked by the trailing positive edge of the $\phi 2$ 3SC clock signal (FIG. 24E-(2)) on line 474a, which is coupled to line 474 by an inverter 483. The input latches provide a two bit cell delay from the input of latch 481 to the output of latch 482. At each trailing positive edge of the $\phi 2$ clock, latch 481 is operated to latch the present data level of the bit stream at its input so that it appears at its output (FIG. 24E-(3)) and latch 482 is operated to latch the preceding data level of the bit stream contained in latch 481 so that it appears at its output (FIG. 24E-(2), (3) and (4)). Therefore, the outputs of the latches 481 and 482 contain the data bits of two consecutive bit cells that are to be encoded.

The outputs of the latches extend to the inputs of three NAND gates 486, 487 and 488 for separately gating through pulses corresponding to logical 1's and 0's in the data bit stream. NAND gate 486 receives three inputs; one from the output of latch 481, one from the output of latch 482 and $\phi 1$ clock pulses (FIG. 24E-(1)) placed on line 475a by an inverter 484 connected to the output line 475 of the clock generator 456. This NAND gate is enabled to provide an output pulse 489 (FIG. 24E-(6)) upon receipt of a $\phi 1$ clock whenever its other two inputs are at a low level, which occurs only when successively received data bits are logical 0's. Consequently, NAND gate 486 issues logical 0 related pulses that are marked by transitions in the channel encoded format of the data stream output by the channel encoder 453. A logical 0 bit that immediately follows a logical 1 bit is blocked from passage by the NAND gate because the latch 482 will be high when, for example, the $\phi 1$ clock pulse 490 (FIG. 24E-(1)) occurs. Hence, the channel encoder 453 follows the code rules described in the aforementioned No. 3,108,261 patent for successively occurring logical 0 data bits.

On the other hand, the NAND gate 487 has two inputs and is enabled to provide an output pulse (FIG. 24E-(5)) upon receipt of a $\phi 1$ clock for all logical 0 data bits. Because the output of latch 482 enables the NAND gate 487, the logical 0 related pulses are provided one data cell time after the data has been latched into the channel encoder 453.

NAND gate 488 has three inputs and is enabled by the inverted output of the latch 482 to provide an output pulse (FIG. 24E-(7)) upon receipt of a $\phi 2$ clock for all logical 1 data bits, unless a high level bit suppression command 491 (FIG. 24E-(10)) is placed on the input of the NAND gate by a line 492 extending from a bit suppression NAND gate 493 as will be described hereinbelow. NAND gate 488 generates the logical 1 related pulse during the interval of the $\phi 2$ clock, hence, before the latch 482 is clocked by the trailing positive edge of the $\phi 2$ clock. The logical 1 related pulses are provided by the NAND gate 487 one data cell time after the data has been latched into the channel encoder 453 at latch 481.

An OR gate 494 has two inputs connected to receive the logical 0 pulses 489 (FIG. 24E-(6)) provided by NAND gate 486 according to the No. 3,108,261 patent code rules and the logical 1 pulses 515 (FIG. 24E-(7)) provided by the NAND gate 488. The output of the OR gate 494, which appears on the encoder output line 451, will, therefore, be a train of pulses (FIG. 24E-(14)) that occur according to the code rules for the channel encoder. Hence, the NAND gates 486 and 488 together with the OR gate 494 serve to encode the incoming NRZ-L data stored by the latches 481 and 482 into the selected channel code format. The NAND gate 487 operates with bit suppression logic circuitry 500 described below to control the selective suppression of logical 1 data bit related transition in the channel encoded data. By disabling the bit suppression logic circuitry 500, as would occur by changing the position of the switch 480 from that shown in FIG. 45C, the NAND gates 486 and 488 will encode the data according to the No. 3,108,261 patent rules.

To encode the data bit stream according to the aforementioned No. 4,027,335 patent, the bit suppression logic circuitry 500 includes two modulo-2 counters 495 and 496 for counting encoded logical 1's and 0's and, together with cooperating gate circuitry, effecting the generation of the bit suppression command on line 492 that suppresses selective logical 1 bit related transitions in the channel encoded data appearing on line 451. The modulo-2 counter 495 counts the logical 0 related pulses coupled to its clock input by the NAND gate 487. Logical 1 related pulses provided by NAND gate 488 are coupled to the clock input for counting by the modulo-2 counter 496. Counter 495 recognizes the beginning of each sequence by toggling in response to logical 0 pulses each time a logical 0 is encoded and being cleared each time a logical 1 related transition is suppressed. As can be seen from the aforedescribed code rules, counter 495 toggles twice during a type (b) sequence and never changes state during a type (a) sequence, and therefore is in its cleared state before the start of any sequence. The bit suppression logic circuitry 500 must recognize the end of a type (c) sequence. Modulo-2 counter 496 is employed in the performance of this function by toggling in response to logical 1 pulses each time a logical 1 is encoded and being cleared in response to logical 0 pulses each time a logical 0 is encoded. Waveforms (8) and (9) of FIG. 24E illustrate the respective operations of the modulo-2 counters 495 and 496 if their outputs are not connected together at the wired-OR 501. Waveform (13) of FIG. 24E illustrates the actual state at the wire-ORed connection 501. As should be appreciated from the foregoing, if counter 496 is not in its cleared state, the counter 495 is in its cleared state, the present bit to be encoded is a logical 1 and the next following bit is a logical 0, the bit suppression command is provided by NAND gate 493 on line 492 to disable the NAND gate 488 and thereby suppress the encoding of the present logical 1 bit.

Considering the cooperating gate circuitry for controlling the clearing of the two modulo-2 counters 495 and 496, counter 496 has its set terminal coupled to the NAND gate 487 so that its output is set high each time a logical 0 related pulse is output by the NAND gate 487. The counter 495 has its set terminal coupled to the output of a NAND gate 497 so that its output is set high each time a logical 1 related transition is suppressed in the channel encoding of the data bit stream. For reasons that will become apparent from the following description, a pair of capacitors 498 and 499 are connected in the output circuits of the modulo-2 counter 495 and NAND gate 493, respectively, to delay the set logic level of counter 495 appearing at the wired-OR 501 and removal of the bit suppression command from NAND gate 488.

The bit suppression command is generated by the NAND gate 493 that examines the first of consecutive data bits to be encoded and which is present in inverted form at the output of the latch 482, the next following of the consecutive data bits to be encoded and which is present at the output of the latch 481 and the counter states of the modulo-2 counters 495 and 496. If either one of the counter outputs at the wire-OR 501 is high, the NAND gate is disabled. However, whenever the beginning of a type (c) sequence occurs, both counters 495 and 496 will be low, thereby placing an enabling signal at the input of the NAND gate 493. If the next two bits to be encoded are a logical 1 followed by a logical 0, the bit suppression command 491 will be generated and placed on line 492 upon the occurrence of the $\phi 2$ clock pulse 502 (FIG. 24E-(2)) immediately preceding the $\phi 1$ clock pulse 490 that would effect the generation of the logical 1 relates pulse through NAND gate 483. Hence, when the $\phi 1$ clock pulse 490 (FIG. 24E (1)) occurs on line 475 that would cause the NAND gate 488 to generate a logical 1 bit pulse, the NAND gate 488 is disabled by the bit suppression command on line 492 and the logical 1 bit pulse is suppressed as represented by the pulses 512 shown in phantom at line (14) of FIG. 24E. The bit suppression command is terminated upon setting the counter 495. The set pulse 505 (FIG. 24E-(12)) is provided by the NAND gate 497 in response to the bit suppression command 491 (FIG. 24E-(10)) on line 510 and the aforementioned $\phi 1$ clock pulse 490, which occurs ½ cycle of 3SC after the $\phi 2$ clock pulse or about 47 nanoseconds. To insure that the counter 495 is not set and the bit suppression command not removed until after the $\phi 1$ clock pulse 490 has ended, the delay capacitors 498 and 499 are provided to delay the return of the counter 495 to its high set state, hence, disabling of the NAND gate 493 and to delay the return of NAND gate 493 to its low disabled state, hence, extending the duration of the bit suppression command 491. The effect of the delay is seen at 508 and 509 of the waveforms (10) and (13) of FIG. 24E.

To disable the bit suppression logic circuitry 500, switch 480 is placed in the position that places a high level signal (ground in the channel encoder 453 of this apparatus) on the set line 510 for the counter 495. This places the counter permanently in its set state, thereby placing a disabling high level signal permanently at the wire-OR input of the NAND gate 493. Hence, bit suppression commands 491 can not be generated and bits will not be suppressed.

Commonly, self clocking channel encoded data code formats carry data and clock information as particularly placed transitions between two signal levels. When such encoded data is sent through a transmission channel, it usually experiences some timing distortion because of the non-linear characteristics of most transmission channels. If the timing distortion is significant, errors may result because of the inability of the channel decoder to determine the correct location of the transmitted transitions. Furthermore, at high data rates, such as found in the apparatus described herein, the timing distortion may result in unacceptable errors in the transmitted data. This is particularly the case where, as in the case of the channel codes selected for use in the apparatus herein, oppositely directed transitions carry the data and timing information. Non-linear transmission channels will alter the positively and negatively going transitions in a non-linear manner with respect to time. Hence, level sensitive data detectors commonly used at the terminal of a transmission channel to restore the transmitted data so that it has properly positioned transitions that will position the positive and negative transitions differently. Different positioning occurs because a positive transition with substantial timing distortion will reach the level selected for sensing the presence of transitions at a time after its nominal position that is different from that required by a similarly distorted negative transition.

To enhance the reliability of transmission of channel encoded data in which oppositely directed transitions carry the data and clock information, each of the channel encoders 453 encodes the data bit stream at its input by providing pulses in accordance with the rules of the selected channel code at the transition locations of the channel encoded format. In the particular channel encoder used in the apparatus described herein, logical 1 data bit pulses 515 (FIG. 24E-(7)) and (14)) are provided at the data cell boundaries to define logical 1 bit related transitions that appear in the channel encoded data and logical 0 data bit pulses 489 (FIG. 24E-(6) and (14)) are provided at center of a data cell to define logical 0 bit related transitions that appear in the channel encoded data. The transition-related pulses are generated by the clock generator 456 to have a precisely defined edge, the leading edge being selected. The second clock generator 456 includes two one-shot multivibrators that are clocked by the oppositely phased 3SC clock signals provided by the first clock generator 455 over lines 472 and 473. Since the leading edges of the positive pulses generated by each of the one-shot multivibrators are defined by rapidly switching the multivibrators from its stable state to its quasi-stable state (there being no significant time constant determining components involved), each leading edge will be identical to all others and occur at a precise time following the occurrence of the positive clocking transition of the clocking signal. The two multivibrators of the second clock generator 456 thusly provide $\phi1$ and $\phi2$ clock pulse trains, which in the embodiment described herein have a pulse width of about 17 nsec, with the leading edges of the pulses of each train precisely defined with respect to each other and those of the other train. As described hereinbefore, the $\phi1$ clock pulses provided on line 475 are gated through the NAND gate 488 as logical 1 data bit transition relates pulses that appear in the channel encoded data and the $\phi2$ clock pulse provided on line 474 are gated through NAND gate 486 as logical 0 data bit transition related pulses that appear in the channel encoded data. Since the NAND gates 488 and 486 are in an enabled condition at the times the $\phi1$ and $\phi2$ are received for transmission as transition related pulses (FIG. 24E-(4), (7) and (14) for logical 1 bit pulses and FIG. 24E-(3), (4), (5), (6) and (14) for logical 0 bit pulses), their respective leading edges will not be noticeably affected by the transmission through the NAND gates. Because the transmission channel over which the pulses are sent will act on identical pulse edges the same, the precise locations of the transition-related positive pulse edges, hence, data signal transitions themselves, are not lost as a result of any distortion that may be introduced to the pulse by the action of the transmission channel.

The channel encoded transition relates pulses output by the encoder 96 over lines 451 are coupled by the electronics record signal splitter 89 to the transmission line 152 extending to the disc drive data interfaces 151 associated with the disc drives 73. A disc drive particularly suited for use with a preferred embodiment of the present invention is described in U.S. Pat. No. 4,119,999.

The 10 data bit streams of channel encoded data, comprising 8 video data bit streams, 1 parity bit stream (if a parity bit is added) and 1 data track bit stream, transmitted b a disc drive 73 (FIG. 8B) over a transmission line bus 154 are received by one or more of the playback channels 92 (FIG. 4) selected by the data select switch 128. At the input of each playback channel, each of the 10 transmitted data bit streams is received by a separate data decoder and time base corrector included in the circuitry 100 for decoding the channel encoded data back to the NRZ-L form of digital code and then time base correcting the NRZ-L data to remove any intra channel inter channel bit time displacement errors that may be present in the received data streams.

Figure 25B:
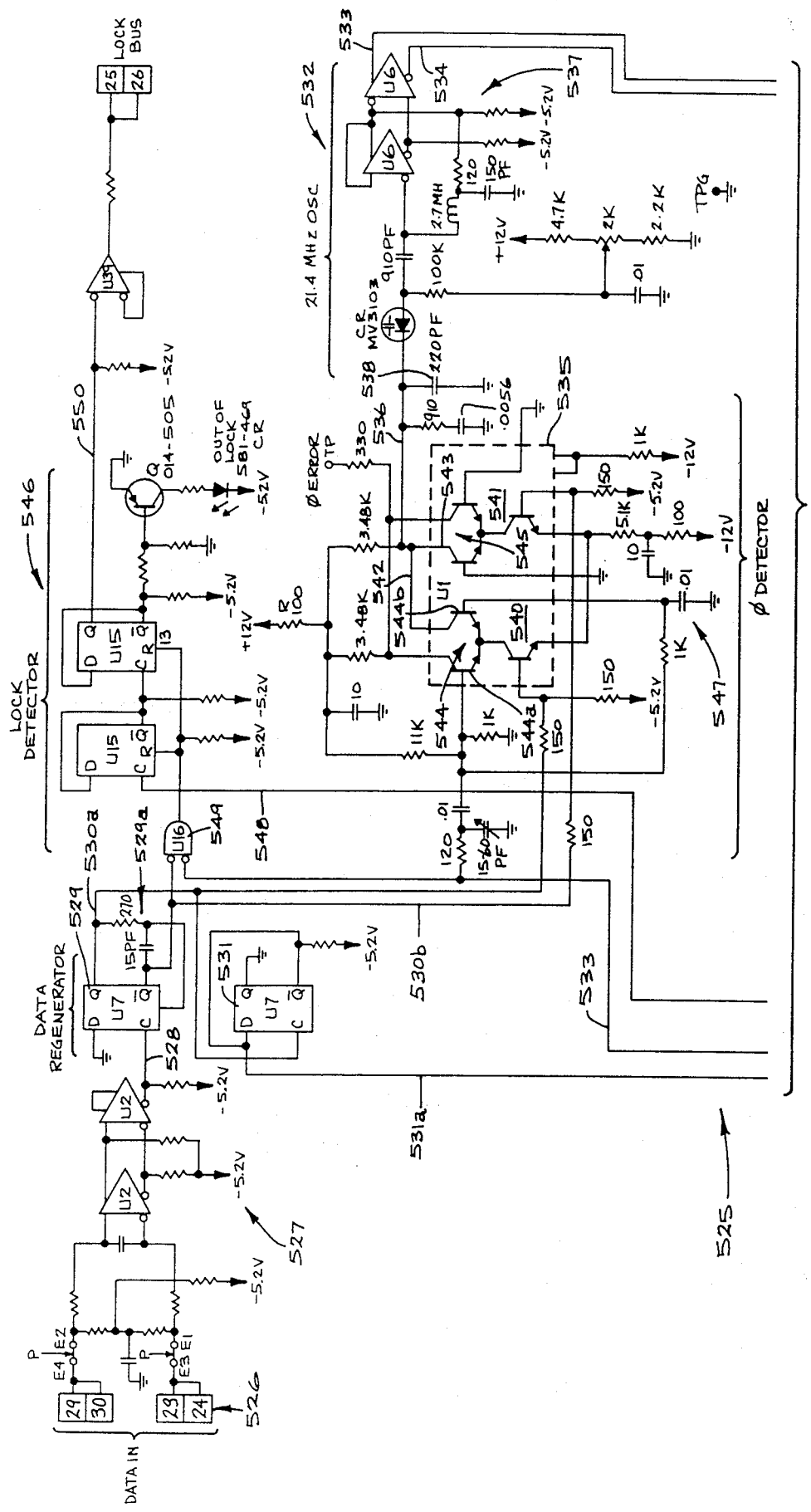

As described above, before the received data bit streams are time base corrected, each channel encoded data bit stream is decoded back to its original NRZ-L digital form. For this purpose, and with reference FIGS. 25A and 25B, the data decoder and time base corrector circuitry 100 includes for each data bit line a channel decoder circuitry portion 525 having a pair of input terminals 526 coupled to the data select switch 128 (FIGS. 8A and 8B) for receiving channel encoded data, which as described hereinbefore, is in the form of channel encoded transition related pulses, such as pulses 515 and 489 shown in FIG. 24E-(14). The pair of input terminals 526 are coupled to a differential amplifier line receiver circuit 527 connected to reject common mode noise in the pair of complementary transition related pulses received from the transmission line pair included in the transmission line bus 154 after passage through the data select switch 128 (FIG. 8B). In addition, the differential amplifier line receiver circuit 527 regenerates a single transition related pulse from each transmitted pair of complementary transition related pulses so that the regenerated pulse has a well defined leading edge properly positioned according to the code rules of the channel code selected for originally encoding the video NRZ-L data. More specifically, the differential amplifier line receiver circuitry 527 provides a single regenerated transition pulse with leading and trailing edges provided when the levels of the edges of the received complementary pulses are the same. By examining the edges of the transmitted complementary pulses in this manner, the leading edges of all regenerated pulses will be properly positioned according to the channel encoding rules because the same sense, i.e., positive going and negative going, edges of each pair of the complementary pulses are employed to define the occurrence of the leading edge of each regenerated transition related pulse. Because the transmission channel through which the transition related pulses are sent to the decoder circuitry 525 affect identical pulse edges the same, any time distortion introduced to the pulse edges will not effect the regneration of the transition related pulses.

Following the regeneration of the transition related pulses, they are coupled over line 528 to clock a one shot multivibrator 529 at each occurrence of a regenerated pulse, using the defined leading edge to effect clocking. The one shot 529 is rapidly switched from its stable conduction state to its quasi-stable conduction state to provide the precisely defined leading edge of the transition related pulses. The one shot 529 has one of its outputs connected to line 530a that extends to the clock input of a divide by two flip flop 531. Upon the occurrence of each regenerated transition related pulse, the flip flop 531 is rapidly switched because its two stable conduction states by the leading edges of the regenerated pulses and thereby converts the pulse form of the channel encoded data to the level form for subsequent decoding of the data back to its original NRZ-L digital form as will be described hereinbelow.

The one shot 529 provides complementary outputs of the channel encoded data on line 530a and 530b. The complementary outputs are coupled to a 6SC clock generator 532 which provides complementary 6SC clock signals on its output lines 533 and 534 for use by the data decoder circuitry 525 for decoding the received data. The clock generator includes a 6SC voltage controlled oscillator 537 which is locked by an operatively associated phase detector 535 to the phase of the data clock carried by the channel encoded data. The complementary transition related data pulses output by the one shot 529 on lines 530a and 530b are coupled to the input of the phase detector 535, which has its output on line 536 coupled to the control input of the 6SC voltage controlled oscillator 537. The phase detector 535 examines the phase of the 6SC clock provided by the oscillator 537 with respect to the received and regenerated transition related data pulses and provides an error correction signal to the oscillator via the phase error smoothing capacitor 538. A change in the phase of the received data causes the phase detector 535 to change the average voltage level on the capacitor 538 by a corresponding amount and thereby cause the phase of the 6SC clock provided by the voltage controlled oscillator 537 to be adjusted to clock carried in the channel encoded data.

The phase detection operation is performed by a pair of matched current sources 540 and 541, each having an output line 542 and 543 respectively connected to the line 536 coupled to the error averaging capacitor 538. In the absence of a transition related data pulse, the line 530b extending from the one shot 529 is high, which enables the current source 541. Because the base electrodes of each transistor of the differential pair forming a current switch 545 at the output of the current source 541 are grounded, the current provided by the current source 541 divides equally in the two current paths defined by the current switch 545. Current in the path defined by the current switch 545 connected to the output line 543 flows onto line 536 to change the error smoothing capacitor 538 to a level which, when a data stream is not input to the decoder circuitry 525, will cause the voltage controlled oscillator 537 to provide a 6SC clock at a nominal frequency and phase. Thus, even in the absence of a data bit stream at the input of the decoder circuitry 525, a 6SC clock is provided at its nominal frequency. This facilitates rapid synchronization of the oscillator 537 to data clock when a data bit stream is initially received and proper decoding of the channel encoded data.

When a transition related data pulse is received on the input line 526, the one shot responsively provides a high level signal on line 530a and a low level signal on line 530b for an interval determined by its time constant circuit 529a, which in the decoder circuit described herein is about 17 nsec. The low level signal on line 530b disables the current source 541, thereby terminating the provision of charging current through the current switch 545 to the error smoothing capacitor 538. However, the high level signal on line 530a enables the other current source 540, which provides charging current to the error detection capacitor 538 in accordance with the relative conduction periods of the halves 544a and 554b of a current switch 544 formed by the transistors arranged in circuit as a differential pair. The transistors forming the two halves 544a and 544b of the current switch have their respective base electrodes coupled to receive the 6SC clock provided over line 533. When the clock is at a low level, transitor 544a is disabled. However, the other transistor 544b is allowed to conduct because the long time constant RC circuit 547 holds the voltage at its base electrode at an average voltage level which is more positive than the low level of the 6SC clock. Consequently, all of the current furnished by the current source 540 will flow through the one enabled transistor 544b to the output line 542 of the current source 540.

When the 6SC clock goes high, the base of the transistor 544a goes more positive than the base of the transistor 544b. Therefore, transistor 544a is enabled and transistor 544b disabled. This removes the current flow to the error smoothing capacitor 538. If the transition related data pulse received by the current source 540 is positioned in time relative to the 6SC clock provided to the current switch 544 so that low to high level transitions in the 6SC clock occur at the center of the transition related data pulses, each transistor 544a and 544b of the current switch will be enabled for equal intervals and the voltage on the error detection capacitor 538 will be maintained at an average level corresponding to a correctly phased 6SC clock. Any change in the data bit rate of the received channel encoded data bit stream changes the position of the transition related pulses at the input to the current source 540 relative to the low to high level transitions of the 6SC clock at the input to the current switch 544. If this occurs, one of the transistors of the current switch 544 will be enabled during the period that the current source 540 is enabled (by the transition related pulse) for a longer interval than the other transistor, with one of the transistors enabled for a longer interval depending upon whether the data bit rate increased or decreased. This causes a corresponding change in the current provided to the error smoothing capacitor 538 and a corresponding corrective change in the average voltage level on the capacitor. A change in the voltage level on the capacitor causes the voltage controlled oscillator 537 to change its phase and frequency until the transition related pulses are centered with respect to the low-to-high level change in the 6SC clock provided to the current source 540. With the low to high level change in the 6SC clock adjusted to be centered with respect to the duration of the transmission related pulses, the two halves, 544a and 544b, of the current switch will individually pass current from the current source 540 for equal intervals. Hence, the average voltage on the capacitor 538 will be maintained at the level required to lock the frequency and phase of the 6SC oscillator 537 to the data clock rate of the received channel encoded data.

If the 6SC voltage controlled oscillator 537 fails to lock to the received data or data is not received by one of the decoder and time base correctors 100 included in one of the 10 bit lines of a playback channel, a frequency unlock signal is provided on an output line 550 that extends to the reference clock generator circuitry 98. All of the lines 550 from the 10 decoder and time base correctors of the playback channel are ORed in the reference clock generator circuitry 98 for coupling a frequency unlock command to the computer control system 92 in the event that one or more frequency unlock signals are generated in a playback channel. The computer control system 92 responds to the frequency unlock command by providing a video mute command to the blanking insertion and bit muting circuitry (FIGS. 30A and 30B) that blocks the sending of data to the requesting station. In the channel decoder 525, the frequency unlock signal is generated by detecting the failure of the channel decoder to provide a data bit for 16 cycles of 6SC. The frequency unlock signal is provided by a divide by two circuit 546 that has its clock input coupled to receive a clock pulse provided on line 548 each time the channel decoder 525 fails to detect a data bit for an interval of four cycles of 3SC, hence, 8 cycles of 6SC. If a second clock pulse appears on line 548 before the divide by two circuit 546 is reset by the NAND gate 549, the divide by two circuit 546 provides the frequency unlock signal on line 550. The NAND gate 549 resets the divide by two circuit 546 each time a coincidence occurs between a low level of the 6SC clock provided by the oscillator 537 and a low level on line 530b, which occurs when a transition related data pulse is received at the input 526 of the channel decoder.

After the divide by two flip flop 53 converts the channel encoded data from the transition related pulse form to the channel encoded NRZ-L form, the data is coupled by line 531a to a pair of latches 551 and 552 (FIG. 25B) at the input of the decoding circuitry 525a. The decoding circuitry is able to decode data that is channel encoded according to the code rules of the No.

3,108,261 Patent (FIG. 25D (1)) and the 4,027,335 patent (FIG. 25D-(2)). The latches are clocked by $\phi1$ and $\phi2$ 3SC clocks, respectively, derived from the 6SC clock generated by the oscillator 537.

The 6SC clock on line 534 is coupled to one input of each of the NAND gates 553a and 553b. The other input of each of the NAND gates received complimentary 3SC square waves generated by the divide by two flip flop 534a from the 6SC clock on line 534. The NAND gates are enabled when their inputs are low to issue the positive $\phi1$ (FIG. 25D-(4)) clock pulses to clock the latch 552 and positive $\phi2$ (FIG. 25D-(3)) clock pulses to clock the latch 551. The $\phi1$ and $\phi2$ clock pulses are displaced in time by one half cycle of 3SC. Hence, the time that the level of the channel encoded NRZ-L data on line 531a is latched by latch 551 is displaced one half cycle of 3SC from the time the level is latched by latch 552 (FIG. 25D-(5) and (6)). Both latches are coupled to the two inputs of an exclusive OR gate 554a. The exclusive OR gate serves to detect the occurrence of a change in state in the level of the channel encoded NRZ-L data at the input of latches 551 and 552 between the times they are clocked by the displaced $\phi1$ and $\phi2$ clocks (FIG. 25D-(7)). To determine if the change in state at the input of latches represented a logical 1 bit, the output of the exclusive OR gate 554a is coupled to one input of a NAND gate 555. The other input of the NAND gate receives inverted $\phi1$ 3SC clock pulses coupled from the NAND gate 553a by the inverter 555a. If the change in state at the input of the latches represents a logical 1 bit, the output of the exclusive OR gate 554a will be low at the occurrence of an inverted $\phi1$ 3SC clock pulse. The NAND gate 555 will be enabled, placing a high level on its output. To assure safe latching of the detected logical 1 bit pulse at the output of the NAND gate 555, a delay circuit 556 is connected to the input of the NAND gate 555 receiving the inverted $\phi1$ clock so that the output of the NAND will be maintained high for an interval longer than the $\phi1$ 3SC pulse (FIG. 25D-(8)). This permits the following latch 557 to be clocked with the positive trailing edge of the $\phi1$ 3SC clock to latch the delayed high level provided by the NAND gate 555 (FIG. 25D-(9)). If the input data is channel encoded according to the No. 3,108,261 patent code rules, the output of latch 557 will be the channel decoded NRZ-L data. This is represented by the doted lines in the timing diagram shown by FIG. 25D. In the decoder shown by FIGS. 25A and 25B, however, an additional latch 558 is needed to permit decoding of data channel encoded according to the code rules of the aforementioned 4,027,335 patent. However, for the No. 3,108,261 Patent channel code, the additional latch 558 only delays the output of the decoded data by one cycle of 3SC.

When data is encoded according to the code rules of the 4,027,335 patent, specified logical 1 bit related transitions are suppressed. If a logical 1 bit related transition has been suppressed, there will be an absence of data transitions for an interval greater than 1½ cycles of 3SC. This is detected by a modulo-4 counter 559 having its clock input coupled to receive $\phi0$ clock pulses provided by the NAND gate 553b and its reset input to the output of the edge detecting exclusive OR gate 554a. The exclusive OR gate 554b provides a reset pulse to clear the counter 559 each time a transition occurs in the channel encoded data (FIG. 25D-(10)). The output of the modulo-4 counter 559 is coupled to one input of a AND gate 560 which also receives $\phi0$ clock pulses at its other input. Both inputs are low ½ cycle of 3SC after the modulo-4 counter has counted four $\phi1$ 3SC clock pulses without being reset, which corresponds to an absence of data transitions for an interval of 2½ cycles of 3SC (FIG. 25D-(11), (12) and (13)). Ordinarily, this signifies that a logical 1 bit has bit suppressed in the channel encoded data. To make certain that no errors have been introduced to the data stream, a following NAND gate 561 examines an output of the latch 558 at the time when AND gate 560 provides the low state signal representing a suppressed logical 1 bit. If the examined output of the latch 558 is also low, it verifies that a logical 1 bit has been suppressed and a pulse is output on line 562 (FIG. 25D-(14)) by the NAND gate 561 that is wire ORed with the output of latch 557. Line (14) of FIG. 46E represents the state of NAND gate 561 as if it was not wire ORed with the output of latch 557. The second pulse 563 (FIG. 25D-(14)) provided by the NAND gate 561 occurs at the time of and is latched into the latch 558 by the $\phi1$ 3SC clock. This prevents the output of the latch 558 from being returned low, thereby, inserting the suppressed logical 1 bit into the decoded NRZ-L data (FIG. 25D-(15)) appearing on line 566. In the data track bit line, the decoded data is coupled by line 566 to the computer control system 92 (FIG. 4) The decoded data clock provided by the flip flop 534a on line 573 and the line 1D or sync word from the first shift register and sync word detector circuitry 572 are also coupled to the computer control system 92.

If the phase of the 3SC decode clock provided by the flip flop 534a is incorrect, a one-shot multivibrator 534b is enabled by the coincidence of the 6SC clock on line 534 and a pulse provided on line 564. This pulse is generated in response to the examination of the known data bit pattern of the sync word interval inserted in the data by the encoder 96 at a time determined by a sync word time command provided by the time base corrector 3 cycles of 3SC before the occurrence of line 1D in the sync word interval of the decoded data. More specifically, decoded data present on line 566 is coupled to the data input of a seven bit shift register 592a. The shift register 592a is clocked by the 3SC decode clock and selected ones of its outputs are coupled to the decode circuitry 592. A pulse indicative that the phase of the decode clock is incorrect is provided on line 564 at the time of the occurrence of the sync word time command, if the data at the outputs of the shift register 592a. coupled to the decode circuitry 592 are at low levels. The pulse on line 564 enables the one-shot 534b to provide a disabling signal at the clock input of the flip flop 534a for one cycle of 6SC. This results in a shift in the phases of the $\phi1$ and $\phi2$ clocks by ½ cycle of 3SC, thereby establishing the right phase for correct decoding of the channel encoded NRZ-L data.

During playback operations, each bit stream of channel decoded NRZ-L data provided at the output line 566 of the decoder circuitry 525 will contain time base errors in the form of bit time displacement errors as previously described. Furthermore, bit line to bit line or skew time displacement errors will be present in the 9 data bit streams that carry the 8 parallel bits of digitized video and 1 parity bit, if included. To remove these bit time displacement errors from the NRZ-L data, a time base corrector is provided in each data bit stream and corrects such errors by electronically adjusting a variable delay through which the NRZ-L data is passed. Each time base corrector contains circuitry which processes the received data so that the data bit rates in all video data and parity bit lines are frequency and phase coherent with respect to the reference 3SC provided by the reference clock generator 98 for the playback channel 91. Furthermore, each of the time base correctors also aligns the data bits in the data bit lines with respect to a common redefined H/2 reference provided by the playback channel's reference clock generator 98. As a result of these combined functions, any relative time displacement errors between the data bits in the 9 bit lines are removed, i.e., line to line or skew errors removed, and any bit time displacement errors within a bit line corrected. A time base corrector particularly suited for use with the preferred embodiment of the present invention is described in U.S. Pat. No. 4,119,999.

During playback, after the data has been decoded and time base corrected by the data decoder and time base corrector circuitry 100, the eight bit lines of video data plus the added single parity bit line, if parity protection is included, are applied to the data transfer circuitry 129 shown in block diagram of FIG. 8A and the output of the data transfer circuitry is applied to the chroma processing circuitry 101 in the event that a normal playback mode is being used or to the encoder switch 126 in the event the data is being transferred to another disc drive memory using the apparatus in the transfer mode.

the data transfer circuitry performs a parity check of the data coming from the time base correctors and initiates an error masking function in the event that errors are detected during the parity check. The data is appearing at a 3SC rate and every three samples of the NRZ data will represent approximately the same video information. The error masking portion of the circuitry clocks the data streams through a series of flip-flops which provide a three bit memory so that if the parity check detects an error, the third previous data word is reinserted into the position where the error was detected. Reinsertion of the third previous data word masks the error, the assumption being that the third prior data word would be more representative of the correct video information than the data word that contains the error. Every third sample is reinserted in place of the detected error sample because the 0° sample (for example) from the previous cycle of 3SC would probably be more accurate than a sample taken at either 120° or 240°, assuming the level of the signal which is sampled contains chrominance information that remains approximately constant for a period of a few samples.

The data transfer circuitry also clocks the data received at the input is clocked to the output using a 3SC PALE clock to reposition the samples into the desired vertically aligned positions that was achieved by the original PALEing during sampling in the analog-to-digital converter 95. When the signal was channel encoded, the alignment was changed due to the fact that a line to line continuous phase 3SC clock was used to channel encode the NRZ data. The data emerging from the time base corrector circuitry 100 is thus aligned the same way as the encoded data at the output of the encoder 96. Accordingly, the data transfer circuitry 129 again PALEs the data to realign the samples in the manner as shown in FIGS. 8C(10) and 8C(11).

Referring to the block diagram of the data transfer circuitry 129 shown in FIG. 13A, time base corrected data provided by the decoder and time base corrector circuitry 100 over nine bit lines, i.e., eight bit lines containing video information and one parity line, are applied at nine input lines of the data transfer circuitry.

The line 625 in FIG. 13A represents the most significant bit line and is representative of each of the nine input lines provided for each bit stream. The data is clocked into FF 626 and FF 627 using a 3SC PALE clock signal which appears on lines 628 and 629. The PALE clock is generated by a PALE clock generator shown at the lower portion of the block diagram from 6SC and ½SC signals received from the reference clock generator 98 on lines 630 and 631, respectively, and a PALE flag signal received from the reference logic circuitry 125B via the encoder switch 126 on line 632. The PALE flag signal is applied through an inverter 633, line 634 to one input of an AND gate 635. The line 634 also connects to a second inverter 636 which extends to one input of another AND gate 637 via line 638. The ½SC signal on line 631 passes through a pulse former 639 and clocks a divide by 2 FF 640 which produces 3SC output signals of opposite phases on output lines 641 and 642 which respectively extend to the other inputs of the AND gates 635 and 637. The outputs of the AND gates are connected to line 643 and extend to complementary dual output buffer 645 which clocks FF 626 and FF 627. The PALE flag signal on line 632 is a two state or level signal that changes state at an H/2 rate and, upon changing levels, alternately disables AND gate 635 and enables the AND gate 637 to gate one of the 3SC signals from lines 641 and 642 onto the output line 643. Thus, in effect the PALE flag alternately changes the phase of the 3SC signal that is used to clock the data on line 625 through the FF 626 and FF 627 so that consecutive horizontal lines of video data are clocked with opposite phased 3SC signals. This retimes the video data bits from the continuous phase clock back to the PALE clock so that the vertical alignment of samples of consecutive lines is re-established for subsequent chroma separation and processing. As previously described, the video data bits are not to be retimed in the transfer mode of operation. To prevent the retiming, the encoder switch 126 blocks the coupling of the PALE flag from the reference logic circuitry 125B to the data transfer circuitry 129 and instead places a low level signal on line 632. This places an enabling signal on the input of the AND gate 635 and a disabling signal on the input of the AND gate 637, where a line to line continuous phase 3SC clock signal is provided on line 643 through the AND gate 635.

The data on the output of FF 627 extends to an AND gate 647 via line 648 and AND gate 647 has output line 649 connected to the first of three FFs 651, 652 and 653 which serve to shift the serial bits to the output of the last FF which appears on line 654. Line 654 also extends to one input of another AND gate 655. A parity tree error detecting circuit 656 is coupled to receive the data bits of the nine bit streams as described below and has two output lines 657 and 658 which extend to AND gates 655 and 647, respectively. When an error is detected, it disables AND gate 647 to block the bit containing the error and enables AND gate 655 so that the output data on line 654 can be clocked through AND gate 655 onto line 649. This has the effect of replacing the incorrect bit with the third previously occurring bit in the data stream and effectively masks the error with the bit that is approximately correct for the reasons that had been previously discussed.

Five bits, i.e., bits 2 through 6, or the next most significant bit through the sixth most significant bit are also sampled through a resistor ladder network 659 having weighted values to produce an analog conversion of the digital information which approximates digitally encoded analog information and is used to detect if chroma phase needs to be inverted. The output on line 660 extends to the reference clock generator 98 and is compared with the phase of the burst of the station reference video signal to determine if the chroma phase needs to be inverted. The digital-to-analog conversion occurring in the data transfer circuitry 129 is gated to reject all but the burst and produces an imprecise, but sufficiently accurate determination of the burst phase for use by the reference clock generator 98.

Specific circuitry that can be used to carry out the functions of the block diagram shown in FIG. 13A is illustrated in FIGS. 26A and 26B. Since the operation is essentially the same as that described with respect to the block diagram, a detailed description of the entire circuitry will not be described herein. Referring to FIG. 26A, the parity tree error detection circuitry 656 comprises a number of exclusive OR gates 661 which are interconnected and associated with the eight data bit lines containing the video information. The outputs of the interconnected exclusive OR gates 661 are connected to one of the inputs of another exclusive OR gate 662 whose other input is coupled to receive the parity bit on channel 9. The exclusive OR gate 662 controls an FF 663 that has output lines 657 and 658 for controlling the AND gates as previously described to either pass the video data bits received on input lines 625 or replace an erroneous byte of 8 bits with the third previously occurring byte of 8 bits. The operation of the remainder of the circuitry shown in the schematic diagram shown in FIGS. 26A and 26B are essentially the same as described with respect to the block diagram of FIG. 13A.

A television picture with a region of saturated color bounded along the bottom by a region of no color defines a vertical color transition along the horizontal boundary or color edge. Given three successive television lines A, B and C of a field, wherein the lines are within the saturated color region immediately above the color edge, a conventional comb filter generates the vectors representing chrominance in accordance with the relationship, $-\frac{1}{4}A + \frac{1}{2}B - \frac{1}{4}C$.

However, the color subcarrier of an NTSC television signal has a 180° phase shift between alternate lines A, B and C. Thus 180° inversion of, for example, lines A and C and subsequent summation of the vectors $+\frac{1}{4}A + \frac{1}{2}B + \frac{1}{4}C$ generates a full chrominance vector, herein termed 1B or simply, +B, the chrominance on line B. When this chrominance vector +B, is subtracted from the wideband signal (which also contains the chrominance vector +B), the chrominance vectors cancel. The comb filter has effected complete chrominance and luminance separation, i.e., all chrominance is in the chrominance channel.

However, in a second case, if lines A and B are in the saturated color region, with line C in the region of no color, line A provides a chrominance vector equal to B in the negative direction and line B a vector equal to B in the positive direction. But line C provides a zero chrominance vector since it lies in a region of no color. When combining the vectors in accordance with the previous relationship, $-\frac{1}{4}$ of vector A is inverted and added to $+\frac{1}{2}$ of vector B, thereby providing a sum of $+\frac{3}{4}$ of a full vector B. It follows that when the chrominance $+\frac{3}{4}B$ is subtracted from the wideband signal, i.e., line B, there is a residual of $+\frac{1}{4}$ of the chrominance vector left in the luminance channel, while only $+\frac{3}{4}$ of the chrominance vector is extracted into the chrominance channel.

A third case exists wherein only line A is within the saturated color region, and lines B and C are in the region of no color. The third case is similar to the second case above, wherein however, the signs are opposite.

The consequence of the second (and third) case given above, wherein line C (or B and C) lies in a region of no color, prove disadvantageous when attempting to reconstitute a composite NTSC color television signal from a single stored color field, or frame. As is well known, when reproducing the composite video signal from a single stored frame, in one frame the chrominance is added directly back to the luminance previously separated therefrom, whereas in the second frame the chrominance component is first inverted and then is added to the luminance. Therefore, in the second case mentioned above wherein line C is in a region of no color, in the non-inverting frame, the $+\frac{1}{4}$ chrominance vector which remained in the luminance channel due to incomplete separation, is added to the $+\frac{3}{4}$ chrominance vector separated into the chrominance channel. Thus the full vector B, i.e., the full chrominance signal, is recovered to define a correctly reconstituted color television signal for the non-inverted frame. However, when reconstituting the second frame of color video from the single stored frame, the chrominance $(+\frac{3}{4}B)$ is first inverted, providing a $-\frac{3}{4}$ chrominance vector, when when subsequently added to the $+\frac{1}{4}$ vector in the luminance channel provides only a $-\frac{1}{2}$ chrominance vector for the inverted frame. Thus, in the non-inverted frame, the chrominance is reproduced with full saturation, whereas in the alternate, inverted frame the chrominance is reproduced at $\frac{1}{2}$ saturation. Thus the color saturation defining the color edge between the region of full color and that of no color will flicker at a 15 Hz rate between $\frac{1}{2}$ saturation and full saturation. This visible flicker is objectionable when reproducing the composite NTSC four-field color coded television signal.

The chrominance separating and processing system provides various embodiments of digital circuits which perform the inversion process digitally in combination with a digital comb filter and digital bandpass filter, while further providing a conditioned chrominance signal which, when digitally re-combined to form the composite NTSC color television signal, minimizes or cancels completely the objectionable 15 Hz flicker at the vertical transitions.

Although the combination is hereinafter particularly described utilizing a three times subcarrier (10.7) megaHertz phase alternating line encoding (PALE) sampling technique with a PCM encoded NTSC video signal, it is to be understood that other encoding techniques, sampling techniques, frequencies, etc., may be employed. Furthermore, the single lines depicting the inputs and outputs of the block diagram components are representative of digital words of selected numbers of bits, as exemplified in the detailed schematics of FIGS. 27, 28 and 29.

Referring to FIG. 14, there is shown a digital chrominance separating and processing system wherein a 10.7 megaHertz (MHz) PALE PCM color video signal is introduced via input terminal 700 to digital comb filter means 701. The filter means 701 is per se generally typical of digital comb filters presently utilized in various television signal processing systems, but herein is adapted via a specific clocking technique further described hereinbelow, to separate the chrominance from the digital wideband color signal. The outputs from filter means 701 and the associated clocking techniques, include a 1H delayed wideband signal (delayed by one-horizontal-line delay period) on line (terminal) 702, and an extracted chrominance signal (with low frequency components still included) on line (terminal) 703a. The term "extracted" is herein used to define the chrominance signal which is separated into a chrominance channel, whether the separation is complete, or incomplete, as previously described with respect to case two (and three) hereinabove.

The extracted chrominance signal is fed to bandpass filter means 704 which removes vertical resolution losses due to the comb filter means, by passing only that frequency band occupied by the chrominance information. The bandpass filter means 704 is centered at 3.58 MHz (the NTSC subcarrier frequency) and has a bandwidth of, for example, 1.5 MHz.

The resulting combed chrominance signal is fed via line (terminal) 703b to a digital circuit for inverting the chrominance signal on alternate frames at the frame rate. In FIG. 14, the inverting circuit comprises a digital transversal filter with odd symmetry 705, which herein may be further identified as a modified, digital, "Hilbert" transformer. It is understood that the transversal filter 705 provides one form of inversion; i.e., employs what is basically known as the Hilbert transform, but which is herein modified to provide a specific form of transversal filter with odd symmetry, while further providing a digital rather than analog inversion implementation. The transversal filter of interest has the property of rotating the phase 90° of all frequencies of a selected range which herein, for example, may be two to four MHz.

Thus the term inversion, or inverting is employed to define the circuitry and process of digitally conditioning the chrominance at the frame rate (or field rate if one field is used to reconstitute the four field color coded NTSC color television signal) as by phase shifting, rotating, inverting or otherwise handling the phase. Further, the successive playbacks of either a single stored field or frame is referred to generically as "alternate reprititive reproductions".

The chrominance signal is also fed to a negative input of digital adder (subtractor) means 706. The 1H delayed wideband video signal of terminal 702 is fed to the positive input of the adder means 706. The transversal filter 705 includes a control input at 707 which determines the conditioning of the chrominance signal phase. In one embodiment, for example, the transversal filter may provide a plus and then a minus 90° phase rotation of the chrominance with respect to the luminance signal in alternate repetitive reproductions. The chrominance and luminance signals are then summed in digital adder means 708 to provide the composite color television signal on output terminal 728.

Control means 709 includes various timing and clock inputs thereto which, for example, relate to the overall apparatus timing and thus originate upstream in the apparatus. In turn, the control means 709 generates specific control signals for the comb filter means 701, for the transversal filter control input 707, for the bandpass filter means 704, etc., which control signals include a PALE clock and 1H delay line, four-phase clocks, inter alia. The control means 709 and the various inputs and outputs are further shown and described in detail in FIGS. 27A, 27B, 28B and C and thus are not further described here.

Briefly, in FIG. 14, the comb filter means 701 combines the three adjacent television lines A, B, C of previous mention, and includes a pair of digital, one-horizontal-line (1H) delay lines 710, 711 and a pair of adder means 712, 713. The 10.7 MHz PALE video signal is fed to delay line 710 as well as to adder means 712. The 1H delayed signal is fed to 1H delay means 711, and to the adder means 713. The 2H delayed signal is fed to the other input of adder means 712, whose output in turn is fed to the negative input of the (subtractor) adder means 713.

The digital comb filter means 701 and digital bandpass filter means 704 exemplified in block diagram herein, generate (eight bit) digital words corresponding to the separated chrominance and 1H delayed wideband signals, and are further depicted in the schematic diagrams of FIGS. 27A-B and 29A-B.

The combed chrominance signal is subtracted from the 1H delayed wideband video signal via the digital adder means 706, wherein the resulting combed luminance signal is fed to the digital adder means 708.

FIG. 15 shows the digital transversal filter 705 wherein the digital combed chrominance signal is fed to a series of one-sample-period delays 714a–714c, and also to the positive input of an adder means 715b. The negative input of adder means 715b is coupled to the output of the last delay 714c. The positive and negative inputs of an adder means 715a are coupled to the input and output respectively of the delay 714b. The outputs of adder means 715a, 715b are coupled to respective multiplier programmed read-only memories (PROMs) 716a, 716b, and thence to adder means 717. The latter is coupled via an inverter stage 718 to the adder means 708 of previous mention, along with the combed luminance signal from adder means 706, whereby means 708 generates the composite color television signal. The control input 707 is coupled to the inverter stage 718.

In operation, the transversal filter 705 provides digital circuits for conditioning the phase of the chrominance signal with respect to the luminance signal; i.e., for providing the digital implementation of phase inversion of the chrominance on alternate color frames. To this end, the 1H delayed wideband signal, and the chrominance signal are introduced to the adder means 706 via terminals 702, 703b respectively, whereupon the resulting luminance signal is introduced to adder means 708. The chrominance signal is delayed one-sample period (e.g., 93 nanoseconds) in each of the delays 714a–714c, whereby the undelayed chrominance and the three-sample delayed chrominance are introduced to the adder means 715b, and the one-sample and two-sample delayed chrominance signals are introduced to adder means 715a. The delays 714a–714c may comprise a single stage of a shift register. The adder means 715a, 715b provide signals to multiplier PROMs 716a, 716b respectively, which perform a multiplication of the respective signals by 0.575 and 0.096 in a digital approximation of a conventional convolution operation. The resulting signals are then summed via adder means 717, and the summed signal has all of its frequency components advanced 90° with respect to the luminance signal, to define the conditioned chrominance signal of previous mention. The output of adder means 717 is delivered to the adder means 708 via the inverter state 718. During one color frame the inverter means 718 has a high, or "1", introduced thereto via the control input 707 from control means 709, whereby the (eight) bits of the output word are delivered unchanged to the adder means 708. On alternate video color frames the control input 707 is a low (or "0") invert enable signal (see FIG. 28). Data is represented in this device in the signed two's complement negative system where negative numbers have a "1" in the sign bit position and the magnitude is the 2's complement of its absolute value. Therefore, inversion amounts to changing the sign and forming the 2's complement, via the "0" invert enable input 707. Thus the conditioned chrominance signal (which is rotated +90°) is directly added to the luminance in one frame, and is inverted and then added to luminance in the alternate frame, to provide the composite color television signal on output terminal 728. Alternately, the chroma first may be rotated −90° on each frame by reversing the inputs to the adder means 715a, b and then adding directly in one frame and inverting 180° and adding in the next.

In another alternative, the transversal filter 705 may be implemented whereby during one color frame the phase of the chrominance signal is advanced by 90°, and during the alternate color frame is retarded by 90°, to provide in essence the 180° inversion of the frequency components between frames.

Figure 29B:
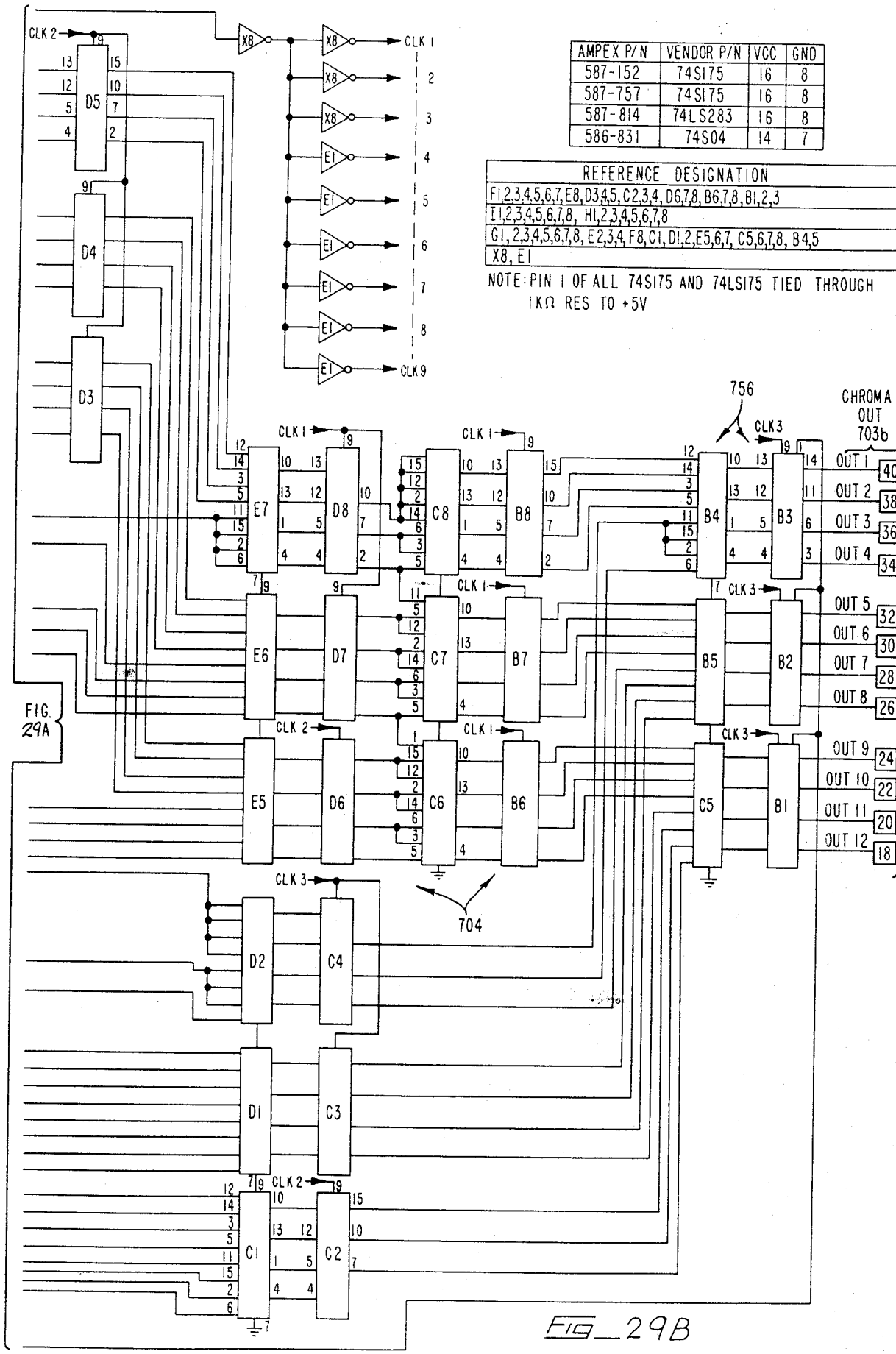
Figure 31B:
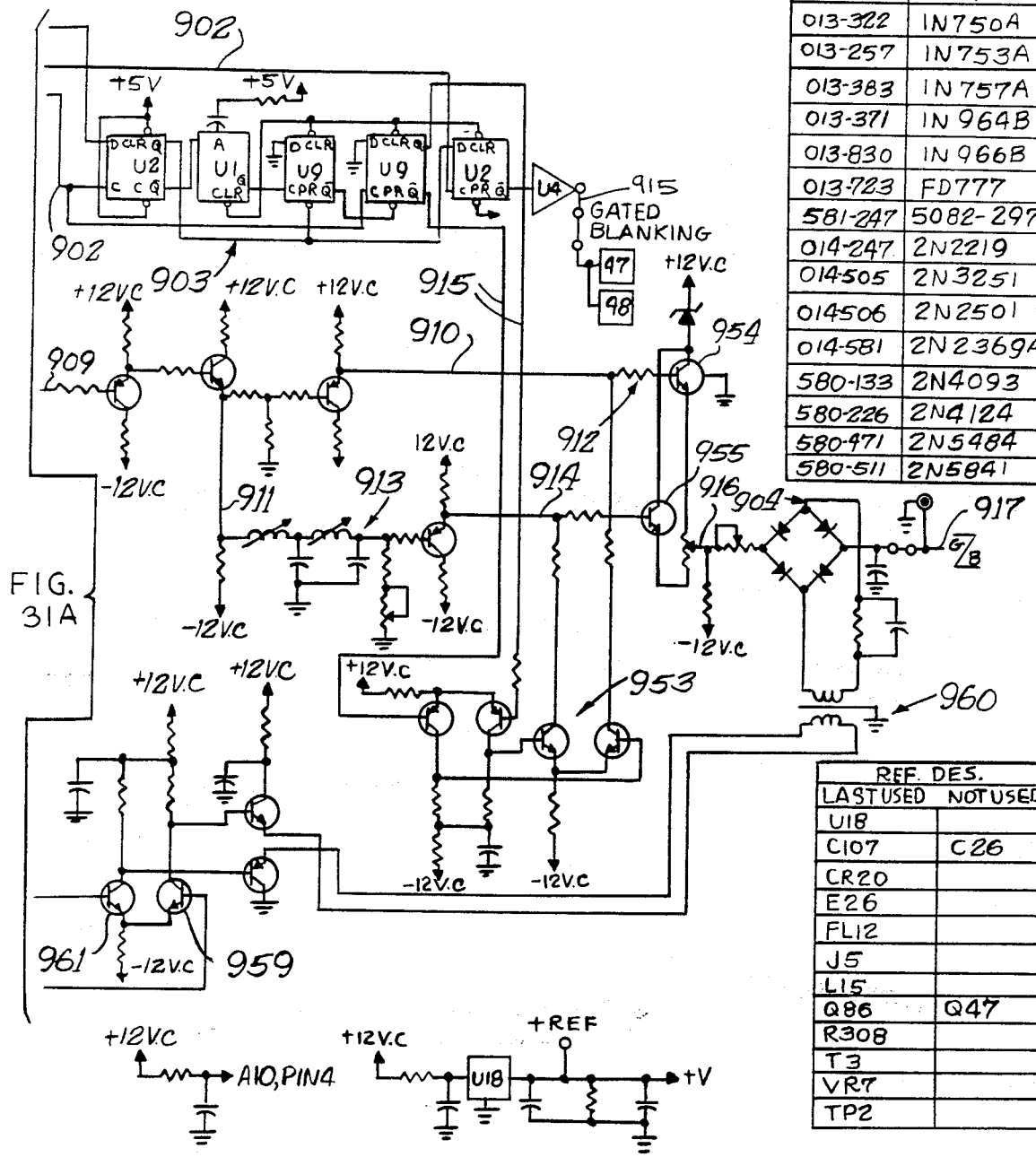

FIGS. 27A-C, 29A-B and 28A-B illustrate one schematic implementation of the embodiment of FIGS. 14 and 15 utilizing the digital transversal filter with odd symmetry 705. FIGS. 27-C illustrate one implementation of the digital comb filter means 701, and part of the control means 709 of FIG. 14; FIGS. 29A-B illustrate one implementation of the digital bandpass filter 704; and FIGS. 28A-B illustrate one implementation of the digital transversal filter 705, signal re-combining adder means 706, 708, and the remaining circuits of the control means 709. In all figures, like components of FIGS. 14 and 15 are indicated by similar numerals.

Thus, in FIG. 27A the 10.7 MHz PALE video signal is introduced via the input terminal 700 to the digital comb filter means 701. The output thereof (FIG. 27C) comprises the separated chrominance and 1H delayed wideband signals on terminals 703a and 702 respectively. The inputs at terminal 719, 725 comprise a group A and B control signals and a symmetrical PALE clock, generated in the respective portion of control means 709 of FIG. 28 further described below. The terminals 719, 725 are coupled to a four-phase clock generator 720 of control means 709 depicted in FIG. 27A. The clock generator 270 forms part of the timing circuits for clocking the shift registers which comprise the 1 H digital delay lines 710, 711. The delay lines 710, 711, adder means 712, 713 and terminals 702, 703a, are interconnected via integral latching circuits 712a, 713a and 721 which conventionally temporarily store the respective digital products of the preceding shift registers, adders, etc. Terminal 703a provides the input to the succeeding digital bandpass filter means 704 of FIGS. 29A-B, and the terminal 702 provides the input to the adder means 706 of succeeding FIG. 28B.

The delay lines 710, 711 further each include a series of two-phase shift registers 750, 751 respectively, employing two-phase clocks, wherein the register stages are further arranged into groups 750A, 750B of delay line 710, and 751A, 751B of delay line 711. Shift register stage selectors 752A, 752B select portions of the digital word corresponding to specific clock phases of groups A, B of delay line 710, and shift register stage selectors 753A, 753B do the same for delay line 711. Wideband signal selectors 754, 755 of delay lines 710, 711 respectively, then provide selection of the digital words corresponding to the 1 H and 2 H delayed wideband signals, respectively.

The wideband video signal word is split, and is clocked into four bit stages of the shift registers 750A, 750B by the four-phase clocks, which are in effect, four phases of the symmetrical PALE clock. The stage selector 752A receives and loads the pairs of four bits in response to PALE clock, alternately from different pairs of stages of shift register 750A. Stage selector 752B does the same with shift register 750B stages. The group A stage selectors 752A unload into one (four bit) wideband signal selector 754, while the group B stage selectors 752B unload into the other (four bit) selector 754, in response to timed PALE clocks respectively. At selected times, the group B selectors are clocked whereby the combined group A and B registers provide a total of 680 bits per television line. One NTSC horizontal television line sampled at three times subcarrier rate will contain 682⅓ samples. However, as will be described in more detail hereinbelow, the clocks for the shift registers are generated and applied to the registers so that the total bits per television line output by the register for each bit line is equal to an integral number of samples. In the embodiments described herein, 680 samples per television line are clocked through the registers. The clocking of the registers is arranged so that the discarded interval of 2⅓ sample intervals occurs outside the active video information portion of the television line during the horizontal blanking interval.

The control circuits 720 of FIG. 27A, which provide the four-phase clocks for the shift registers 750A, 750B and 751A, 751B, and which receive a symmetrical PALE clock, are further described in operation in the block diagram and clock waveforms of the combined control means 709 in FIGS. 28C-D infra, with one implementation thereof illustrated in the schematic diagrams of FIGS. 27A, 28A-B.

FIGS. 29A-B depict the bandpass filter means 704 with terminal 703a providing the incoming extracted chrominance signal from the comb filter 701 output, FIG. 27B. The combed chrominance signal from the bandpass filter means 704 is provided at terminal 703b of FIG. 29B, which forms the input to the transversal filter with odd symmetry 705 of succeeding FIGS. 28A-B. Immediately preceding the terminal 703b is an adder/latch stage 756, wherein the latches are clocked by a chroma invert enable signal via a terminal 757. In the embodiment employing the transversal filter 705 (FIGS. 14, 15, 28), the chroma invert enable signal does not enable the clear input of the latches, and the signal into the adder/latch stage 756 appears at the terminal 703b. The PALE clock of terminal 725 couples to various inverters (FIG. 29B) to provide a plurality of clocks for the adders and latches that comprise the bandpass filter means 704. The latches are thus clocked by the PALE clock to deliver the digital output from the preceding logic processor component (viz, the adders) to the succeeding logical processor components (also adders).

The final adder/latch stage 756 of the bandpass filter means 704 delivers the combed chrominance signal.

One-horizontal-line delay lines are required to provide the comb filtering process of chrominance signal separation from a wideband signal. The delay lines, and thus the comb filter 701, must be in synchronism with the overall system timing, which inter alia is represented by the input termed PALE flag. As discussed herein with reference to the video signal system of FIG. 8A and the reference logic circuit 125B of FIG. 10A in particular, the PALE flag signal is asymmetrical, i.e., has one phase for a longer time period while the alternate phase has a shorter time period, and the phase of the PALE clock changes coherently with the asymmetrical PALE flag. However, the PALE clock utilized by the instant chrominance separating and processing circuit utilizes a symmetrical PALE clock, i.e., one in which clock has alternate phases for the same time duration.

A paramount problem when attempting to reconstitute the composite color television signal from a single stored color field or frame, stems from the fact that each line of a field is of a duration equal to $227\frac{1}{2}$ cycles of subcarrier $f_{SC}$. That is, it is equal to an integral number of cycles plus one-half cycle of subcarrier time. It follows that a required condition of 1H delay lines, when they are formed of digital shift registers such as, for example, those in the comb filter means 701, is that there is an integral number of samples per line of television and thus one horizontal line of delay.

Accordingly, the present invention provides the control means 709 which inter alia generates the symmetrical PALE clock from the overall apparatus asymmetrical PALE flag, and which, during the horizontal blanking period deletes an integral number plus one-half of subcarrier cycles, to shift by 180° with respect to previous samples at the line rate. The PALE clock thus is in the proper phase relationship with the subcarrier frequency as required to reconstitute the four fields required to color encode the television signal, while also being in proper timing relationship with the overall apparatus.

Accordingly, FIG. 28C depicts in block diagram form the digital control means 709 shown in one schematic implementation in FIGS. 27A-B and 28A-B. FIG. 49D is a timing diagram of the waveforms generated at various points along the circuit of FIG. 28C, as well as FIGS. 27A-B and 28A-B. Inputs from the overall system include the asymmetrical PALE flag, a six times phase continuous subcarrier frequency (6 $f_{SC}$), a one-half times phase continuous subcarrier frequency ($\frac{1}{2} f_{SC}$) and a field index pulse, on respective terminals 758, 759, 760 and 761. The signals are introduced to a PALE clock generator generally indicated at 762, which in turn is coupled to the four-phase clock generator 720 of that portion of control means 709 in FIG. 48A. The latter provide the four-phase clocking of the shift registers 750A-B and 751A-B, as further described below.

The PALE clock generator 762 receives the PALE flag via terminal 758, and feeds it to an exclusive OR 763. The latter is coupled to a D-type flip-flop 764, together with the $\frac{1}{2} f_{SC}$ clock from terminal 760. The exclusive OR 763 and flip-flop 764 define a gated phase detector. A D-type flip-flop 765 is coupled to flip-flop 764 and is clocked by a correction pulse 766 corresponding to the group A control signal (719), further described infra. A JK-type flip-flop 767 is coupled at pin K thereof to flip-flop 765, and is clocked by the 6 $f_{SC}$ clock from terminal 759. The flip-flop 767 is coupled to an AND gate 768 and back to the clear pin of the flip-flop 765. The flip-flops 765, 767 and the AND gate 768 together define a gated phase corrector. AND gate 768 also received the 6 $f_{SC}$ clock, and is coupled in turn to a divide-by-two ($\div 2$) JK-type flip-flop 769 and to a divide-by-1365 ($\div 1365$) counter 770. The $\div 1365$ counter 770 receives the field index pulse from terminal 761, and is coupled to the $\div 2$ flip-flop 769 via a reset pulse generator means 771. As shown in FIG. 28B, the field index pulse first is reclocked to inverted 2 $f_{SC}$ via a flip-flop stage. The counter 770 is also coupled to a count decoder 772 which generates the group A and B control signals on terminal 719. The group A control signal defines the correction pulse 766 which clocks the flip-flop 765. The output of the $\div 2$ flip-flop 769 comprises the symmetrical PALE clock which is fed back to the second input of the exclusive OR 763 to define a closed loop in the PALE clock generator 762. The PALE clock is also fed via terminal 725 to the four-phase clock generator 720 of FIGS. 27A-B and 28C, which as shown, only generates group A four-phase clocks.

In operation, referring to FIGS. 28C and 28D, when the chrominance separating and processing system is turned on, the counter 770 is not properly set and accordingly is reset via the reclocked field index pulse. The latter is a 30 Hz pulse which occurs on a selected field wherein sync pulses coincide with vertical interval. After reset, the PALE clock generator starts generating an initial PALE clock which resembles true PALE clock. However, the PALE clock must be in phase with the apparatus PALE flag, during the active part of a television line. That is, when PALE flag is up, the rising edge of $\frac{1}{2} f_{SC}$ is supposed to coincide with a rising edge of PALE clock, and vice versa. To this end, the (initial) PALE clock, which may resemble the waveform of either FIG. 28D-17 or 18 when the circuit is turned on, is fed back to the exclusive OR 763 together with the PALE flag. When PALE flag is high, the exclusive OR output is low when PALE clock is low. When PALE flag is low, the exclusive OR output is low when PALE clock is high. Thus the PALE clock is de-PALEd to provide 3 $f_{SC}$ which is fed to the flip-flop 764 together with $\frac{1}{2} f_{SC}$. The flip-flop 764 compares the de-PALEd signal and the $\frac{1}{2} f_{SC}$ signal (waveforms 28D-16, 17 and 18). If flip-flop 764 takes the data the PALE clock is not in phase with the PALE flag, and vice versa. Thus the exclusive OR and the flip-flop 764 provide the gated phase detection.

If the PALE clock is not in proper phase, the gated phase corrector formed of flip-flops 765, 767 and AND gate 768, deletes one cycle of the 6 $f_{SC}$ clock to shift the phase by 180° and bring PALE clock into the proper phase relative to PALE flag. The correction pulse 766 delays the time that the detection and correction is made, i.e., during the active part of the television line where it is known that the phase is the same. Because PALEing of the sampling clock used in the video signal system does not occur during the horizontal blanking interval as described hereinbefore with reference to FIGS. 8 and 10, detection of the proper phase of the symmetrical PALE clock cannot occur during the horizontal interval. However, once the proper symmetrical PALE clock phase is detected, the PALE clock phase thereafter changes during the horizontal blanking interval.

The counter 770 counts down 1365 counts of 6 $f_{SC}$ (FIG. 28D-1) corresponding to one television line, and delivers a carryout (FIG. 28D-3) to the reset pulse generator 771 on a rising edge of 2 $f_{SC}$ (FIG. 28D-2). The latter includes a series of D-type flip-flops which provide six counts after carryout goes low, and thus the succession of highs depicted in FIG. 28D-4 through 8. The inverse output signals corresponding to the waveforms of FIG. 28D-6, 8 provide the start and end of a low state to the ÷2 JK-type flip-flop 769 (FIG. 28D-9), which in turn generates the symmetrical PALE clock at 3 $f_{SC}$ (FIG. 28D-10) which appears at terminal 725.

As may be seen by comparing FIG. 28D-10, 11, the phase of the PALE clock is shifted by 180° by deleting 2½ cycles of the phase continuous 3 $f_{SC}$ signal. To this end, after the input to the ÷2 flip-flop 769 goes low, the rising edge of the PALE clock corresponding to the next rising edge of 6 $f_{SC}$ stays low, as do the two following rising edges of PALE clock. On the following rising edge of 6 $f_{SC}$ after the input to flip-flop 769 goes high, the PALE clock goes high, but with 180° phase shift relative to its phase during the prior line (FIG. 28D-11), thus the requirement of deleting the ½ cycle of subcarrier each television line is accomplished.

The count decoder 772 is coupled to the counter 770 and generates the group A and B control signals after a selected count, the signals being introduced via terminal 719 to the four-phase clock generator 720. The group A control signal is also fed to the gated phase corrector as pulse 766 as previously mentioned.

The four-phase clock generator 720 provides for selected timing control of the comb filter shift registers 750A-B and 751A-B, whereby the outputs thereof fulfill the requirement of generating an integral number of samples per television line, e.g., 680, utilizing the symmetrical PALE 3$f_{SC}$ sample clock. This circumvents a further problem caused by the integral number of subcarrier cycles plus one-half cycle per line, wherein the one-half cycle prevents proper sampling from line-to-line and must be deleted, or otherwise compensated for. To this end, the four-phase clock generator 720 includes a divide-by-four (÷4) binary counter 773 coupled to the PALE clock via terminal 725, and thence to a one-out-of-four binary decoder 774, and to the shift register stage selector 752A (and selector 753A) of previous mention in FIGS. 27A-B. The binary decoder 774 data input is connected to a high, wherein the selected output equals a low, and the unselected outputs equal highs. The shift register stage selectors 752A and 752B are coupled to the wideband selector 754 (FIG. 27A) which selects digital words from shift register group A or B in response to the group A and B control signals from the count decoder 772. Binary decoder 774 is coupled to a latch 775 and thence to four D-type flip-flops 776a-d. The latch 775, whose output follows its input, is coupled to PALE clock and flip-flops 776a-d are also coupled thereto via an inverter 777. The four phase clocks are generated on outputs φ1, φ2, φ3 and φ4 of the flip-flops 776a-d via inverter stages, and are shown in FIG. 28D-12 through 15. The clocks φ1, φ2, φ3 and φ4 are introduced to the shift registers 750A (and 750B) of comb filter 710, as well as to shift registers 751A (and 751B) of comb filter 711 (FIGS. 27A-B). The video input signal is introduced to the shift registers at terminal 700.

In operation, the overlapping four-phase clocks φ1-φ4 (of the order of 150 nanoseconds) are applied to the multi-stage, two-phase shift registers 750A (750B) to clock successive four bit pairs into alternate stages to provide the clocking rate required, which rate the shift registers could not handle without employing the four-phase clocking into alternate stages. Note that the four-phase clocks are disabled, FIGS. 28D-12-15, during the 2½ cycles of PALE clock FIG. 28D-10, to provide the exact 1H delay. In addition, since shift registers having a capacity of 512 bits are readily available, they are employed to provide the 680 bits corresponding to one-horizontal-line delay.

Although only the group A shift registers 750A and timing controls therefor, of only the 1H delay line 710, are shown in FIG. 28C, it is understood that the PALE clock (725) and group B control signal (719) also are introduced to the group B shift registers of the 1H delay line 710 (FIG. 27A). Furthermore, the 1H delay line 711 (FIG. 27B) is identical to the 1H delay line 710 and similarly employs the PALE clock and group A and B control signals.

FIGS. 28A-B depict one digital implementation of the control means 709 of FIG. 28C, and also of the transversal filter with odd symmetry 705 of FIG. 15, the latter including terminals 703b and 702 for receiving the combed chrominance and 1H delayed wideband signals, respectively.

The various components 714-718 of the filter 705 are shown in schematic, and define means for rotating the phase of the chrominance signal +90°, whereupon inverter means 718 inverts the signal 180° in response to the control input 707. A −90° rotation may be generated by corresponding sign changes, i.e., by clocking the latches of adders 715a, 715b, with inputs that are opposite in sign to those shown in FIG. 15. Inverter means 718 is defined herein as a plurality of exclusive ORs which essentially perform the 180° inversion.

The bandpass filter inherently has a gain of 27/32, hence the gain of the wideband signal must match this gain. Therefore, in FIGS. 28A-B, the 1H delayed wideband signal is coupled to a 27/32 multiplier PROM 722 which multiplies the wideband signal by 27/32, to provide an overall gain of unity. The wideband signal is then fed through an (eight stage) delay 723, which equalizes the delays in the wideband channel with the delays in the chrominance channel caused by the bandpass filter means 704, and thence to the adder means 706. Various latches 724 are provided between the adder means 706 and 708, which provide a temporary store of the intermediate signal while clocking the luminance signal from adder means 706. The composite color television signal is provided on output terminal 728 via the adder means 708 of FIG. 28B, by combining alternate repetitive reproductions of the stored video signal.

The block diagram of the PALE clock generator 762 of FIG. 28C is shown in schematic in FIGS. 49A-B while the four-phase clock generator 720 of FIG. 28C is shown in schematic in FIGS. 27A-B. Since the operation of the generators 762 and 720 were described in FIG. 28C, no further explanation is required in the schematic diagrams of FIGS. 28A-B, wherein like components are identified by similar numerals.

However, in addition, FIG. 28A includes a terminal 778 for receiving a chroma switch and a frame switch input, which are provided by the computer control system 92 via the blanking insertion and bit muting circuitry 127 and the reference clock generator 94, respectively. The frame switch input is a chrominance inversion enable signal which determines the color frame which is to be inverted and that which is not. Thus the frame switch input generates the control input 707 to the transversal filter 705 in the form of the chroma invert enable signal, as further described below, which is the same chroma invert enable signal which is fed to the adder/latch stage 756 (FIG. 29B) on the terminal 757 of FIGS. 28B and 50A. As previously described in FIG. 15, the chroma invert enable is high during one color frame to pass the input unchanged through the exclusive ORs 718. In the alternate frame, the invert enable is low to change the sign and form the 2's complement to thus invert the chrominance. The chroma switch input of terminal 778 couples to the frame switch input via AND gate 779 and prevents the frame switch signal from enabling inversions when the apparatus is not receiving signals from the (disc/tape) storage, e.g., when the apparatus is in electronics-to-electronics mode and chrominance inversion is not desired.

Referring still to FIG. 28A-B, the PALE clock generator also provides the PALE clock on lines 781, 782 via the inverse pin of the ÷2 JK flip-flop 769 and inverters 780. The PALE clock is used conventionally to clock the various latches associated with the adder means 715a, b, the multiplier PROMs 716a, b, the one-sample delay lines 714a, b, c and the delay 723.

Referring now to FIG. 16, there is shown an alternative embodiment of the chrominance separating and processing system, wherein like components are similarly numbered as in FIG. 14. The transversal filter 705 of FIGS. 14, 15, 28 is replaced by digital inverting means 705a, which is selectively enabled via a control input 707a thereto. In one frame the inverting means passes the incoming signal from the bandpass filter means 704 without changing it, whereas in the alternate frame the control input 707a provides an invert enable signal to the inverting means to shift the bits of the incoming digital word by 180° prior to introducing them to the adder means 708. The luminance signal derived from adder means 706 is delivered to the adder means 708, which latter means generates the composite color television signal on terminal 728, as previously described.

FIG. 17 depicts a modification of the alternative embodiment of FIG. 16, wherein adder means 706 is deleted and the inverting means 705a is replaced by inverting means 705b. Like components in the block of FIG. 17 are also similarly numbered. The inverting means 705b constitutes a digital multiply-by-two (×2) stage 756a coupled to the bandpass filter 704, and thence to a negative input of an adder means 708a adapted to perform a subtraction process. As shown in FIGS. 28E-F, the ×2 stage 756a is actually disposed at the output of the bandpass filter means 704, and corresponds to the adder/latch stage 756 of FIG. 29B. The 1H delayed wideband signal on terminal 702 is introduced to the positive input of the adder means 708a.

In operation, the ×2 stage 756a is controlled via the control input 707b, i.e., the chroma invert enable signal, whereby in one frame the stage provides a zero output such that the adder means 708a reconstitutes the composite color television signal from only the 1H delayed wideband signal. On alternate frames the chroma invert enable (707b) disables the ×2 stage 756a to allow passage of the digital signal to the negative input of the adder means 708a, together with the wideband signal from the comb filter means 701. The multiply-by-two process is actually performed by shifting the lines one bit, whereby subtraction of the doubled chrominance signal from the wideband signal via the adder means 708a sums the alternate repetitive reproductions to define the composite color television signal on terminal 728.

It may be seen that the system of FIG. 17 is simplified in that the adder means 706 is deleted. In any event, the systems of FIGS. 16 and 17 provide a lesser degree of conditioning of the chrominance signal on repetitive playbacks than does the system of FIGS. 14, 15, 28. Thus the systems of FIGS. 16, 17 provide full saturation of the chrominance in the non-inverted frame, with of the order of ½ saturation in the inverted frame. However, the stability improvement provided by the all-digital processing, including the inversion process, correspondingly visually improves the color edges.

FIGS. 28E-F depict in schematic the inversion means and control means therefor, for the digital chrominance separating and processing system shown in FIG. 17. To this end, the 1H delayed wideband signal is introduced from the comb filter means 701 (FIG. 27B) via terminal 702, and the bandpass filter means 704 output of the combed chrominance signal is introduced via the adder/latch stage 756a (which herein forms part of the inverting means) from the terminal 703b of FIG. 29B. To simplify the specification, the portion of the inverting means 705b corresponding to the adder/latch stage 756 of FIG. 29B, is depicted in FIG. 28E hereof, by the dashed block 756a inserted after the terminal 703b. The control input 707b, corresponds to the chroma invert enable signal of terminal 757 as previously described. Thus the latter enable signal enables the clear input of the latches of stage 756a on the non-inverting frame, to prevent passage therethrough of the signal and provide in effect the zero input from the bandpass filter to the adder means 708a. On the inverting frame, the chroma invert enable signal disables the clear input of the latches of stage 756a to pass the chrominance signal. The multiply-by-two process is conducted by shifting the wire connections to provide a bit shift of the digital word to double the chrominance signal.

The 1H delayed wideband signal is introduced to a delay 723a (FIG. 28E) similar to delay 723 of FIG. 49A, which equalizes the delays in the wideband signal with those of the chrominance signal introduced via the bandpass filter means 704. The wideband signal is then introduced to a 27/32 multiplier, 722a (FIGS. 28E-F), which performs a gain adjusting function. The wideband signal from the 27/32 multiplier 722a is introduced to the adder means 708a, along with the output from the adder/latch stage 756a. The composite video signal is provided on terminal 728 via the subtraction process conducted on alternate frames, i.e., on alternate repetitive reproductions, by adder means 208a.

As in the circuit of FIGS. 28A-B, FIGS. 28E-F include the control means 709 having the inputs 758, 759, 760 and 761, the PALE clock generator 762, and the count decoder 772, as well as the group A, B control signals on terminal 719, and the PALE clock on terminal 725. As previously mentioned, the chroma invert enable on terminal 757 is introduced to the digital ×2 stage 756a. The PALE clock provided by the JK flip-flop 769 via inverters 780, is introduced via lines 781, 782 to the various latches associated with the delay 732a, the 27/32 multiplier 722a, and adder means 708a, to clock the digital signals from the preceeding logical processor component to the succeeding logical processor component, as well known in the art. The various logical elements of FIGS. 28E-F are thus essentially similar to those of FIGS. 28A-B.

FIG. 18 illustrates in block diagram a digital chrominance separating and processing system which generally functions as those previously described, but which reconstitutes the composite color television signal by repetitive reproductions of a single stored color field. As in the previous figures, like components are similarly numbered. Thus the chrominance signal is separated from the color field wideband signal via comb filter means 701, and is introduced to bandpass filter means 704 via terminal 703a. The 1H delayed wideband signal is introduced to the adder means 706 via terminal 702. The combed chrominance signal is introduced via terminal 703b to an inverting means 705c, and more particularly to a transversal filter with odd symmetry 705 similar to that of FIGS. 14, 15, 28; a third input to an electronic switch means 737; and a first input to a second electronic switch means 738. The number of the inputs of the switches corresponds to the playback number of the single field used to reconstitute the four fields of the composite color television signal. Accordingly, the output from the transversal filter 705 is coupled to a second input to the switch means 737, and to a fourth input to the switch means 738. The output from switch means 737 is coupled to an inverting means similar to 705b of FIGS. 17,28E-F (or inverting means 705a of FIG. 16), which in turn is coupled to second and third inputs of switch means 738. The output of the latter is coupled to one input of the adder means 708, and the output of adder means 706 is coupled to the other input of adder means 708. Control means 709 provides switching signals via control input 707c to step the switch means 737 and 738 through the inputs thereof at the field rate, to enable the transversal filter 705 and inverting means 705b, and to control the filter means 701, 704, adder means 706, 708, etc., as described above.

As is well known, a 90° phase rotation is required between fields since there is an integer number plus three-fourths cycles of subcarrier in a field. Thus the inverting means 705c provides shifting of the single stored field by 90° on each of four successive plays thereof, to reconstitute the four fields of the composite color television signal. To this end, on first playback of the stored field, the switch means 738 is stepped to the first input thereof, to deliver the combed chrominance signal from the bandpass filter means 704 directly to adder means 708 through switch means 738, together with the incoming luminance signal from adder means 706. The first field at 0° phase shift is thus delivered to terminal 728.

On the second playback of the stored field, switch means 737, 738 are stepped to the second inputs thereof, and the chrominance signal is delivered to the adder means 708 via the transversal filter 705, switch 737, the inverting means 705b and the second input of switch means 738. The transversal filter 705 provides a phase shift, for example, of +90° and the inverting means 705b a phase shift of 180°, to rotate the frequency components of the chrominance signal through +270°.

On the third playback of the field, switch means 737, 738 are stepped to the third inputs thereof, whereby the chrominance signal is delivered to the adder means 708 via switch means 737, the inverting means 705b and the third input of switch means 738. The chominance signal is thus rotated +180°.

On the fourth playback, the switch means 738 is stepped to the fourth input, whereby the chrominance signal is delivered to adder means 708 via the transversal filter 705 only, to provide a +90° rotation of the chrominance signal. The four fields are combined on successive playbacks via adder means 708 to generate the composite color television signal on terminal 728.

The sign of the phase shifting may be changed, and the circuit connections and clocks thereto adapted correspondingly, whereby on the second playback of the field the transversal filter 705 rotates the chrominance −90° and is then coupled to the adder means 708. On the third playback the inverting means 705b rotates the chrominance −180°, and on the fourth playback the transversal filter 705 provides −90° rotation, and is coupled to the inverting means 705b which provides −180° rotation, wherein the combination shifts the chrominance −270°, thus providing the 90° phase shift between playbacks.

The control means 709 provides the PALE clock, the four-phase clocks, the chroma invert enable signal, etc., to the various components of the inverting means 705c, the filter means 701, 704 and to the adder means 706, 708, as described and shown in the embodiments of the previous figures.

As well known, when a composite color television signal is reconstituted from a single field, the horizontal sync pulses are not aligned on successive playbacks without the addition of one-half horizontal line delay on alternate fields. Although the chrominance processor of FIG. 18 is not directly concerned with this problem and will deliver the desired succession of fields, the use thereof would require adjunct means for detecting the vertical interval and for inserting the one-half line delay in response thereto as required, and as conventionally known in the art.

Although a 3 $f_{SC}$ sampling rate is employed in the description above, other sampling rates may be used. For example, 4 $f_{SC}$, 16/5 $f_{SC}$, etc., may be employed. A sampling rate which provides an integral number of samples per television line is advantageous since PALE clock is not required; i.e., the PALE clock generator 762 may be omitted. Thus, the PALE clock per se is not necessary to provide the chrominance separating and processing functions herein. In addition, components such as the 27/32 multiplier and multiplier PROMs may be deleted from the systems, in the event a bandpass filter of unity gain is employed.

The functions carried out by the blanking insertion and bit muting circuitry are primarily those of inserting a black level during the blanking period as well as inserting a grey level during the time in which one picture or still image has been played and another has been addressed for playback. The disc drive head movement may take from one to four fields of time duration in which to change from one still to another, the time increasing the greater the radial movement. Thus, if a track on the outside of a disc pack was being played and the next still that was addressed happened to be on an inside track of the same disc pack, then almost four full fields of time would be required for the heads to move to the new position. Since it is aesthetically pleasing not to have a black picture during this time period, a grey level is inserted. The circuitry also is adapted to perform bit muting operations which essentially enables one or more of the bits defining samples of a field to be set to the logical zero state for the purpose of performing special effects during playback. The circuitry shown in block 127 of FIG. 8A also generates a PALEd 3SC clock signal from a PALE flag signal for use by the digital-to-analog converter circuitry 103 and it also generates a continuous subcarrier sine wave signal that can be phase adjusted from the continuous phase 6SC and ½SC square wave signals that are applied to the circuitry by the reference clock generator circuitry 98. Moreover, the circuitry is also adapted to adjust the ½ cycle of 3SC that is present during the second playback of a picture frame that was detected in the reference clock generator circuitry 98 as previously discussed. The chroma inversion enable signal that enables the chroma separator and processing circuitry 101 to invert the phase of chrominance of alternate frames of the receive television signal during playback operations is also generated by the circuitry 127 and is output over line 874.

The operation of the blanking insertion and bit muting circuitry 127 will now be described in connection with a block diagram shown in FIG. 19. The frame delay signal from the reference clock generator 98 is input on line 857 to one input of an exclusive OR gate 872, the other input of which is supplied by line 878 carrying the PALE flag signal received from the reference logic circuitry 125B. The output of the gate 872 appears on line 878' extending to steering logic 876. The frame delay signal serves to invert the PALE flag signal at a picture frame rate, thereby superimposing a frame-to-frame ½ 6SC clock period offset onto the PALE clock, which is used at the output of the blanking insertion and bit muting circuitry 127 and following digital-to-analog converter circuitry 102 to effect the repositioning of the final output video.

In order to insure reliable repositioning of the video data and strobing of the data within the digitial-to-analog converter 102 by the PALE digital-to-analog converter clock that is modified by the frame delay switch signal through the EXCL OR gate 872, the video data itself is selectively delayed by a ½ clock period, so that strobing of the data does not occur during a transition between bits. This is accomplished by the upper portion of the circuitry shown in FIG. 19 as follows. The video data from the chroma processing circuitry 101 is applied on lines 850 which extends to an 8 bit latch 851, the output of which appears on lines 852 which extend to another 8-bit latch 853 as well as to a 4 to 1 by 8 bit data multiplexer 854. The latches 851 and 853 are clocked by the continuous phase 6SC clock on line 855 and the output of the 8 bit latch 853 is also applied to the multiplexer 854 on lines 856. Each of the latches effectively clocks the data from lines 850 through with a ½ cycle of 3SC delay, so that the data appearing on line 852 is delayed ½ cycle of 3SC, whereas the data on line 856 has a full cycle of 3SC delay, by virtue of having been clocked through the two latches. While the same data is applied to the multiplexer 854 by lines 852 and 856, the data on line 856 is ½ cycle of 3SC delayed relative to the data on line 852.

The frame delay signal from the reference clock generator circuitry 98 on line 857 also extends to address control logic, indicated generally at 858, which controls the multiplexer 854 through lines 859. During alternate frames, the frame delay signal commands the address control logic to alternately pass the data from lines 852 and 856 to correct for the ½ cycle of 3SC offset that is present on the second playing of the picture frame as previously described.

When the black mute, or grey mute commands provided by the computer control system 92 are applied on lines 860 and 861, respectively, they are strobed into a latch 862 by the V drive (strobe 1) generated by the reference input circuit 93A and provided on line 862'. The latch 862 controls address control logic 858 in accordance with its stored command to cause the logic to provide the appropriate levels on lines 859 to insert the black or grey level digital information on lines 863 and 864, respectively, so that the black level or grey level data inserted in the video data stream appears on output lines 865. The black and grey levels are produced by setting switches 866 and 867 with the appropriate 8 bit word digitally defining the black or grey levels. When selective bits are to be muted, bit mute control lines 868 are applied to the multiplexer via line 869, assuming that gates 870 are enabled by a bit mute enable signal on line 871 that originates at the address control logic 858. Bit muting is inhibited during the blanking interval so as not to change the setup level of the video. The inhibiting is accomplished by the H and V gated blanking signal provided to the address control logic 858 by the D/A converter and sync insertion circuitry 102 over line 858'.

With respect to the generation of the PALE SC signal, the continuous phase ½SC and 6SC inputs appear on lines 873 and 855, respectively, with the ½SC signal being applied to a pulse former 875 that forms ½SC pulses that extend to steering logic 876 via line 877. A PALE flag signal appearing on line 878 steers the ½SC pulses to either the set (879) or reset (880) inputs of a divide by two divider 881 that is clocked by the 6SC signal on line 855. The output is a 3SC signal on line 882 that is changed in its phase by the ½SC pulses appropriately steered by steering logic 876 in accordance with the level of the PALE flag signal on line 878.

The 6SC and ½SC signals are also applied to a coarse burst phase circuit 884, the output of which appears on line 885 into a 6 bit shift register 886 that is clocked by 6SC and has 6 lines to permit the picking up of every 60° of burst phase and apply the selected phase burst signal over line 887 into a voltage variable capacitor network 888 which permits fine burst phase adjusting with control 889. The outlet is a SC square wave signal on line 890 that is applied to a limiter and filter 891 to produce a continuous sine wave SC signal on output line 892 for use in generating the burst for the composite analog television signal.

Specific circuitry that can be used to carry out the operation of the block diagram of FIG. 19 is illustrated by the detailed electrical schematic diagrams of FIGS. 30A and 30B. Since the operation of the circuitry shown in FIGS. 30A and 30B operates substantially as does the circuitry exemplified in the block diagram of FIG. 19, it will not be explained in detail.

However, with respect to the address control logic 858, it provides appropriate commands on lines 859, 871 and 874 to operate the blanking insertion and bit muting circuitry 127 to pass data to the following D/A converter and sync insertion circuitry 102 in accordance with the control inputs at lines 860, 861, 862' and 874'. The EE/PB signal provided by the encoder switch 126 over line 874' from control signals provided by the computer control system 92 is strobed into the latch 862 by the V drive signal on line 862'. When playback operations are performed, the latch 862 places the chroma invert enable command on line 874 which extends to enable two circuits. One of the circuits is the chroma separator and processing circuitry 101 as previously mentioned. The other is a NAND gate 857a in the frame delay switch line 857. The NAND gate 857a is enabled by the command to pass the frame delay switch to the address control logic 858 for use as previously described. During E to E operations, the chrominance of the video signal is not inverted and the previously mentioned frame to frame 46 nanosecond jitter does not occur in the video signal processed by the playback system 91 because a continuous four field color encoded television signal is provided to the electronics of the playback system 91. The EE/PB signal latched into latch 862 disables the NAND gate 857a and removes the chroma inversion enable signal status from line 874.

The address control logic 858 includes NAND gates 883a, 883b and 883c and a multiplexer 858a for directing the commands provided by NAND gates 883a and 883b onto the appropriate multiplexer control lines 859. NAND gate 883c inhibits bit muting during blanking for reasons discussed above and is provided with three inputs connected to receive the gated blanking signal over line 858' and the black and grey mute commands from the latch 862. Should any of these three functions become active, associated inputs of 883c will go low forcing line 871 high, disabling the bit muting circuitry. Consequently, NAND gate 883c provides a bit mute enable signal on line 871 except during blanking intervals and grey and black mute operations.

NAND gates 883a and 883b have their inputs connected so that during normal playback operations NAND gate 883b provides a low level signal output and NAND gate 883a provides a high level signal output. The multiplexer 858a switches these output signals at the two lines 859 each frame in response to the frame delay switch signal 857 to cause the 4×1 multiplexer 854 to alternately pass the data received from the two latches 851 and 853 as previously described.

When a grey mute command is placed on line 861, latch 862 provides a low disabling signal to one of the inputs of the NAND gate 883c, thereby removing the bit mute enable signal from line 871. However, the inverter 861a inverts the low level provided by the latch 862, causing the output of the NAND gate 883a to be low. The multiplexer 858a activates lines 859 to cause the 4×1 multiplexer 854 to couple grey level digital information from lines 864 to the data output line 865.

Black level mute operations are selected by the switch 860a being placed in a condition to couple the black mute command output of the latch 862 to one input of each of the NAND gates 883a, b and c. The black mute command causes all of these gates to issue high level signals. Hence, the bit mute enable signal is removed from line 871. Also, the multiplexer 858a activates lines 859 to cause the 4×1 multiplexer 854 to place black level digital information from line 863 on data output lines 865.

The final playback processes that are performed in the signal system shown in the block diagram of FIG. 8A involve the converting of the digitized video signals to an analog signal in a proper manner as well as generating and inserting the color burst and the composite sync signals. However, before these processes are performed, the video data present at the output of data multiplexer 854 (FIG. 19) is clocked into a latch 901 with the PALE $3_{SC}$ clock provided by the blanking insertion and bit muting circuitry 127 on line 902, which affects the reclocking of the correctly repositioned video data. The functions that are carried out will be described in connection with the block diagram of FIG. 20 which has the digitized video information on the eight bit lines 900 that extend from the blanking insertion and bit muting circuitry 127 to latches 901. The latches serve to fix the repositioning of the video data to remove the aforementioned picture frame-to-picture frame gitter and, also, latch each of the bits on the bit lines to align them so that the digital-to-analog conversion can be made. The 3SC PALE clock generated by the blanking insertion and bit muting circuitry 127 is applied on line 902 which clocks the latches 901 as well as the following timing circuits, including a second latch 903 and a resampling gate 904. The output of the latches 901 containing the digitized video information is clocked through output lines 905 into current switches 906 that have reference current generators connected thereto. The current switches 906 are connected via lines 907 to a resistor ladder network 908 that provides a weighted analog value of each eight bit digital word, thus providing an analog value having 256 possible levels.

The analog output signal from the ladder network appears on line 909 that splits into two paths, an upper path 910 and a lower path 911, the upper path 910 of which represents the normal path during which the video information is passed into a switch 912. The lower path 911 extends to a blanking filter 913 which is switched during the blanking time for the purpose of shaping the blanking pulse so it has the proper transition rate.

If the reshaping filter is not utilized, then the rapid video to blanking transition time can cause ringing in many television receivers. Accordingly, the output of the filter 913 appears on line 914 into the switch 912 which is controlled by line 915 that comes from the latch 903 which is clocked by the 3SC PALE clock on line 902. During operation, the analog signal on line 909 extends through both paths 910 and 911 and the switch 912 is in the upper position passing the video information except during the blanking period. During the blanking period, the switch 912 is switched to the lower position which connects to the resample gate 904 the signal that has been filtered by the blanking filter 913.

The signal from the switch 912 appears on line 916 that is connected to the resampling gate 904 which operates to sample the level of the signal immediately before a level transition at a point where all transients from the previous transition have disappeared. For example, in the eight bit digital word, a change in value may result in up to seven or eight changes between logical states, i.e., from 1 to 0, each of which will produce a transient condition in the switch. The resampling gate 904 provides a sample and hold operation while blocking the transients so that they do not affect the analog information that is present on line 917 that extends to the buffer and low pass filter 918.

The output of the low pass filter is connected to an amplifier and equalizer 919 via line 920 which performs a sine x/x roll off compensation. The compensated signal is then applied to a black clipper circuit 921 which clips any luminance components of the video signal which appear below black level. The output 922 of the equalizer 919 is also part of a DC restoration loop comprising a switch 923, and a loop amplifier 924 which produces a feedback signal to the low pass filter. The switch 923 is controlled by a clamp pulse on line 925, effecting DC restoration of the video signal on line 922. The clamp pulse is contained in the blanking and composite sync signals provided on a pair of lines 933 by the reference input circuitry 93B.

The output of the black clipping circuit 921 appears on line 927 that extends to the sync and curst adder 928. Burst is added to the signal by line 929 and sync is added by line 930 so that a complete composite analog television signal appears on line 931 to output amplifiers 932. The sync signal is generated by a sync shaping circuit 934 that utilizes a sync pulse contained in the blanking and composite sync signals appearing on line 933, with the sync shaper providing the proper 140 nanosecond rise time and proper shaping. The burst is produced by a burst envelope generator 936 in response to a burst flag signal provided by the reference input circuitry 93B on line 935. The burst flag signal triggers the burst envelope generator 936 to modulate the SC sine wave generated in the bit muting and blanking insertion circuitry 127 previously described. The SC sine wave is coupled to a multiplier 938 to be modulated by the output of the burst envelope generator 936 present on line 937. The output on line 929 contains the burst envelope with the 9 to 11 cycles of burst therein which are added in the sync/burst adder 928 to the analog video signal supplied on line 927.

Figure 20:
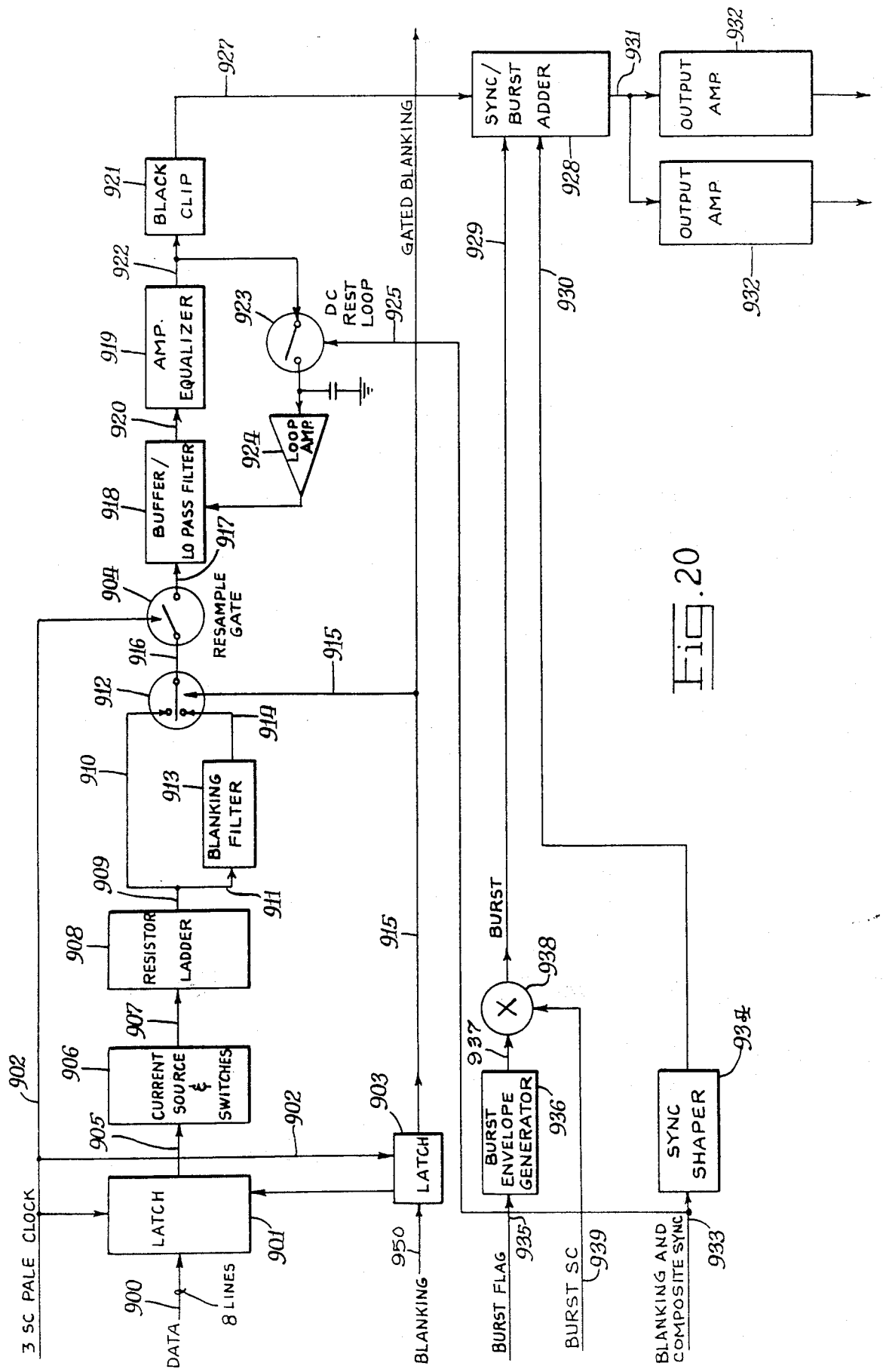
FIG. 20 is a functional block diagram of the digital-to-analog converting and burst and sync insertion circuitry which is a portion of the signal system shown in FIG. 8A.

One embodiment of specific circuitry that can be used to carry out the operation of the block diagram of FIG. 20 is shown in FIGS. 31A through 31D which operates in the manner as described with respect to the block diagram of FIG. 20 and therefore will not be described in detail. However, referring to FIGS. 31A and 31B, a blanking signal is applied to line 950 which extends to the latch 903 and produces an output which extends via lines 915 to a number of switching transistors 953. These transistors 953 together with two transistors 954 and 955, respectively comprise the switch 912 that selects either the signal on the upper path 910 or on the lower path 914 from the filter 913. When blanking occurs, the transistors 953 effectively cut off transistor 954 while placing transistor 955 into conduction and during all other times, the reverse switching occurs.

With respect to the resampling gate 904, a clock appearing on line 902 extends to a number of inverters 957 and 958 which have the effect of providing a small amount of propagation delay to the signal so that the clock signal on line 902 that extends to transistors 961 and 959 are out of step with one another which has the effect of providing a positive transition in the primary side of a transformer 960. The secondary of the transformer 960 is connected to a diode bridge 904 that blocks signal flow during the period of the pulse to prohibit passing of the transients or spikes during switching of the digital-to-analog converter switches 906.

What is claimed is:

1. A method of processing an analog color video information signal for recording on a record medium, the color video information signal having horizontal line synchronizing pulses defining consecutive horizontal lines of color video information and a chrominance component including a subcarrier modulated by the color video information, the subcarrier having a frequency that is an odd multiple of one-half the frequency of the horizontal line synchronizing pulses, comprising the steps of:
    sampling the analog color video information signal at times determined by a first clock signal having a predetermined frequency that is an odd multiple of the subcarrier frequency and a phase which is reversed on every consecutive horizontal line whereby a sampled signal is obtained;
    converting the sampled signal to at least one digital data stream, said digital data stream having a phase discontinuity at each of the locations in the data stream corresponding to the phase reversal in the first clock signal; and
    encoding the data stream for recording on the record medium at times determined by a second clock signal having a frequency substantially the same as the predetermined frequency and a continuous phase whereby a phase continuous encoded data stream is obtained.

2. The method as defined in claim 1 adapted for processing the encoded data stream reproduced from the record medium, further comprising the steps of:
    decoding the reproduced encoded data stream to obtain a decoded digital data stream;
    reclocking the decoded digital data stream with respect to a third clock signal having a frequency substantially the same as the predetermined frequency and a phase which is reversed on every consecutive horizontal line to obtain a reclocked digital data stream;
    separating the chrominance component from the reclocked digital data stream and selectively inverting the separated chrominance component to obtain a processed chrominance component;
    combining the processed chrominance component and the digital data stream from which the chrominance component was separated to form a composite digital data stream; and
    sampling and converting the composite digital data stream to an analog signal form, said sampling performed at times determined by a fourth clock signal having a frequency substantially the same as the predetermined frequency and a phase which is reversed on every consecutive horizontal line.

3. Apparatus for processing an analog color video information signal for recording on a record medium, the color video information signal having horizontal line synchronizing pulses defining consecutive horizontal lines of color video information and a chrominance component including a subcarrier modulated by the color video information, the subcarrier having a frequency that is an odd multiple of one-half the frequency of the horizontal line synchronizing pulses, comprising:
    means for generating a plurality of clock signals each of the same predetermined frequency, a first of said clock signals having a phase that is reversed on every consecutive horizontal line of the color video information signal and a second of said clock signals having a continuous phase;
    means for sampling the analog color video information signal at times determined by the first clock signal to provide a sampled signal;
    means for converting the sampled signal to at least one digital data stream, said digital data stream having a phase discontinuity at each of the locations in the data stream corresponding to the phase reversal in the first clock signal; and
    means for encoding the digital data stream at times determined by the second clock signal to produce an encoded data stream for recording on the record medium.

4. The apparatus as defined in claim 3 adapted for processing the encoded data stream reproduced from the record medium wherein the clock signal generating means provides third and fourth clock signals with each having a phase that is reversed on every consecutive horizontal line of the color video information signal, and further comprising:
    means for decoding the reproduced encoded data to obtain a decoded digital data stream;
    means for reclocking the decoded digital data stream with respect to the third clock signal to obtain a reclocked digital data stream;

means for separating the chrominance component from the reclocked digital data stream and selectively inverting the separated chrominance component to obtain a processed chrominance component;

means for combining the processed chrominance component and the digital data stream from which the chrominance component was separated to form a composite digital data stream; and means for sampling and converting the composite digital data stream to an analog signal form, said sampling and converting means responsive to the fourth clock signal to sample the composite digital data stream at times determined by said fourth clock signal.

* * * * *